US012731541B2

(12) United States Patent
Li et al.

(10) Patent No.: US 12,731,541 B2
(45) Date of Patent: Sep. 8, 2026

(54) DISPLAY SUBSTRATE AND DISPLAY APPARATUS

(71) Applicants: Chengdu BOE Optoelectronics Technology Co., Ltd., Chengdu (CN); BOE Technology Group Co., Ltd., Beijing (CN)

(72) Inventors: Yujing Li, Beijing (CN); Gukhwan Song, Beijing (CN); Haigang Qing, Beijing (CN); Lu Bai, Beijing (CN); Daiying Zhang, Beijing (CN); Weishu Wen, Beijing (CN); Junxiu Dai, Beijing (CN); Guowei Zhao, Beijing (CN); Yan Huang, Beijing (CN); Hongda Cui, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 54 days.

(21) Appl. No.: 18/858,338

(22) PCT Filed: Nov. 21, 2023

(86) PCT No.: PCT/CN2023/132990
§ 371 (c)(1),
(2) Date: Oct. 21, 2024

(87) PCT Pub. No.: WO2025/065839
PCT Pub. Date: Apr. 3, 2025

(65) Prior Publication Data
US 2026/0188213 A1 Jul. 2, 2026

(30) Foreign Application Priority Data
Sep. 25, 2023 (WO) ................ PCT/CN2023/120988

(51) Int. Cl.
*G09G 3/3266* (2016.01)
*G09G 3/20* (2006.01)
*G09G 3/3233* (2016.01)

(52) U.S. Cl.
CPC ......... *G09G 3/3233* (2013.01); *G09G 3/2074* (2013.01); *G09G 3/3266* (2013.01);
(Continued)

(58) Field of Classification Search
CPC .. G09G 3/3233; G09G 3/2074; G09G 3/3266; G09G 2300/0426;
(Continued)

(56) References Cited

U.S. PATENT DOCUMENTS 11,955,082 B2 * 4/2024 Wang .................. G09G 3/3233
2013/0128015 A1 5/2013 Sung et al.
(Continued)

FOREIGN PATENT DOCUMENTS

CN 107180610 A 9/2017
CN 107230452 A 10/2017
(Continued)

OTHER PUBLICATIONS

International Search Report for PCT/CN2023/132981 Mailed Jun. 20, 2024.
(Continued)

*Primary Examiner* — Md Saiful A Siddiqui

(57) ABSTRACT

A display substrate and a display apparatus. The display substrate includes multiple circuit units, a circuit unit at least includes a pixel drive circuit, the pixel drive circuit at least includes a second transistor, a third transistor, a fourth transistor and a ninth transistor, a gate electrode of the third transistor is connected to a second electrode of the ninth transistor, a first electrode of the third transistor is connected to a second electrode of the fourth transistor, a second
(Continued)

electrode of the third transistor is connected to a second electrode of the second transistor, and a first electrode of the second transistor is connected to a first electrode of the ninth transistor; the second transistor and the ninth transistor are configured such that a moment when the ninth transistor is turned off is earlier than a moment when the second transistor is turned off in the data writing stage.

20 Claims, 27 Drawing Sheets

(52) U.S. Cl.
CPC ............... *G09G 2300/0426* (2013.01); *G09G 2300/0804* (2013.01); *G09G 2300/0819* (2013.01); *G09G 2300/0852* (2013.01); *G09G 2300/0861* (2013.01); *G09G 2310/0286* (2013.01); *G09G 2310/06* (2013.01); *G09G 2310/08* (2013.01); *G09G 2320/0233* (2013.01); *G09G 2320/0247* (2013.01); *G09G 2320/0257* (2013.01); *G09G 2320/0693* (2013.01); *G09G 2330/08* (2013.01)

(58) Field of Classification Search
CPC ... G09G 2300/0804; G09G 2300/0819; G09G 2300/0852; G09G 2300/0861; G09G 2310/0286; G09G 2310/06; G09G 2310/08; G09G 2320/0233; G09G 2320/0247; G09G 2320/0257; G09G 2320/0693; G09G 2330/08
See application file for complete search history.

(56) References Cited

U.S. PATENT DOCUMENTS

| | | | | |
|---|---|---|---|---|
| 2016/0140897 | A1 | 5/2016 | Park et al. | |
| 2019/0096335 | A1 | 3/2019 | Kim et al. | |
| 2021/0027702 | A1 | 1/2021 | Park et al. | |
| 2021/0201782 | A1 | 7/2021 | Jang et al. | |
| 2021/0280132 | A1 | 9/2021 | Gao et al. | |
| 2022/0262310 | A1 | 8/2022 | Gao et al. | |
| 2022/0343823 | A1* | 10/2022 | Wang | G09G 3/32 |
| 2022/0358879 | A1 | 11/2022 | Wang et al. | |
| 2023/0140604 | A1 | 5/2023 | Jeong et al. | |
| 2023/0410741 | A1 | 12/2023 | Lee et al. | |
| 2024/0119897 | A1 | 4/2024 | Zhang et al. | |
| 2024/0155902 | A1 | 5/2024 | Li | |
| 2024/0233633 | A1 | 7/2024 | Yonebayashi | |
| 2025/0140201 | A1* | 5/2025 | Liu | G09G 3/3266 |

FOREIGN PATENT DOCUMENTS

| | | | |
|---|---|---|---|
| CN | 109698225 | A | 4/2019 |
| CN | 112735330 | A | 4/2021 |
| CN | 215265531 | U | 12/2021 |
| CN | 115691426 | A | 2/2023 |
| CN | 115705821 | A | 2/2023 |
| CN | 115881029 | A | 3/2023 |
| CN | 115909967 | A | 4/2023 |
| CN | 116210047 | A | 6/2023 |
| CN | 116312389 | A | 6/2023 |
| CN | 116322168 | A | 6/2023 |
| CN | 116343680 | A | 6/2023 |
| CN | 116778868 | A | 9/2023 |
| CN | 118155560 | A | 6/2024 |
| JP | 2016128868 | A | 7/2016 |
| KR | 20170048775 | A | 5/2017 |
| KR | 20180135321 | A | 12/2018 |
| WO | 2023230791 | A1 | 12/2023 |

OTHER PUBLICATIONS

International Search Report for PCTCN2023132990 Mailed Jun. 24, 2024.

International Search Report for PCT/CN2024/112179 Mailed Nov. 13, 2024.

U.S. Office Action mailed on May 12, 2026 in corresponding U.S. Patent Application No. 18/857,197.

U.S. Office Action mailed on Jun. 9, 2026 in corresponding U.S. Appl. No. 18/869,853.

U.S. Office Action mailed on May 4, 2026 in corresponding U.S. Appl. No. 18/842,406.

Chinese Office Action mailed on Jun. 25, 2026 in corresponding Chinese Patent Application No. 202410433916.X.

* cited by examiner

DISPLAY SUBSTRATE AND DISPLAY APPARATUS

CROSS-REFERENCE TO RELATED APPLICATION

The present application is a U.S. National Phase Entry of International Application PCT/CN2023/132990 having an international filing date of Nov. 21, 2023, and entitled "Display Substrate and Display Apparatus", which claims priority to PCT Application No. PCT/CN2023/120988, filed on Sep. 25, 2023 and entitled "Display Substrate, Drive Method therefor, and Display Apparatus", contents of which should be construed as being incorporated herein by reference.

TECHNICAL FIELD

The present disclosure relates to, but is not limited to, the field of display technologies, and more particularly, to a display substrate and a display apparatus.

BACKGROUND

An Organic Light Emitting Diode (OLED for short) and a Quantum dot Light Emitting Diode (QLED for short) are active light emitting display devices and have advantages such as self-luminescence, wide viewing angle, high contrast ratio, low power consumption, very high response speed, lightness and thinness, flexibility, and low cost. With continuous development of display technologies, a display apparatus in which an OLED or a QLED is used as a light emitting device and a Thin Film Transistor (TFT) is used for signal control has become a mainstream product in the field of display at present.

SUMMARY

The following is a summary of subject matter described herein in detail. This summary is not intended to limit the protection scope of claims.

In one aspect, the present disclosure provides a display substrate including a plurality of circuit units constituting a plurality of unit rows and a plurality of unit columns, wherein at least one of the circuit units includes a pixel drive circuit configured to output a drive current to a light emitting device connected to the pixel drive circuit; the pixel drive circuit at least includes a second transistor as a compensation transistor, a third transistor as a drive transistor, a fourth transistor as a data writing transistor, and a ninth transistor as an isolation transistor, wherein the second transistor is an oxide transistor, and the third transistor, the fourth transistor, and the ninth transistor are poly silicon transistors; a gate electrode of the third transistor is connected to a second electrode of the ninth transistor, a first electrode of the third transistor is connected to a second electrode of the fourth transistor, a second electrode of the third transistor is connected to a second electrode of the second transistor, a first electrode of the second transistor is connected to a first electrode of the ninth transistor, and a first electrode of the fourth transistor is connected to a data signal line; the display substrate is configured to display respective display content, the display content includes a plurality of display frames, at least one display frame includes a refresh frame and at least one hold frame, the refresh frame at least includes a data writing stage; the second transistor and the ninth transistor are configured such that, in the data writing stage, a moment at which the ninth transistor is turned off is earlier than a moment at which the second transistor is turned off.

In the data writing stage, a moment at which the ninth transistor is turned off is earlier than a moment at which the second transistor is turned off.

In an exemplary implementation, the data writing stage at least includes a first writing sub-stage, in the first writing sub-stage, the second transistor, the fourth transistor, and the ninth transistor are turned on, and a data signal output by the data signal line is provided to the gate electrode of the third transistor.

In an exemplary implementation, the data writing stage further includes a second writing sub-stage after the first writing sub-stage; in the second writing sub-stage, the second transistor is turned on and the ninth transistor is turned off, isolating the second transistor from the gate electrode of the third transistor.

In an exemplary implementation, the pixel drive circuit further includes a first transistor as a first initialization transistor, a first electrode of the first transistor is connected to a first initial signal line, and a second electrode of the first transistor is connected to the first electrode of the second transistor; the refresh frame further includes a first reset stage before the data writing stage, in the first reset stage, the first transistor and the ninth transistor are turned on, and a first initial signal output by the first initial signal line is provided to the gate electrode of the third transistor to reset the gate electrode of the third transistor.

In an exemplary implementation, in the first reset stage, the fourth transistor is turned on, and data signals of other unit rows outputted by the data signal line are provided to the first electrode of the third transistor to reset characteristics of the third transistor.

In an exemplary implementation, the refresh frame further includes a second reset stage after the data writing stage, and in the second reset stage, a first electrode of the light emitting device and the first electrode of the third transistor are reset, respectively.

In an exemplary implementation, the pixel drive circuit further includes a seventh transistor as a second initialization transistor, a first electrode of the seventh transistor is connected to a second initial signal line, and a second electrode of the seventh transistor is connected to the first electrode of the light emitting device; the second reset stage at least includes a first reset sub-stage, in the first reset sub-stage, the seventh transistor is turned on, a second initial signal output by the second initial signal line is provided to the first electrode of the light emitting device, to reset the first electrode of the light emitting device.

In an exemplary implementation, the pixel drive circuit further includes a fifth transistor as a first light emitting control transistor and a sixth transistor as a second light emitting control transistor, a first electrode of the fifth transistor is connected to a first power supply line, a second electrode of the fifth transistor is connected to the first electrode of the third transistor, a first electrode of the sixth transistor is connected to the second electrode of the third transistor, and a second electrode of the sixth transistor is connected to the first electrode of the light emitting device; the second reset stage further includes a second reset sub-stage after the first reset sub-stage, in the second reset sub-stage, the sixth transistor is turned on to reset the first electrode of the third transistor and the second electrode of the third transistor.

In an exemplary implementation, the refresh frame further includes a light emitting stage after the second reset stage, in the light emitting stage, the fifth transistor and the sixth transistor are turned on, and the first power supply line provides a drive current to the first electrode of the light emitting device to drive the light emitting device to emit light.

In an exemplary implementation, the pixel drive circuit further includes a seventh transistor as a second initialization transistor, a first electrode of the seventh transistor is connected to a second initial signal line, and a second electrode of the seventh transistor is connected to a first electrode of the light emitting device; the refresh frame further includes a second reset stage after the data writing stage, in the second reset stage, the seventh transistor is turned on, and a second initial signal output by the second initial signal line is provided to a first electrode of the light emitting device to reset a first electrode of the light emitting device.

In an exemplary implementation, the pixel drive circuit further includes a fifth transistor as a first light emitting control transistor and a sixth transistor as a second light emitting control transistor, a first electrode of the fifth transistor is connected to a first power supply line, a second electrode of the fifth transistor is connected to the first electrode of the third transistor, a first electrode of the sixth transistor is connected to the second electrode of the third transistor, and a second electrode of the sixth transistor is connected to a first electrode of the light emitting device; the refresh frame further includes a light emitting stage after the second reset stage, in the light emitting stage, the fifth transistor and the sixth transistor are turned on, and the first power supply line provides a drive current to the first electrode of the light emitting device to drive the light emitting device to emit light.

In an exemplary implementation, the pixel drive circuit further includes a seventh transistor as a second initialization transistor, a first electrode of the seventh transistor is connected to a second initial signal line, and a second electrode of the seventh transistor is connected to a first electrode of the light emitting device; the hold frame at least includes a holding stage, in the holding stage, the seventh transistor is turned on, a second initial signal output by the second initial signal line is provided to the first electrode of the light emitting device, to reset the first electrode of the light emitting device.

In an exemplary implementation, the pixel drive circuit further includes a fifth transistor as a first light emitting control transistor, a first electrode of the fifth transistor is connected to a first power supply line, and a second electrode of the fifth transistor is connected to the first electrode of the third transistor; the hold frame further includes a next frame reset stage after the holding stage; in the next frame reset stage, the fifth transistor is turned on, a power supply signal output by the first power supply line is provided to a first electrode of the third transistor, to reset the first electrode of the third transistor.

In an exemplary implementation, the ninth transistor is disposed between the second transistor and the fourth transistor in a unit row direction.

In an exemplary implementation, the second transistor at least includes a second active layer, the fourth transistor at least includes a fourth active layer, and the ninth transistor at least includes a ninth active layer, the ninth active layer is disposed between the second active layer and the fourth active layer in the unit row direction.

In an exemplary implementation, a channel region of the ninth active layer is disposed between a channel region of the second active layer and a channel region of the fourth active layer in the unit row direction.

In another aspect, the present disclosure also provides a display apparatus, including the display substrate described above.

Other aspects of the present disclosure may be comprehended after the drawings and the detailed descriptions are read and understood.

BRIEF DESCRIPTION OF DRAWINGS

Accompany drawings are used to provide understanding of technical solution of the present disclosure, and form a part of the specification. The accompany drawings and embodiments of the present disclosure are used to explain the technical solution of the present disclosure, and do not form limitations on the technical solution of the present disclosure.

Figure 1:
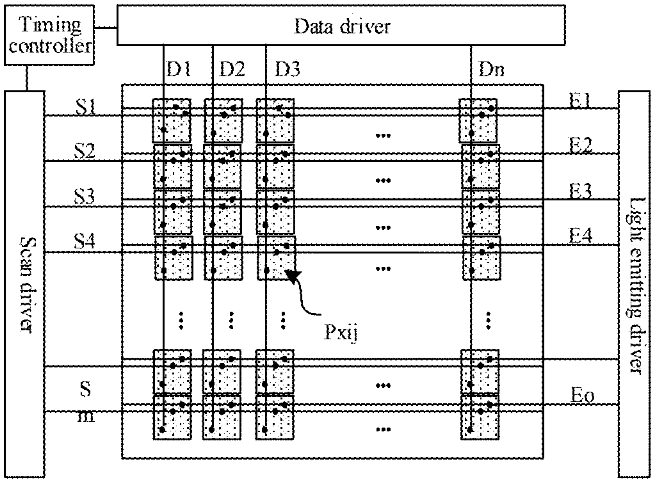
FIG. 1 is a schematic diagram of a structure of a display apparatus.

Reference signs are described as follows.

| |
|---|
| 11-first active layer; |
| 12-second active layer; |
| 13-third active layer; |
| 14-fourth active layer; |
| 15-fifth active layer; |
| 16-sixth active layer; |
| 17-seventh active layer; |
| 18-eighth active layer; |
| 19-ninth active layer; |
| 21-first scan signal line; |
| 22-second scan signal line |
| 23-third scan signal line; |
| 24-fourth scan signal line; |
| 25-light emitting signal line; |
| 26-first light emitting signal line; |
| 27-second light emitting signal line |
| 31-first plate; |
| 32-second plate; |
| 33-first shield line; |
| 34-second shield line; |
| 41-first initial signal line; |
| 42-second initial signal line; |
| 43-third initial signal line; |
| 51-first connection electrode; |
| 52-second connection electrode; |
| 53-third connection electrode; |
| 54-fourth connection electrode; |
| 55-fifth connection electrode; |
| 56-sixth connection electrode; |
| 57-seventh connection electrode; |
| 58-eighth connection electrode; |
| 59-ninth connection electrode; |
| 60-tenth connection electrode; |
| 61-first power supply line; |
| 62-data signal line; |
| 63-anode connection electrode; |
| 101-base substrate; |
| 102-drive circuit layer; |
| 103-light emitting structure layer; |
| 104-encapsulation structure layer. |

DETAILED DESCRIPTION

To make the objectives, technical solutions, and advantages of the present disclosure clearer, the embodiments of the present disclosure will be described in detail below with reference to the accompany drawings. It is to be noted that implementations may be implemented in multiple different forms. Those of ordinary skills in the art can easily understand such a fact that implementations and contents may be transformed into various forms without departing from the purpose and scope of the present disclosure. Therefore, the present disclosure should not be explained as being limited to the contents recorded in the following implementations only. The embodiments and features in the embodiments of the present disclosure may be randomly combined with each other if there is no conflict.

Scales of the drawings in the present disclosure may be used as a reference in actual processes, but are not limited thereto. For example, a width-length ratio of a channel, a thickness and spacing of each film, and a width and spacing of each signal line may be adjusted according to actual needs. A quantity of pixels in a display substrate and a quantity of sub-pixels in each pixel are not limited to numbers shown in the drawings. The drawings described in the present disclosure are schematic structural diagrams only, and one implementation of the present disclosure is not limited to shapes, numerical values, or the like shown in the drawings.

Ordinal numerals "first", "second", "third", etc., in the specification are set not to form limits in numbers but only to avoid confusion between constituent elements.

In the specification, for convenience, expressions "central", "above", "below", "front", "back", "vertical", "horizontal", "top", "bottom", "inside", "outside", etc., indicating directional or positional relationships are used to illustrate positional relationships between the constituent elements, not to indicate or imply that involved devices or elements are required to have specific orientations and be structured and operated with the specific orientations but only to easily and simply describe the present specification, and thus should not be understood as limitations on the present disclosure. The positional relationships between the constituent elements may be changed as appropriate according to a direction according to which each constituent element is described. Therefore, appropriate replacements based on situations are allowed, which is not limited to the expressions in the specification.

In the specification, unless otherwise specified and defined, terms "mounting", "mutual connection", and "connection" should be understood in a broad sense. For example, a connection may be fixed connection, or a detachable connection, or an integral connection; it may be a mechanical connection or an electrical connection; it may be a direct connection, or an indirect connection through middleware, or internal communication inside two elements. Those of ordinary skills in the art may understand specific meanings of the above terms in the present disclosure according to specific situations.

In the specification, a transistor refers to an element that at least includes three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that in the specification, the channel region refers to a region through which a current mainly flows.

In the specification, a first electrode may be a drain electrode, and a second electrode may be a source electrode. Or, the first electrode may be a source electrode, and the second electrode may be a drain electrode. In a case that transistors with opposite polarities are used, or in a case that a direction of a current changes during operation of a circuit, or the like, functions of the "source electrode" and the "drain electrode" are sometimes interchangeable. Therefore, the "source electrode" and the "drain electrode", as well as the "source terminal" and the "drain terminal", are interchangeable in the specification.

In the specification, "electrical connection" includes connection of constituent elements through an element with a certain electrical action. An "element with a certain electrical action" is not particularly limited as long as electrical signals between the connected constituent elements may be sent and received. Examples of the "element with the certain electrical action" not only include an electrode and a wiring, but also include a switching element such as a transistor, a resistor, an inductor, a capacitor, another element with various functions, etc.

In the specification, "parallel" refers to a state in which an angle formed by two straight lines is −10° or more and 10° or less, and thus also includes a state in which the angle is −5° or more and 5° or less. In addition, "perpendicular" refers to a state in which an angle formed by two straight lines is 80° or more and 100° or less, and thus also includes a state in which the angle is 85° or more and 95° or less.

In the specification, a "film" and a "layer" are interchangeable. For example, a "conductive layer" may be replaced with a "conductive thin film" sometimes. Similarly, an "insulation film" may be replaced with an "insulation layer" sometimes.

Triangle, rectangle, trapezoid, pentagon, hexagon, etc. in this specification are not strictly defined, and they may be approximate triangle, rectangle, trapezoid, pentagon, hexagon, etc. There may be some small deformations caused by tolerance, and there may be chamfer, arc edge, deformation, etc.

In the present disclosure, "about" refers to that a boundary is not defined so strictly and numerical values within a range of process and measurement errors are allowed.

FIG. 1 is a schematic diagram of a structure of a display apparatus. As shown in FIG. 1, the display apparatus may include a timing controller, a data driver, a scan driver, a light emitting driver, and a pixel array. The timing controller is connected with the data driver, the scan driver, and the light emitting driver, respectively, the data driver is connected with a plurality of data signal lines (D1 to Dn) respectively, the scan driver is connected with a plurality of scan signal lines (S1 to Sm) respectively, and the light emitting driver is connected with a plurality of light emitting signal lines (E1 to Eo) respectively. The pixel array may include a plurality of sub-pixels Pxij, i and j may be natural numbers. At least one sub-pixel Pxij may include a circuit unit and a light emitting unit. The circuit unit may include at least a pixel drive circuit connected to a scan signal line, a light emitting signal line and a data signal line respectively. The light emitting unit may include a light emitting device connected to the pixel drive circuit of the circuit unit. In an exemplary implementation, the timing controller may provide the data driver with a gray scale value and a control signal which are suitable for the specification of the data driver, provide the scan driver with a clock signal and a scan start signal and the like which are suitable for the specification of the scan driver, and provide the light emitting driver with a clock signal and an emission stop signal and the like which are suitable for the specification of the light emitting driver. The data driver may generate data voltages to be provided to the data signal lines D1, D2, D3, . . . , and Dn using the gray scale value and the control signal that are received from the timing controller. For example, the data driver may sample the gray scale value using the clock signal and apply a data voltage corresponding to the gray scale value to the data signal lines D1 to Dn by taking a pixel row as a unit, wherein n may be a natural number. The scan driver may generate scan signals to be provided to the scan signal lines S1, S2, S3, . . . , and Sm by receiving the clock signal and the scan start signal from the timing controller. For example, the scan driver may sequentially provide a scan signal with an on-level pulse to the scan signal lines S1 to Sm. For example, the scan driver may be constructed in a form of a shift register and may generate a scan signal in a manner in which the scan start signal provided in a form of an on-level pulse is transmitted to a next-stage circuit sequentially under control of the clock signal, wherein m may be a natural number. The light emitting driver may receive the clock signal, the emission stop signal, etc., from the timing controller to generate an emission signal to be provided to the light emitting signal lines E1, E2, E3, . . . , and Eo. For example, the light emitting driver may sequentially provide the emission signal with an off-level pulse to the light emitting signal lines E1 to Eo. For example, the light emitting driver may be constructed in a form of a shift register and generate the emission signal in a manner of sequentially transmitting an emission stop signal provided in a form of an off-level pulse to a next-stage circuit under control of the clock signal, wherein o may be a natural number. In an exemplary implementation, the pixel array may be disposed on the display substrate.

Figure 2:
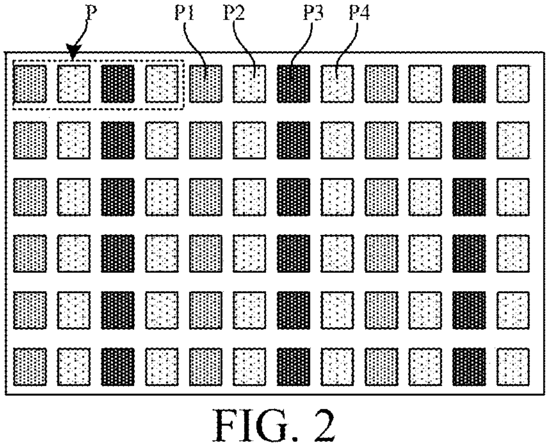
FIG. 2 is a schematic diagram of a planar structure of a display substrate.

FIG. 2 is a schematic diagram of a planar structure of a display substrate. As shown in FIG. 2, the display substrate may include a plurality of pixel units P arranged in a matrix, and at least one of the pixel units P may include a first sub-pixel P1, a second sub-pixel P2, a third sub-pixel P3, and a fourth sub-pixel P4. Each sub-pixel may include a circuit unit and a light emitting unit. The circuit unit may at least include a pixel drive circuit, the pixel drive circuit is connected to a scan signal line, a data signal line, and a light emitting signal line respectively, and is configured to receive a data voltage transmitted by the data signal line and output a corresponding current to the light emitting unit under control of the scan signal line and the light emitting signal line. The light emitting unit may include a light emitting device connected to a pixel drive circuit of a sub-pixel where the light emitting device is located, and the light emitting device is configured to emit light of a corresponding brightness in response to the current output by the pixel drive circuit of the sub-pixel where the light emitting device is located.

In an exemplary implementation, the first sub-pixels P1 may be red sub-pixels (R) emitting red light, the second sub-pixels P2 and the fourth sub-pixels P4 may be green sub-pixels (G) emitting green light, and the third sub-pixels P3 may be blue sub-pixels (B) emitting blue light. In an exemplary implementation, a sub-pixel may be in a shape of a rectangle, a rhombus, a pentagon, or a hexagon. Four sub-pixels may be arranged in a manner to stand side by side horizontally, in a manner to stand side by side vertically, or in a manner to form a square, etc., which is not limited here in the present disclosure.

In an exemplary implementation, a pixel unit may include three sub-pixels, a first sub-pixel P1 may be a red sub-pixel (R) emitting red light, a second sub-pixel P2 may be a green sub-pixel (G) emitting green light, and a third sub-pixel P3 may be a blue sub-pixel (B) emitting blue light, and the three sub-pixels may be arranged side by side horizontally, side by side vertically, or in a delta-shaped arrangement, which is not limited in the present disclosure.

Figure 3:
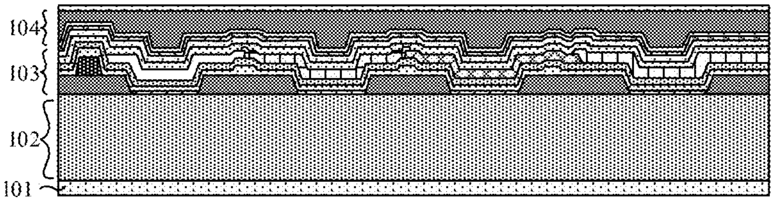
FIG. 3 illustrates a schematic diagram of a sectional structure of a display substrate.

FIG. 3 is a schematic diagram of a sectional structure of a display substrate, illustrating a structure of four sub-pixels in a display area. As shown in FIG. 3, on a plane perpendicular to the display substrate, the display substrate may include a drive circuit layer 102 disposed on a base substrate 101, a light emitting structure layer 103 disposed at a side of the drive circuit layer 102 away from the base substrate 101, and an encapsulation structure layer 104 disposed at a side of the light emitting structure layer 103 away from the base substrate 101. In some possible implementations, the display substrate may include another film layer, such as a touch structure layer, which is not limited here in the present disclosure.

In an exemplary implementation, the base substrate 101 may be a flexible substrate, or may be a rigid substrate. The drive circuit layer 102 may include a plurality of circuit units, each of which may at least include a pixel drive circuit composed of a plurality of transistors and a storage capacitor. The light emitting structure layer 103 may include multiple light emitting units. Each light emitting unit may include a light emitting device, and the light emitting device may at least include an anode, an organic emitting layer, and a cathode. The anode is connected to a pixel drive circuit. The organic emitting layer is connected to the anode. The cathode is connected to the organic emitting layer. The organic emitting layer emits light of a corresponding color under driving of the anode and the cathode. The encapsulation layer 104 may include a first encapsulation layer, a second encapsulation layer, and a third encapsulation layer that are stacked. The first encapsulation layer and the third encapsulation layer may be made of an inorganic material, the second encapsulation layer may be made of an organic material, and the second encapsulation layer is arranged between the first encapsulation layer and the third encapsulation layer to form a laminated structure of inorganic material/organic material/inorganic material and ensure that external moisture cannot enter the light emitting structure layer 103.

An exemplary implementation of the present disclosure provides a display substrate. In an exemplary implementation, on a plane perpendicular to the display substrate, the display substrate may include a drive structure layer disposed on a base substrate and a light emitting structure layer disposed on a side of the drive structure layer away from the base substrate. On a plane parallel to the display substrate, the drive structure layer may include a plurality of circuit units constituting a plurality of unit rows and a plurality of unit columns. At least one of the circuit units may include a pixel drive circuit configured to output a corresponding current to a light emitting device connected to the pixel drive circuit. The light emitting structure layer may include a plurality of light emitting units, at least one of the light emitting units may include a light emitting device connected to a pixel drive circuit of the corresponding circuit unit. The light emitting device is configured to emit light of a corresponding brightness in response to a current output by the pixel drive circuit connected to the light emitting device.

In an exemplary implementation, the circuit units mentioned in the present disclosure refer to regions divided according to pixel drive circuits, and the light emitting units mentioned in the present disclosure refer to regions divided according to light emitting devices. In an exemplary implementation, a position and shape of an orthographic projection of a light emitting unit on the base substrate may correspond to a position and shape of an orthographic projection of a circuit unit on the base substrate, or the position and shape of the orthographic projection of the light emitting unit on the base substrate may not correspond to the position and shape of the orthographic projection of the circuit unit on the base substrate.

In an exemplary implementation, the display substrate according to the present disclosure may include a plurality of circuit units constituting a plurality of unit rows and a plurality of unit columns, and at least one circuit unit at least includes a pixel drive circuit and at least one control signal line configured to provide a control signal to the pixel drive circuit to control the turn-on and turn-off of a transistor in the pixel drive circuit. In at least one circuit unit, the pixel drive circuit at least includes a drive transistor, a first control transistor, and a second control transistor. The first control transistor and the second control transistor are respectively connected to the drive transistor. In at least one pixel drive circuit of at least one unit row, the first control transistor is connected to a control signal line in a previous unit row, and the second control transistor is connected to a control signal line in the present unit row.

In an exemplary implementation, the control signal line includes a light emitting signal line, the first control transistor includes a first light emitting control transistor, and the second control transistor includes a second light emitting control transistor. A first electrode of the first light emitting control transistor is connected to a first power supply line, a second electrode of the first light emitting control transistor is connected to a first electrode of the drive transistor, and a first electrode of the second light emitting control transistor is connected to a second electrode of the drive transistor. In at least one pixel drive circuit of at least one unit row, a gate electrode of the first control transistor is connected to a light emitting signal line in a previous unit row, and a gate electrode of the second control transistor is connected to a light emitting signal line in the present unit row.

In an exemplary implementation, the control signal line includes a scan signal line, the first control transistor includes a third initialization transistor, and the second control transistor includes a second initialization transistor. A first electrode of the second initialization transistor is connected to a second initial signal line, a second electrode of the second initialization transistor is connected to the second electrode of the drive transistor through the second light emitting control transistor. A first electrode of the third initialization transistor is connected to a third initial signal line, and a second electrode of the third initialization transistor is connected to the first electrode of the drive transistor. In at least one pixel drive circuit of at least one unit row, a gate electrode of the third initialization transistor is connected to a scan signal line in the previous unit row, and a gate electrode of the second initialization transistor is connected to a scan signal line in the present unit row.

In an exemplary implementation, the pixel drive circuit further includes a first initialization transistor, a compensation transistor, and an isolation transistor. A first electrode of the first initialization transistor is connected to the first initial signal line, a second electrode of the first initialization transistor and a first electrode of the compensation transistor are connected to a first electrode of the isolation transistor, a second electrode of the isolation transistor is connected to a gate electrode of the drive transistor, and a second electrode of the compensation transistor is connected to the second electrode of the drive transistor.

In another exemplary implementation, the pixel drive circuit further includes a first initialization transistor and a compensation transistor. A first electrode of the first initialization transistor is connected to the first initial signal line, a second electrode of the first initialization transistor and the first electrode of the compensation transistor are connected to the gate electrode of the drive transistor, and a second electrode of the compensation transistor is connected to the second electrode of the drive transistor.

A display substrate according to an exemplary embodiment of the present disclosure is illustrated below by some examples.

Figure 4:
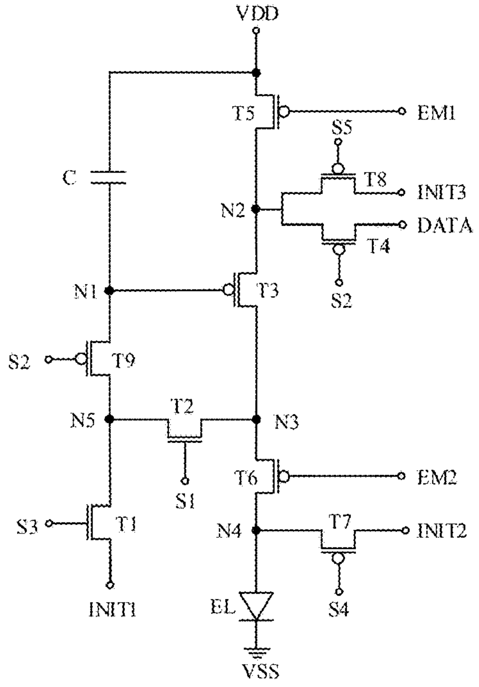
FIG. 4 is an equivalent circuit diagram of a pixel drive circuit according to an exemplary embodiment of the present disclosure.

FIG. 4 is an equivalent circuit diagram of a pixel drive circuit according to an exemplary embodiment of the present disclosure. As shown in FIG. 4, the pixel drive circuit has a structure of 9T1C and may include nine transistors (a first transistor T1 to a ninth transistor T9) and one storage capacitor, and each pixel drive circuit is connected to twelve signal lines (a first scan signal line S1, a second scan signal line S2, a third scan signal line S3, a fourth scan signal line S4, a fifth scan signal line S5, a first light emitting signal line EM1, a second light emitting signal line EM2, a first initial signal line INIT1, a second initial signal line INIT2, a third initial signal line INIT3, a data signal line DATA, and a first power supply line VDD), respectively.

In an exemplary implementation, each pixel drive circuit may include a first node N1, a second node N2, a third node N3, a fourth node N4, and a fifth node N5. The first node N1 is connected to a gate electrode of the third transistor T3, a second electrode of the ninth transistor T9, and a first end of the storage capacitor C respectively. The second node N2 is connected to a first electrode of the third transistor T3, a second electrode of the fourth transistor T4, a second electrode of the fifth transistor T5, and a second electrode of the eighth transistor T8 respectively. The third node N3 is connected to a second electrode of the second transistor T2, a second electrode of the third transistor T3, and a first electrode of the sixth transistor T6 respectively. The fourth node N4 is connected to a second electrode of the sixth transistor T6 and a second electrode of the seventh transistor T7 respectively. The fifth node N5 is connected to a second electrode of the first transistor T1, a first electrode of the second transistor T2, and a first electrode of the ninth transistor T9 respectively. The fourth node N4 is also connected to a first electrode of the light emitting device EL.

In an exemplary implementation, a first end of the storage capacitor C in a pixel drive circuit is connected to the first node N1, and a second end of the storage capacitor C is connected to the first power supply line VDD.

In an exemplary embodiment, the first transistor T1 may be referred to as a first initialization transistor, a gate electrode of the first transistor T1 is connected to the third scan signal line S3, a first electrode of the first transistor T1 is connected to the first initial signal line INIT1, and a second electrode of the first transistor T1 is connected to the fifth node N5.

In an exemplary implementation, the second transistor T2 may be referred to as a compensation transistor, a gate electrode of the second transistor T2 is connected to the first scan signal line S1, the first electrode of the second transistor T2 is connected to the fifth node N5, and the second electrode of the second transistor T2 is connected to the third node N3.

In an exemplary implementation, the third transistor T3 may be referred to as a drive transistor, the gate electrode of the third transistor T3 is connected to the first node N1, the first electrode of the third transistor T3 is connected to the second node N2, and the second electrode of the third transistor T3 is connected to the third node N3.

In an exemplary implementation, the fourth transistor T4 may be referred to as a data writing transistor, a gate electrode of the fourth transistor T4 is connected to the second scan signal line S2, a first electrode of the fourth transistor T4 is connected to the data signal line DATA, and the second electrode of the fourth transistor T4 is connected to the second node N2.

In an exemplary implementation, the fifth transistor T5 may be referred to as a first light emitting control transistor, a gate electrode of the fifth transistor T5 is connected to the first light emitting signal line EM1, a first electrode of the fifth transistor T5 is connected to the first power supply line VDD, and a second electrode of the fifth transistor T5 is connected to the second node N2.

In an exemplary implementation, the sixth transistor T6 may be referred to as a second light emitting control transistor, a gate electrode of the sixth transistor T6 is connected to the second light emitting signal line EM2, a first electrode of the sixth transistor T6 is connected to the third node N3, and a second electrode of the sixth transistor T6 is connected to the fourth node N4.

In an exemplary implementation, the seventh transistor T7 may be referred to as a second initialization transistor, a gate electrode of the seventh transistor T7 is connected to the fourth scan signal line S4, a first electrode of the seventh transistor T7 is connected to the second initial signal line INIT2, and a second electrode of the seventh transistor T7 is connected to the fourth node N4.

In an exemplary implementation, the eighth transistor T8 may be referred to as a third initialization transistor, a gate electrode of the eighth transistor T8 is connected to the fifth scan signal line S5, a first electrode of the eighth transistor T8 is connected to the third initial signal line INIT3, and a second electrode of the eighth transistor T8 is connected to the second node N2.

In an exemplary implementation, a gate electrode of the ninth transistor T9 is connected to the second scan signal line S2, a first electrode of the ninth transistor T9 is connected to the fifth node N5, and a second electrode of the ninth transistor T9 is connected to the first node N1.

In an exemplary embodiment, a first electrode of a light emitting device EL is connected to the fourth node N4, and a second electrode of the light emitting device EL is connected to the second power supply line VSS. The light emitting device EL may be an OLED including a first electrode (anode), an organic light emitting layer, and a second electrode (cathode) that are stacked, or may be a QLED including a first electrode, a quantum dot light emitting layer, and a second electrode that are stacked.

In an exemplary implementation, a signal of the first power supply line VDD is a high-level signal continuously provided, and a signal of the second power supply line VSS is a low-level signal continuously provided.

In some possible exemplary implementations, the first to the ninth transistors T1 to T9 in the pixel drive circuit may be P-type transistors or may be N-type transistors. In some other possible exemplary implementations, the first to ninth transistors T1 to T9 in the pixel drive circuit may include P-type transistors and N-type transistors.

In an exemplary implementation, for the first transistor T1 to the ninth transistor T9 in the pixel drive circuit, low temperature poly silicon transistors may be adopted, or oxide transistors may be adopted, or low temperature poly silicon transistors and oxide transistors may be adopted. An active layer of a low temperature poly silicon transistor is made of Low Temperature Poly silicon (LTPS for short), and an active layer of an oxide transistor is made of an oxide semiconductor (Oxide). A Low temperature poly silicon transistor has advantages such as a high migration rate and fast charging, and an oxide transistor has advantages such as a low leakage current. The low temperature poly silicon transistor and the oxide transistor are integrated on one display substrate to form a Low Temperature Polycrystalline Oxide (LTPO for short) display substrate, so that advantages of both the low temperature poly silicon thin film transistor and the oxide thin film transistor may be utilized, low-frequency drive may be achieved, power consumption may be decreased, and display quality may be improved.

As shown in FIG. 4, in the present exemplary embodiment, oxide transistors (N-type transistors) may be adopted as the first transistor T1 and the second transistor T2 in the pixel drive circuit, and low temperature poly silicon transistors (P-type transistors) may be adopted as the third transistor T3 to the ninth transistor T9.

Figure 5A:
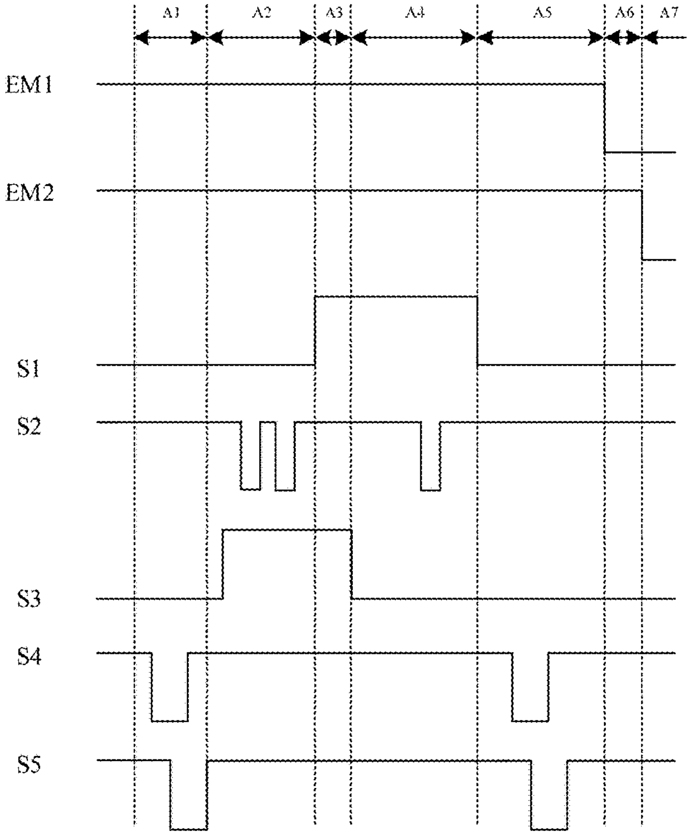
FIG. 5A is a driving timing diagram of the pixel drive circuit shown in FIG. 4.

FIG. 5A is a driving timing diagram of a pixel drive circuit shown in FIG. 4. As shown in FIG. 5A, in an exemplary implementation, a working process of the pixel drive circuit may include following stages.

A first stage A1 may be referred to as a reset stage for the second node N2 and the fourth node N4. Signals of the first scan signal line S1, the third scan signal line S3, the fourth scan signal line S4, and the fifth scan signal line S5 are low-level signals, and signals of the second scan signal line S2, the first light emitting signal line EM1, and the second light emitting signal line EM2 are high-level signals, so that the seventh transistor T7 and the eighth transistor T8 are turned on and other transistors are turned off.

The seventh transistor T7 is turned on, so that a signal of the second initial signal line INIT2 is provided to the fourth node N4, to initialize (reset) a first electrode of the light emitting device EL, and clear original charges in the first electrode of the light emitting device EL, so that a potential of the fourth node N4 is Vinit2. The eighth transistor T8 is turned on so that a signal of the third initial signal line INIT3 is provided to the second node N2, to initialize (reset) the second node N2, so that a potential of the second node N2 is Vinit3.

A second stage A2 may be referred to as a reset stage for the first node N1. A signal of the first scan signal line S1 is a low-level signal, a signal of the second scan signal line S2 appears as a low-level signal twice, with the rest of the time being a high-level signal, and signals of the third scan signal line S3, the fourth scan signal line S4, the fifth scan signal line S5, the first light emitting signal line EM1, and the second light emitting signal line EM2 are high-level signals, so that the first transistor T1 is turned on, the fourth transistor T4 and the ninth transistor T9 are turned on twice, and other transistors are turned off.

The first transistor T1 is turned on, so that a signal of the first initial signal line INIT1 is provided to the fifth node N5, when the fourth transistor T4 and the ninth transistor T9 are turned on, the signal of the first initial signal line INIT1 is provided to the first node N1 to initialize (reset) the first node N1 and clear original charges in the first node N1, and a potential of the first node N1 is Vinit1. Since the ninth transistor T9 is a low temperature poly silicon transistor, the ninth transistor T9 is affected by the potential of the first node N1 and a gate bias voltage of the ninth transistor T9 before the ninth transistor T9 is turned on for the first time, and the potential of the first node N1 is related to a data voltage of the previous stage, so that characteristics of the ninth transistor T9 are affected by the previous stage. After the ninth transistor T9 is turned on for the first time, the potential of the first node N1 is reset to Vinit1, and a gate voltage of the ninth transistor T9 is relatively fixed whether it is at high level or low level, so influence of data voltage of the previous stage on the characteristics of the ninth transistor T9 can be eliminated after the ninth transistor T9 is turned on and turned off for the first time. When the ninth transistor T9 is turned on for the second time, the potential of the first node N1 is reset to Vinit again. In the present disclosure, by continuously resetting the first node N1 twice, the influence of the data voltage in the previous stage on the characteristics of the ninth transistor T9 can be better eliminated, thereby improving the afterimage and the low gray-scale image quality. Further, since the fourth transistor T4 is turned on twice in this stage, the data signal line DATA writes the data voltages of previous several unit rows to the second node N2, and the potential of the second node N2 is changed, so that a gate-source voltage of the third transistor T3 is changed, the characteristics of the third transistor T3 are reset, which can improve afterimage.

A third stage A3 may be referred to as a reset stage for the third node N3. Signals of the first scan signal line S1, the second scan signal line S2, the third scan signal line S3, the fourth scan signal line S4, the fifth scan signal line S5, the first light emitting signal line EM1, and the second light emitting signal line EM2 are high-level signals, so that the first transistor T1 and the second transistor T2 are turned on and other transistors are turned off.

The second transistor T2 is turned on, so that the third node N3 and the fifth node N5 are turned on, and the first transistor T1 is turned on, so that the signal of the first initial signal line INIT1 is provided to the third node N3, to initialize (reset) the third node N3 and clear original charges in the third node N3, so that a potential of the third node N3 is Vinit1.

A fourth stage A4 may be referred to as a data writing stage. A signal of the third scan signal line S3 is a low-level signal, a signal of the second scan signal line S2 is a low-level signal for a short period of time, and signals of the first scan signal line S1, the fourth scan signal line S4, the fifth scan signal line S5, the first light emitting signal line EM1, and the second light emitting signal line EM2 are high-level signals, so that the second transistor T2, the fourth transistor T4, and the ninth transistor T9 are turned on and other transistors are turned off.

The second transistor T2 is turned on, so that the third node N3 and the fifth node N5 are turned on, the ninth transistor T9 is turned on, so that the first node N1 and the fifth node N5 are turned on, since the third transistor T3 is kept turned on in this stage, the fourth transistor T4 is turned on so that a data signal output by the data signal line DATA is provided to the first node N1 through the second node N2, the turned-on third transistor T3, the third node N3, the turned-on second transistor T2, the fifth node N5, and the turned-on ninth transistor T9, and a difference between the data voltage output by the data signal line DATA and a threshold voltage of the third transistor T3 is charged into the storage capacitor C. A voltage of the first node N1 is Vd1−|Vth|, where Vd is the data voltage output by the data signal line DATA and Vth is the threshold voltage of the third transistor T3. When the ninth transistor T9 is turned off, the storage capacitor C holds the data voltage.

A fifth stage A5 may be referred to as a reset stage for the second node N2, the third node N3, and the fourth node N4. Signals of the first scan signal line S1 and the third scan signal line S3 are low-level signals, signals of the fourth scan signal line S4 and the fifth scan signal line S5 are low-level signals in sequence for a short period of time, and signals of the second scan signal line S2, the first light emitting signal line EM1 and the second light emitting signal line EM2 are high-level signals, so that the seventh transistor T7 and the eighth transistor T8 are turned on and other transistors are turned off.

The seventh transistor T7 is turned on so that a signal of the second initial signal line INIT2 is provided to the fourth node N4, and in this stage, since the third transistor T3 is continuously turned on, the eighth transistor T8 is turned on so that the signal of the third initial signal line INIT3 is provided to the second node N2 and the third node N3, to reset the second node N2, the third node N3 and the fourth node N4 respectively. Potentials of the second node N2 and the third node N3 are Vinit3 and the potential of the fourth node N4 is Vinit2. In this stage, the second node N2, the third node N3 and the fourth node N4 are reset, which can eliminate and improve hysteresis bias due to a difference in gray scales between adjacent pixels, reduce the hysteresis bias, and also periodically reset the OLED anode to improve the low-frequency flickering.

A sixth stage A6 may be referred to as a reset stage for the second node N2 and the third node N3. Signals of the first scan signal line S1, the third scan signal line S3, and the first light emitting signal line EM1 are low-level signals, and signals of the second scan signal line S2, the fourth scan signal line S4, the fifth scan signal line S5, and the second light emitting signal line EM2 are high-level signals, so that the fifth transistor T5 is turned on and other transistors are turned off.

The fifth transistor T5 is turned on so that a power supply voltage Vdd output by the first power supply line Vdd is provided to the second node N2 and the third node N3, and the second node N2 and the third node N3 are reset, that is, a first electrode and a second electrode of the third transistor T3 are reset.

A seventh stage A7 may be referred to as a light emitting stage. Signals of the first scan signal line S1, the third scan signal line S3, the first light emitting signal line EM1, and the second light emitting signal line EM2 are low-level signals, and signals of the second scan signal line S2, the fourth scan signal line S4, and the fifth scan signal line S5 are high-level signals, so that the fifth transistor T5 and the sixth transistor T6 are turned on and other transistors are turned off.

The fifth transistor T5 and the sixth transistor T6 are turned on so that a power supply voltage output from the first power supply line VDD provides a drive voltage to a first electrode of the light emitting device EL through the fifth transistor T5, the third transistor T3 and the sixth transistor T6 which are turned on to drive the light emitting device EL to emit light.

In a drive process of the pixel drive circuit, a drive current flowing through the third transistor T3 (a drive transistor) of each pixel drive circuit is determined by a voltage difference between a gate electrode and a first electrode of the third transistor T3. Since the voltage of the first node N1 is Vd-|Vth|, the drive current of the third transistor T3 is as follows:

$$I=K*(Vgs-Vth)^2=K*[(Vdd-Vd+|Vth|)-Vth]^2=K*[(Vdd-Vd]^2$$

Herein, I is the drive current flowing through the third transistor T3, that is, a drive current for driving the light emitting device EL, K is a constant related to process and design, and Vgs is the voltage difference between the gate electrode and the first electrode of the third transistor T3.

It can be seen from derivation results of the above current formula that in the light emitting stage, the drive current of the third transistor T3 of each pixel drive circuit is not affected by the threshold voltage of the third transistor T3. Therefore, the influence of the threshold voltage of the third transistor T3 on the drive current is eliminated, which can ensure uniformity of display brightness of the display product, and improve an overall display effect of the display product.

Figure 5B:
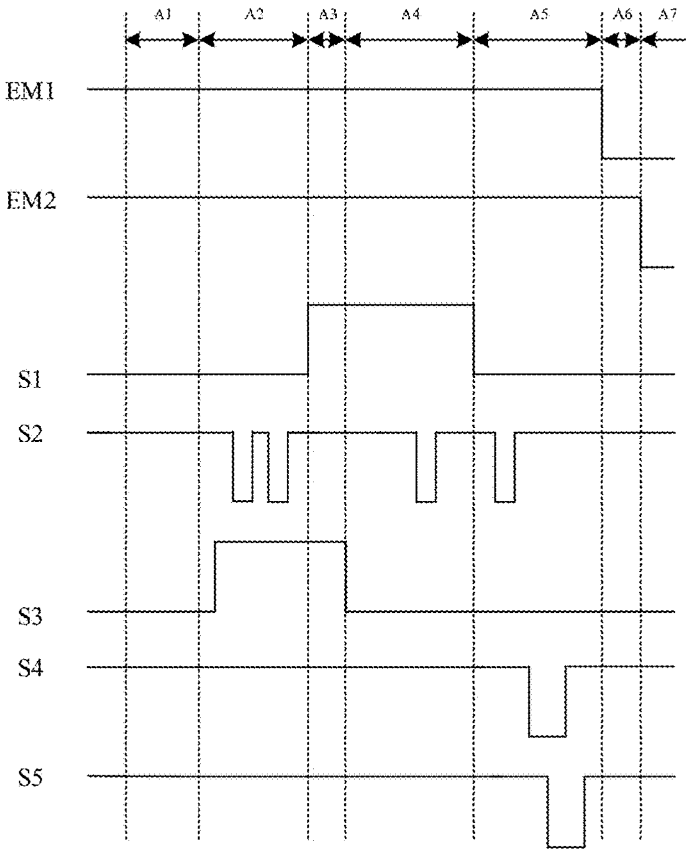
FIG. 5B is another driving timing diagram of the pixel drive circuit shown in FIG. 4.

FIG. 5B is another driving timing diagram of the pixel drive circuit shown in FIG. 4. As shown in FIG. 5B, in an exemplary implementation, the working process of the pixel drive circuit is substantially the same as that of FIG. 5A, except that in the first stage A1, signals of the fourth scan signal line S4 and the fifth scan signal line S5 are high-level signals, the seventh transistor T7 and the eighth transistor T8 are turned off, and the second node N2 and the fourth node N4 are not reset in this stage. In the fifth stage A5, before the seventh transistor T7 and the eighth transistor T8 are turned on, a signal of the second scan signal line S2 is a low-level signal for a short period of time, the fourth transistor T4 and the ninth transistor T9 are turned on again, the fourth transistor T4 is turned on so that a data voltage of a next unit row resets the second node N2 and the third node N3, the ninth transistor T9 is turned on so that the first node N1 and the fifth node N5 are turned on, and there is no potential difference between the two nodes after charges of the two nodes are neutralized.

Figure 6:
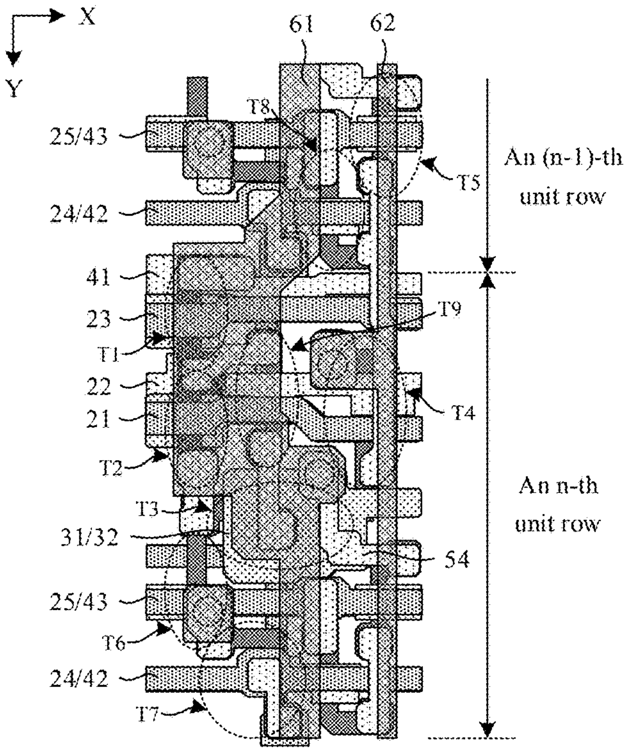
FIG. 6 is a schematic diagram of a planar structure of a display substrate according to an exemplary embodiment of the present disclosure.

FIG. 6 is a schematic diagram of a planar structure of a display substrate according to an exemplary embodiment of the present disclosure. In an exemplary implementation, the display substrate may include a plurality of circuit units, and the plurality of circuit units may form a plurality of unit rows and a plurality of unit columns. The plurality of circuit units in each unit row are sequentially arranged along a first direction X, and the plurality of unit rows are sequentially arranged along a second direction Y, constituting a circuit unit array arranged in a matrix, wherein the first direction X and the second direction Y intersect.

As shown in FIG. 6, at least one circuit unit may include a pixel drive circuit, and a first scan signal line 21, a second scan signal line 22, a third scan signal line 23, a fourth scan signal line 24, a light emitting signal line 25, a first initial signal line 41, a second initial signal line 42, a third initial signal line 43, a first power supply line 61, and a data signal line 62 connected to the pixel drive circuit. In an exemplary embodiment, the first scan signal line 21, the second scan signal line 22, the third scan signal line 23, the fourth scan signal line 24, the light emitting signal line 25, the first initial signal line 41, the second initial signal line 42, and the third initial signal line 43 may be in a shape of a straight line or a bending line whose main body portion extends in the first direction X, and the first power supply line 61 and the data signal line 62 may be in a shape of a straight line or a bending line whose a main body portion extends in the second direction Y.

In the present disclosure, "A extends along a B direction" refers to that A may include a main body portion and a secondary portion connected with the main portion, wherein the main portion is a line, a line segment, or a strip-shaped body, the main body portion extends along the B direction, and a length of the main body portion extending along the B direction is greater than a length of the secondary portion extending along another direction. In following description, "A extends along a B direction" always means "a main body portion of A extends along a B direction".

In an exemplary implementation, at least one pixel drive circuit may at least include a storage capacitor and a plurality of transistors. The storage capacitor may include a first plate and a second plate which are stacked. The plurality of transistors may include a first transistor T1 as a first initialization transistor, a second transistor T2 as a compensation transistor, a third transistor T3 as a drive transistor, a fourth transistor T4 as a data writing transistor, a fifth transistor T5 as a first light emitting control transistor, a sixth transistor T6 as a second light emitting control transistor, a seventh transistor T7 as a second initialization transistor, an eighth transistor T8 as a third initialization transistor, and a ninth transistor T9 as an isolation transistor. Among them, the first transistor T1 and the second transistor T2 are oxide transistors, and the third transistor T3 to the ninth transistor T9 are low temperature poly silicon transistors.

In an exemplary implementation, a first electrode of the first transistor T1 is connected to the first initial signal line 41, a first electrode of the fourth transistor T4 is connected to the data signal line 62, a first electrode of the fifth transistor T5 is connected to the first power supply line 61, a first electrode of the seventh transistor T7 is connected to the second initial signal line 42, and a first electrode of the eighth transistor T8 is connected to the third initial signal line 43. A second electrode of the first transistor T1 and a first electrode of the second transistor T2 are connected to a first electrode of the ninth transistor T9, a second electrode of the ninth transistor T9 is connected to a gate electrode of the third transistor T3 (the first plate of the storage capacitor), a second electrode of the fourth transistor T4, a second electrode of the fifth transistor T5 and a second electrode of the eighth transistor T8 are connected to a first electrode of the third transistor T3, a second electrode of the second transistor T2 and a first electrode of the sixth transistor T6 are connected to a second electrode of the third transistor T3, and a second electrode of the sixth transistor T6 is connected to a second electrode of the seventh transistor T7.

In an exemplary implementation, in at least one pixel drive circuit of at least one unit row, a gate electrode of the fifth transistor T5 is connected to a light emitting signal line 25 in a previous unit row, and a gate electrode of the sixth transistor T6 is connected to the light emitting signal line 25 in the present unit row. For example, a gate electrode of a fifth transistor T5 of a pixel drive circuit in a n-th unit row is connected to a light emitting signal line 25 in an (n−1)-th unit row, and a gate electrode of a sixth transistor T6 of a pixel drive circuit in the n-th unit row is connected to the light emitting signal line 25 in the n-th unit row. For another example, a gate electrode of a fifth transistor T5 of a pixel drive circuit in an (n+1)-th unit row is connected to the light emitting signal line 25 in the n-th unit row, and a gate electrode of a sixth transistor T6 of the pixel drive circuit in the (n+1)-th unit row is connected to a light emitting signal line 25 in the (n+1)-th unit row. In an exemplary implementation, the light emitting signal line 25 may serve as a control signal line of the present disclosure, the fifth transistor T5 may serve as a first control transistor of the present disclosure, and the sixth transistor T6 may serve as a second control transistor of the present disclosure, and n is a positive integer greater than 1.

In an exemplary implementation, in at least one pixel drive circuit, a fifth transistor T5 and a sixth transistor T6 connected to a same third transistor T3 may be provided at two sides of the third transistor T3 in the second direction Y (an unit column direction), respectively. For example, in one pixel drive circuit of the n-th unit row, the fifth transistor T5 may be provided at a side of the third transistor T3 in an opposite direction of the second direction Y, and the sixth transistor T6 may be provided at a side of the third transistor T3 in the second direction Y.

In an exemplary implementation, the fifth transistor T5 may at least include a fifth active layer, the sixth transistor T6 may at least include a sixth active layer. The fifth active layer may serve as a first light emitting control active layer of the present disclosure, and the sixth active layer may serve as a second light emitting control active layer of the present disclosure. In at least one pixel drive circuit of the at least one unit row, the fifth active layer may be disposed in the circuit unit of the previous unit row, and the sixth active layer may be disposed in the circuit unit of the present unit row. For example, in one pixel drive circuit of the n-th unit row, the fifth active layer may be disposed in the circuit unit of an (n−1)-th unit row, and the sixth active layer may be disposed in the circuit unit of the n-th unit row.

In an exemplary implementation, in at least one pixel drive circuit of at least one unit row, the fifth active layer may be disposed on a side of the sixth active layer of the pixel drive circuit in the previous unit row in the first direction X (an unit row direction). For example, in one pixel drive circuit of the n-th unit row, the fifth active layer may be disposed on a side of a sixth active layer of a pixel drive circuit in the (n−1)-th unit row in the first direction X.

In an exemplary implementation, the pixel drive circuit may further include a storage capacitor and a power supply connection electrode 54. The storage capacitor may include a first plate 31 and a second plate 32, and an orthographic projection of the first plate 31 on a plane of the display substrate is at least partially overlapped with an orthographic projection of the second plate 32 on the plane of the display substrate. In at least one pixel drive circuit of at least one unit row, a first end of the power supply connection electrode 54 is connected to a first region of the fifth active layer of the pixel drive circuit in the next unit row, and a second end of the power supply connection electrode 54 is connected to the second plate 32 of the pixel drive circuit in the present unit row. For example, in one pixel drive circuit in the n-th unit row, a first end of the power supply connection electrode 54 is connected to a first region of a fifth active layer of the pixel drive circuit in the (n+1)-th unit row, and a second end of the power supply connection electrode 54 is connected to the second plate 32 of the pixel drive circuit in the n-th unit row.

In an exemplary implementation, in at least one pixel drive circuit of at least one unit row, a gate electrode of the eighth transistor T8 is connected to the fourth scan signal line 24 in the previous unit row, and a gate electrode of the seventh transistor T7 is connected to the fourth scan signal line 24 in the present unit row. For example, a gate electrode of the eighth transistor T8 of the pixel drive circuit in the n-th unit row is connected to a fourth scan signal line 24 in the (n−1)-th unit row, and a gate electrode of the seventh transistor T7 of the pixel drive circuit in the n-th unit row is connected to the fourth scan signal line 24 in the n-th unit row. For another example, a gate electrode of an eighth transistor T8 of the pixel drive circuit in the (n+1)-th unit row is connected to the fourth scan signal line 24 in the n-th unit row, and a gate electrode of a seventh transistor T7 of the pixel drive circuit in the (n+1)-th unit row is connected to a fourth scan signal line 24 in the (n+1)-th unit row. In an exemplary implementation, the fourth scan signal line 24 may serve as another control signal line of the present disclosure, the eighth transistor T8 may serve as another first control transistor of the present disclosure, and the seventh transistor T7 may serve as another second control transistor of the present disclosure.

In an exemplary implementation, in at least one pixel drive circuit, a seventh transistor T7 and an eighth transistor T8 connected to a same third transistor T3 may be disposed on two sides of the third transistor T3 in the second direction Y, respectively. For example, in one pixel drive circuit of the n-th unit row, the eighth transistor T8 may be dispose on a side of the third transistor T3 in an opposite direction pf the second direction Y, and the seventh transistor T7 may be dispose on a side of the third transistor T3 in the second direction Y.

In an exemplary implementation, the seventh transistor T7 may at least include a seventh active layer, the eighth transistor T8 may at least include an eighth active layer, the seventh transistor T7 may serve as a second initialization active layer of the present disclosure, and the eighth active layer may serve as a third initialization active layer of the present disclosure. In at least one pixel drive circuit of at least one unit row, the eighth active layer may be disposed in the circuit unit of the previous unit row, and the seventh active layer may be disposed in the circuit unit of the present unit row. For example, in one pixel drive circuit of the n-th unit row, the eighth active layer may be provided in the circuit unit of the (n−1)-th unit row, and the seventh active layer may be provided in the circuit unit of the n-th unit row.

In an exemplary implementation, in at least one pixel drive circuit of at least one unit row, the eighth active layer may be disposed on a side of the seventh active layer of the pixel drive circuit in the previous unit row in the first direction X (the unit row direction). For example, in one pixel drive circuit of the n-th unit row, the eighth active layer may be disposed on a side of the seventh active layer of the pixel drive circuit in the (n−1)-th unit row in the first direction X.

In an exemplary implementation, in at least one pixel drive circuit of at least one unit row, a first region of the seventh active layer is connected to the second initial signal line 42 in present unit row, and a first region of the eighth active layer is connected to the third initial signal line 43 in the previous unit row. For example, in one pixel drive circuit in the n-th unit row, a first region of the seventh active layer is connected to the second initial signal line 42 in the n-th unit row, and a first region of the eighth active layer is connected to a third initial signal line 43 in the (n−1)-th unit row.

In an exemplary implementation, in a direction perpendicular to the display substrate, the display substrate may include a first semiconductor layer disposed on a base substrate, a first conductive layer disposed on a side of the first semiconductor layer away from the base substrate, a second conductive layer disposed on a side of the first conductive layer away from the base substrate, a second semiconductor layer disposed on a side of the second conductive layer away from the base substrate, a third conductive layer disposed on a side of the second semiconductor layer away from the base substrate, a fourth conductive layer disposed on a side of the third conductive layer away from the base substrate, and a fifth conductive layer disposed on a side of the fourth conductive layer away from the base substrate. The first semiconductor layer may at least include the active layers of the third transistor T3 to the ninth transistor T9, the first conductive layer may at least include the second scan signal line 22, the fourth scan signal line 24, the light emitting signal line 25, the first initial signal line 41, and the first plate 31 of the storage capacitor. The second conductive layer may at least include the second plate 32 of the storage capacitor. The second semiconductor layer may at least include the active layers of the first transistor T1 and the second transistor T2. The third conductive layer may at least include the first scan signal line 21, the third scan signal line 23, the second initial signal line 42, and the third initial signal line 43. The fourth conductive layer may at least include a plurality of connection electrodes. The fifth conductive layer may at least include the first power supply line 61 and the data signal line 62.

In an exemplary implementation, an orthographic projection of the second initial signal line 42 on the base substrate is at least partially overlapped with an orthographic projection of the fourth scan signal line 24 on the base substrate.

In an exemplary implementation, an orthographic projection of the third initial signal line 43 on the base substrate is at least partially overlapped with an orthographic projection of the light emitting signal line 25 on the base substrate.

Exemplary description is made below through a preparation process of a display substrate. A "patterning process" mentioned in the present disclosure includes a treatment such as deposition of a film layer, photoresist coating on a film layer, mask exposure, development, etching, and photoresist stripping for a metal material, an inorganic material, or a transparent conductive material, and includes a treatment such as organic material coating, mask exposure, and development for an organic material. Deposition may be any one or more of sputtering, evaporation, and chemical vapor deposition, coating may be any one or more of spray coating, spin coating, and inkjet printing, and etching may be any one or more of dry etching and wet etching, the present disclosure is not limited thereto. A "thin film" refers to a layer of thin film made of a certain material on a base substrate using deposition, coating, or other processes. If the "thin film" does not need to be processed through a patterning process in the entire manufacturing process, the "thin film" may also be called a "layer". If the "thin film" needs to be processed through the patterning process in the entire manufacturing process, the "thin film" is called a "thin film" before the patterning process is performed and is called a "layer" after the patterning process is performed. At least one "pattern" is contained in the "layer" which has been processed through the patterning process. "A and B are arranged in a same layer" in the present disclosure means that A and B are formed simultaneously through a same patterning process, and a "thickness" of a film layer is a dimension of the film layer in a direction perpendicular to a display substrate. In an exemplary implementation of the present disclosure, "an orthographic projection of B is within a range of an orthographic projection of A" or "an orthographic projection of A contains an orthographic projection of B" refers to that a boundary of the orthographic projection of B falls within a range of a boundary of the orthographic projection of A, or the boundary of the orthographic projection of A coincides with the boundary of the orthographic projection of B.

In an exemplary embodiment, taking one pixel unit as an example, the manufacturing process of the display substrate according to the present embodiment may include the following operations.

Figure 7:
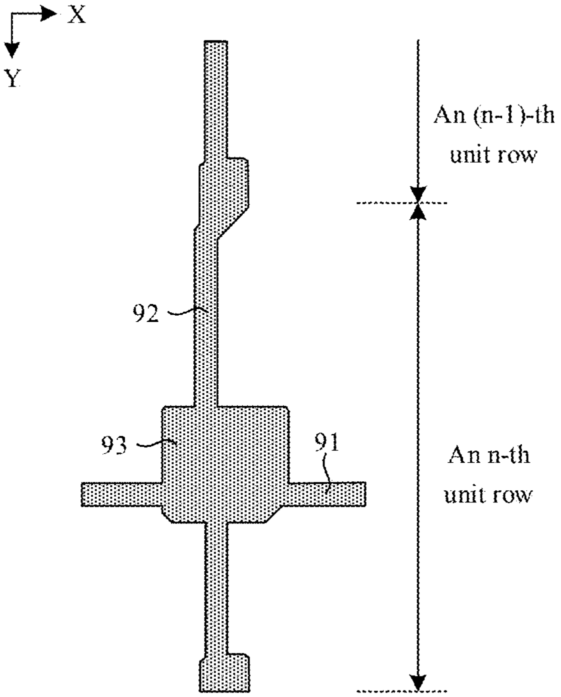
FIG. 7 is a schematic diagram of a display substrate after a pattern of a shield layer is formed according to the present disclosure.

(1) A pattern of a shield layer is formed. In an exemplary embodiment, forming the pattern of the shield layer may include: depositing a shield thin film on a base substrate, patterning the shield thin film through a patterning process to form a pattern of a shield layer on the base substrate, as shown in FIG. 7. In an exemplary implementation, the shield layer may be referred to as a bottom shield metal (BSM) layer.

In an exemplary implementation, the pattern of the shield layer in each circuit unit may at least include a first shield connection line 91, a second shield connection line 92, and a shield electrode 93.

In an exemplary embodiment, the shield electrode 93 may be in a shape of a rectangle, corners of the rectangle may be provided with chamfers. The first shield connection line 91 may be in a shape of a straight line or a bending line extending along the first direction X, the first shield connection line 91 may be disposed on two sides of the shield electrode 93 in the first direction X respectively, and may be connected to the shield electrode 93 respectively. The second shield connection line 92 may be in a shape of a straight line or a bending line extending along the second direction Y, the second shield connection line 92 may be disposed on two sides of the shield electrode 93 in the second direction Y, and may be connected to the shield electrode 93, respectively.

In an exemplary implementation, in one unit row, the first shield connection lines 91 in two circuit units adjacent in the first direction X may be connected to form an interconnected integral structure; and/or in one unit column, the second shield connection lines 92 in two circuit units adjacent in the second direction Y may be connected to form an interconnected integral structure. Shield layers in a unit row and a unit column are connected into a whole, which may ensure that the shield layers in the display substrate have a same potential, which is beneficial to improving uniformity of a panel, avoiding poor display of the display substrate, and ensuring a display effect of the display substrate.

In an exemplary implementation, the first shield connection lines 91 on two sides of the shield electrode 93 may be located on a straight line extending along the first direction X, and the second shield connection lines 92 on two sides of the shield electrode 93 may be staggered in the first direction X, which is not limited in the present disclosure.

Figure 8A:
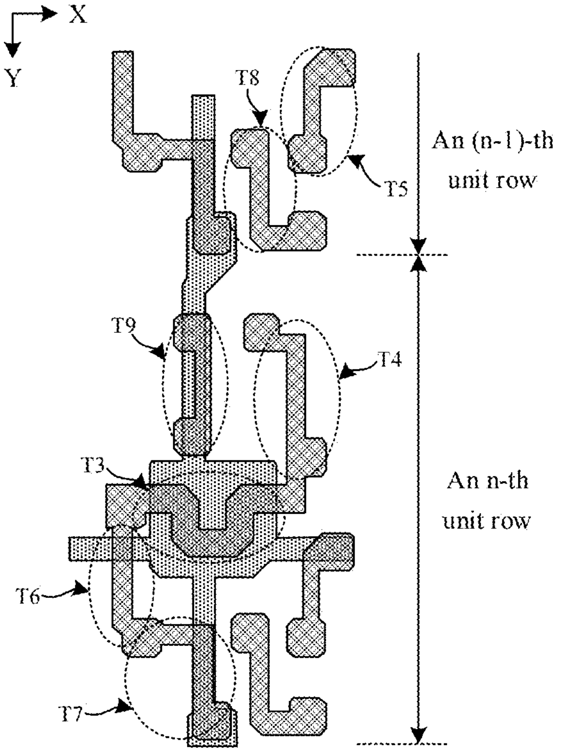
FIG. 8A and FIG. 8B are schematic diagrams of a display substrate after a pattern of a first semiconductor layer is formed according to the present disclosure.
Figure 8B:
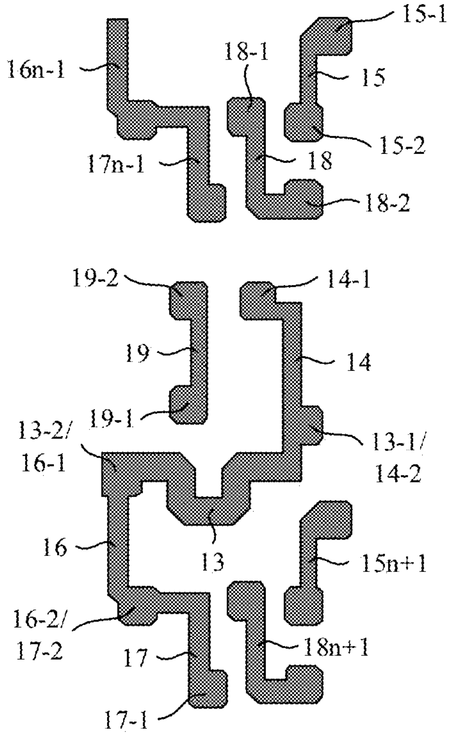

(2) A pattern of a first semiconductor layer is formed. In an exemplary embodiment, forming the pattern of the first semiconductor may include: sequentially depositing a first insulation thin film and a first semiconductor thin film on the base substrate on which the above-mentioned patterns are formed, patterning the first semiconductor thin film through a patterning process to form a first insulation layer covering the shield layer, and a pattern of a first semiconductor disposed on the first insulation layer, as shown in FIG. 8A and FIG. 8B, and FIG. 8B is a schematic plan view of the first semiconductor layer in FIG. 8A.

In an exemplary implementation, the pattern of the first semiconductor layer in each circuit unit may at least include a third active layer 13 of the third transistor T3 to a ninth active layer 19 of the ninth transistor T9, and the third active layer 13, a fourth active layer 14, a sixth active layer 16, and a seventh active layer 17 are of an interconnected integral structure, and a fifth active layer 15, an eighth active layer 18, and the ninth active layer 19 are separately provided.

In an exemplary implementation, an orthographic projection of the third active layer 13 on the base substrate is at least partially overlapped with an orthographic projection of the shield electrode 93 on the base substrate, and the shield electrode 93 serves as the shield layer of the third transistor T3, shielding a channel region of the third transistor T3, ensuring the electrical performance of the third transistor T3.

In an exemplary implementation, in the pixel drive circuit of the present circuit unit, in the first direction X, the fourth active layer 14, the fifth active layer 15, and the eighth active layer 18 may be located on a side of the third active layer 13 in the present circuit unit in the first direction X, and the sixth active layer 16 may be located on a side of the third active layer 13 in the present circuit unit in an opposite direction of the first direction X. In the second direction Y, the sixth active layer 16 and the seventh active layer 17 may be located on a side of the third active layer 13 in the present circuit unit in the second direction Y, and the fourth active layer 14, the fifth active layer 15, the eighth active layer 18, and the ninth active layer 19 may be located on a side of the third active layer 13 in the present circuit unit in an opposite direction of the second direction Y.

In an exemplary implementation, the ninth active layer 19 may be located on a side of the fourth active layer 14 in the opposite direction of the first direction X.

In an exemplary implementation, the third active layer 13 may be in a shape of an inverted "Ω", the fourth active layer 14, the fifth active layer 15, the sixth active layer 16, and the ninth active layer 19 may be in a shape of a strip in which a main body portion extends along the second direction Y, and the seventh active layer 17 and the eighth active layer 18 may be in a shape of an "L".

In an exemplary implementation, the third active layer 13 to the ninth active layer 19 may each include a first region, a second region, and a channel region located between the first region and the second region. In an exemplary implementation, a first region 13-1 of the third active layer is connected to a second region 14-2 of the fourth active layer, and a first region 13-1 of the third active layer may serve as a second region 14-2 of the fourth active layer. A second region 13-2 of the third active layer is connected to a first region 16-1 of the sixth active layer, and the second region 13-2 of the third active layer may serve as the first region 16-1 of the sixth active layer. A second region 16-2 of the sixth active layer is connected to a second region 17-2 of the seventh active layer, and the second region 16-2 of the sixth active layer may serve as the second region 17-2 of the seventh active layer. A first region 14-1 of the fourth active layer, a first region 15-1 of the fifth active layer, a second region 15-2 of the fifth active layer, a first region 17-1 of the seventh active layer, a first region 18-1 of the eighth active layer, a second region 18-2 of the eighth active layer, the a region 19-1 of the ninth active layer, and a second region 19-2 of the ninth active layer may be separately provided.

In an exemplary implementation, in one unit column, the fifth active layer 15 and the eighth active layer 18 of the pixel drive circuit in the present circuit unit may be disposed in the circuit unit of the previous unit row, and the third active layer 13, the fourth active layer 14, the sixth active layer 16, the seventh active layer 17, and the ninth active layer 19 may be disposed in the present circuit unit.

In an exemplary implementation, the fifth active layer 15 of the pixel drive circuit in the circuit unit of the present unit row may be located on a side of the sixth active layer 16 of the pixel drive circuit in the circuit unit of the previous unit row in the first direction X, so that the fifth active layer 15 and the sixth active layer 16 of the two unit rows may share one light emitting signal line, which can simultaneously control the turn-on and turn-off of the sixth transistor T6 of the present unit row and the fifth transistor T5 of the next unit row. For example, the fifth active layer 15 of the pixel drive circuit in the n-th unit row is disposed in the circuit unit in the (n−1)-th unit row so that the fifth active layer 15 of the pixel drive circuit in the n-th unit row and the sixth active layer 16*n*−1 of the pixel drive circuit in the (n−1)-th unit row may share one light emitting signal line that can simultaneously control the turn-on and turn-off of the fifth transistor T5 of the n-th unit row and the sixth transistor T6 of the (n−1)-th unit row. As another example, the fifth active layer 15*n*+1 of the pixel drive circuit in the (n+1)-th unit row is disposed in the circuit unit in the n-th unit row, so that the fifth active layer 15*n*+1 of the pixel drive circuit in the (n+1)-th unit row and the sixth active layer 16 of the pixel drive circuit in the n-th unit row can share one light emitting signal line, which can simultaneously control the turn-on and turn-off of the fifth transistor T5 of the (n+1)-th unit row and the sixth transistor T6 of the n-th unit row.

In an exemplary implementation, the eighth active layer 18 of the pixel drive circuit in the circuit unit of the present unit row may be located on a side of the seventh active layer 17 of the pixel drive circuit in the circuit unit of the previous unit row in the first direction X, so that the seventh active layer 17 and the eighth active layer 18 of the two unit rows may share one scan signal line, which can simultaneously control the turn-on and turn-off of the seventh transistor T7 of the present unit row and the eighth transistor T8 of the next unit row. For example, the eighth active layer 18 of the pixel drive circuit in the n-th unit row is disposed in the circuit unit in the (n−1)-th unit row so that the eighth active layer 18 of the pixel drive circuit in the n-th unit row and the seventh active layer 17*n*−1 of the pixel drive circuit in the (n−1)-th unit row may share one scan signal line that can simultaneously control the turn-on and turn-off of the seventh transistor T7 of the (n−1)-th unit row and the eighth transistor T8 of the n-th unit row. As another example, the eighth active layer 18*n*+1 of the pixel drive circuit in the (n+1)-th unit row is disposed in the circuit unit in the n-th unit row, so that the eighth active layer 18*n*+1 of the pixel drive circuit in the (n+1)-th unit row and the seventh transistor T7 of the pixel drive circuit in the n-th unit row can share one scan signal line, which can simultaneously control the turn-on and turn-off of the seventh transistor T7 of the n-th unit row and the eighth transistor T8 of the (n+1)-th unit row.

In an exemplary implementation, the first semiconductor layer may be made of poly Silicon (p-Si), i.e., the third transistor T3 to the ninth transistor T9 are LTPS transistors. In an exemplary implementation, the patterning the first semiconductor thin film through the patterning process may include: forming an amorphous silicon (a-si) thin film on the first insulation thin film, dehydrogenating the amorphous silicon thin film, and crystallizing the dehydrogenated amorphous silicon thin film to form a poly silicon thin film. Subsequently, the poly silicon thin film is patterned to form the pattern of the first semiconductor layer.

Figure 9A:
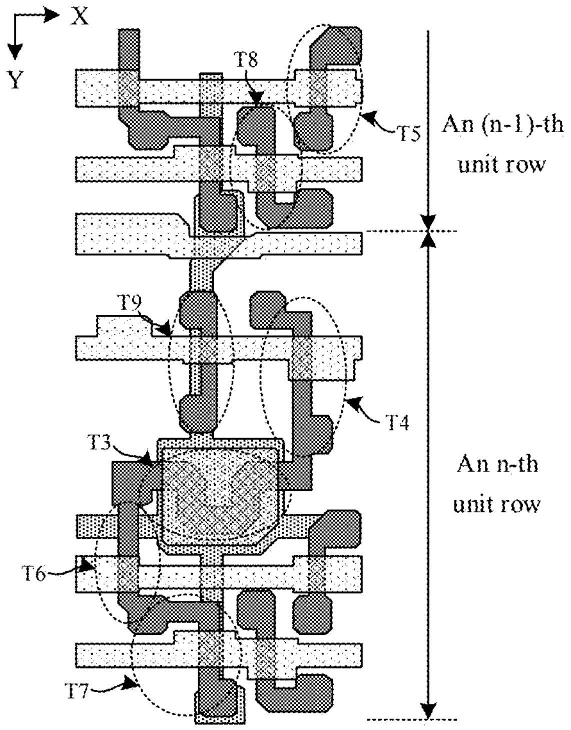
FIGS. 9A and 9B are schematic diagrams of a display substrate after a pattern of a first conductive layer is formed according to the present disclosure.
Figure 9B:
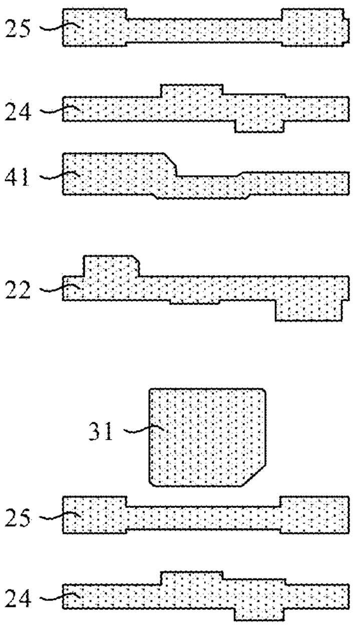

(3) A pattern of a first conductive layer is formed. In an exemplary implementation, forming the pattern of the first conductive layer may include: depositing a second insulation thin film and a first conductive thin film sequentially on the base substrate on which the aforementioned patterns are formed, and patterning the first conductive thin film through a patterning process to form a second insulation layer that covers the pattern of the first semiconductor layer and form the pattern of the first conductive layer disposed on the second insulation layer, as shown in FIG. 9A and FIG. 9B, and FIG. 9B is a schematic plan view of the first conductive layer in FIG. 9A. In an exemplary implementation, the first conductive layer may be referred to as a first gate metal (GATE1) layer.

In an exemplary implementation, the pattern of the first conductive layer of each circuit unit may at least include a second scan signal line 22, a fourth scan signal line 24, a light emitting signal line 25, a first initial signal line 41, and a first plate 31 of a storage capacitor.

In an exemplary embodiment, the first plate 31 may be in a shape of a rectangle, and a chamfer may be provided at a corner of the rectangle. An orthographic projection of the first plate 31 on the base substrate is at least partially overlapped with an orthographic projection of the third active layer of the third transistor T3 on the base substrate. In an exemplary implementation, the first plate 31 may serve as one plate of the storage capacitor and a gate electrode of the third transistor T3 simultaneously.

In an exemplary embodiment, an orthographic projection of the first plate 31 on the base substrate at least partially overlaps with an orthographic projection of the shield electrode 93 on the base substrate.

In an exemplary implementation, the second scan signal line 22 may be in a shape of a straight line or a bending line in which a main body portion extends along the first direction X, the second scan signal line 22 may be located at a side of the first plate 31 in an opposite direction of the second direction Y, a region where the second scan signal line 22 overlaps with the fourth active layer may serve as a gate electrode of the fourth transistor T4, and a region where the second scan signal line 22 overlaps with the ninth active layer may serve as a gate electrode of the ninth transistor T9.

In an exemplary implementation, the fourth scan signal line 24 may be in a shape of a straight line or a bending line in which a main body portion extends along the first direction X, the fourth scan signal line 24 may be located at a side of the first plate 31 in the second direction Y, a region where the fourth scan signal line 24 of the present unit row overlaps with the seventh active layer of the pixel drive circuit in the present unit row may serve as the gate electrode of the seventh transistor T7 of the present unit row, and a region where the fourth scan signal line 24 of the present unit row overlaps with the eighth active layer of the pixel drive circuit in the next unit row may serve as a gate electrode of the eighth transistor T8 of the next unit row. For example, a region where the fourth scan signal line 24 of the (n−1)-th unit row overlaps with the seventh active layer of the pixel drive circuit in the (n−1)-th unit row may serve as a gate electrode of the seventh transistor T7 in the (n−1)-th unit row, and a region where the fourth scan signal line 24 of the (n−1)-th unit row overlaps with the eighth active layer of the pixel drive circuit in the n-th unit row may serve as a gate electrode of the eighth transistor T8 in the n-th unit row. As another example, a region where the fourth scan signal line 24 in the n-th unit row overlaps with the seventh active layer of the pixel drive circuit in the n-th unit row may serve as a gate electrode of the seventh transistor T7 in the n-th unit row, and a region where the fourth scan signal line 24 in the n-th unit row overlaps with the eighth active layer of the pixel drive circuit in the (n+1)-th unit row may serve as a gate electrode of the eighth transistor T8 in the (n+1)-th unit row.

In an exemplary implementation, the light emitting signal line 25 may be in a shape of a straight line or a bending line in which a main body portion extends along the first direction X, and the light emitting signal line 25 may be located between the first plate 31 and the fourth scan signal line 24. A region where the light emitting signal line 25 of the present unit row overlaps with the sixth active layer of the pixel drive circuit in the present unit row may serve as a gate electrode of the sixth transistor T6 of the present unit row, and a region where the light emitting signal line 25 of the present unit row overlaps with the fifth active layer of the pixel drive circuit in the next unit row may serve as a gate electrode of the fifth transistor T5 of the next unit row. For example, a region where the light emitting signal line 25 of the (n−1)-th unit row overlaps with the sixth active layer of the pixel drive circuit in the (n−1)-th unit row may serve as the gate electrode of the sixth transistor T6 in the (n−1)-th unit row, and a region where the light emitting signal line 25 of the (n−1)-th unit row overlaps with the fifth active layer of the pixel drive circuit in the n-th unit row may serve as a gate electrode of the fifth transistor T5 in the n-th unit row. As another example, a region where the light emitting signal line 25 of the n-th unit row overlaps with the sixth active layer of the pixel drive circuit in the n-th unit row may serve as a gate electrode of the sixth transistor T6 in the n-th unit row, and a region where the light emitting signal line 25 of the n-th unit row overlaps with the fifth active layer of the pixel drive circuit in the (n+1)-th unit row may serve as a gate electrode of the fifth transistor T5 in the (n+1)-th unit row.

In an exemplary implementation, the first initial signal line 41 may be in a shape of a straight line or a bending line in which a main body portion extends along the first direction X, the first initial signal line 41 may be located at a side of the second scan signal line 22 away from the first plate 31, and the first initial signal line 41 is configured to be connected to a first region of the first active layer through a seventh connection electrode formed subsequently.

In an exemplary implementation, the second scan signal line 22, the fourth scan signal line 24, the light emitting signal line 25, and the first initial signal line 41 may be of a non-equal width design, and the width is a size in the second direction Y, which may not only facilitate a layout of a pixel structure, but also reduce a parasitic capacitance between the signal lines, which is not limited in the present disclosure.

In an exemplary embodiment, the second scan signal line 22, the fourth scan signal line 24 and the light emitting signal line 25 may include a region overlapped with the first semiconductor layer and a region not overlapped with the first semiconductor layer, and the width of the signal line in the region overlapped with the first semiconductor layer may be greater than the width of the signal line in the region not overlapped with the first semiconductor layer.

In an exemplary implementation, a size of a region where the second scan signal line 22 overlaps with the fourth active layer in the second direction Y may be larger than a size of a region where the second scan signal line 22 overlaps with the ninth active layer the in second direction Y, so that a channel length of the fourth transistor T4 is larger than a channel length of the ninth transistor T9, and when the channel widths of the fourth transistor T4 and the ninth transistor T9 are similar, a channel width-length ratio of the ninth transistor T9 is larger than a channel width-length ratio of the fourth transistor T4.

In an exemplary implementation, after the pattern of the first conductive layer is formed, a conductive processing may be performed on the first semiconductor layer by using the first conductive layer as a shield, a first semiconductor layer in a region shielded by the first conductive layer forms channel regions of the third transistor T3 to the ninth transistor T9, and a first semiconductor layer in a region not shielded by the first conductive layer is made to be conductive. That is, all of the first regions and the second regions of the first plate 31, the third active layer 13 to the ninth active layer 19 are made to be conductive.

Figure 10A:
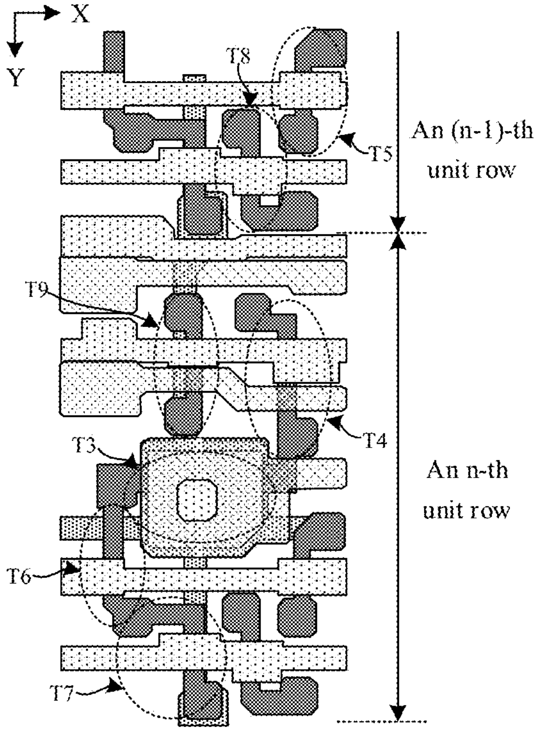
FIGS. 10A and 10B are schematic diagrams of a display substrate after a pattern of a second conductive layer is formed according to the present disclosure.
Figure 10B:
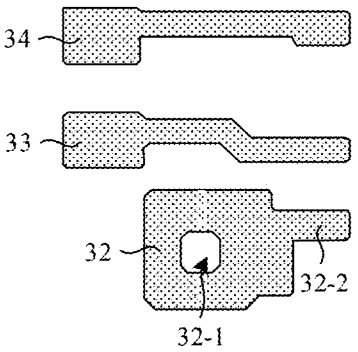

(4) A pattern of a second conductive layer is formed. In an exemplary implementation, forming the pattern of the second conductive layer may include: depositing sequentially a third insulation thin film and a second conductive thin film on the base substrate on which the aforementioned patterns are formed, and the second conductive thin film is patterned through a patterning process to form a third insulation layer that covers the first conductive layer and the pattern of the second conductive layer provided on the third insulation layer, as shown in FIG. 10A and FIG. 10B. FIG. 10B is a schematic plan view of the second conductive layer in FIG. 10A. In an exemplary implementation, the second conductive layer may be referred to as a second gate metal (GATE2) layer.

In an exemplary implementation, the pattern of the second conductive layer of each circuit unit at least includes a second plate 32 of the storage capacitor, a first shield line 33, and a second shield line 34.

In an exemplary embodiment, a profile of second plate 32 may be in a shape of a rectangle, a chamfer may be provided at a corner of the rectangle, an orthographic projection of the second plate 32 on the base substrate is at least overlapped with an orthographic projection of the first plate 31 on the base substrate, the second plate 32 may serve as another plate of the storage capacitor, and the first plate 31 and the second plate 32 constituent the storage capacitor of the pixel drive circuit.

In an exemplary embodiment, the second plate 32 is provided with an opening 32-1 which may have a rectangular shape and may be located in a middle region of the second plate 32, so that the second plate 32 forms an annular structure. The opening 32-1 exposes the third insulation layer covering the first plate 31, and an orthographic projection of the first plate 31 on the base substrate contains an orthographic projection of the opening 32-1 on the base substrate. In an exemplary implementation, the opening 32-1 is configured to accommodate a fifteenth via to be formed subsequently, and the fifteenth via is located within the opening 32-1 and exposes the first plate 31, so that a first connection electrode to be formed subsequently is connected to the first plate 31 through the via.

In an exemplary implementation, a plate block 32-2 may be provided on the second plate 32. The plate block 32-2 may be in a shape of a strip extending along the first direction X, a first end of the plate block 32-2 is connected to an edge of the second plate 32 in the first direction X, and a second end of the plate block 32-2 extends in a direction away from the second plate 32.

In an exemplary embodiment, the first shield line 33 may be in a shape of a straight line or a bending line in which a main body portion extends along the first direction X, the first shield line 33 may be located between the first plate 31 and the second scan signal line 22, and the first shield line 33 is configured as a shield layer of the second transistor T2, shielding the channel region of the second transistor T2, ensuring electrical performance of the oxide second transistor T2, and is also configured to serve as a bottom gate electrode of the second transistor T2.

In an exemplary implementation, the second shield line 34 may be in a shape of a straight line or a bending line in which a main body portion extends along the first direction X, the second shield line 34 may be located between the second scan signal line 22 and the first initial signal line 41, the second shield line 34 is configured to serve as a shield layer of the first transistor T1, shielding the channel region of the first transistor T1, ensuring electrical performance of the oxide first transistor T1, and is also configured to serve as a bottom gate electrode of the first transistor T1.

In an exemplary implementation, the first shield line 33 and the second shield line 34 may be of a non-equal width design, which may not only facilitate a layout of a pixel structure, but also reduce a parasitic capacitance between the signal lines.

Figure 11A:
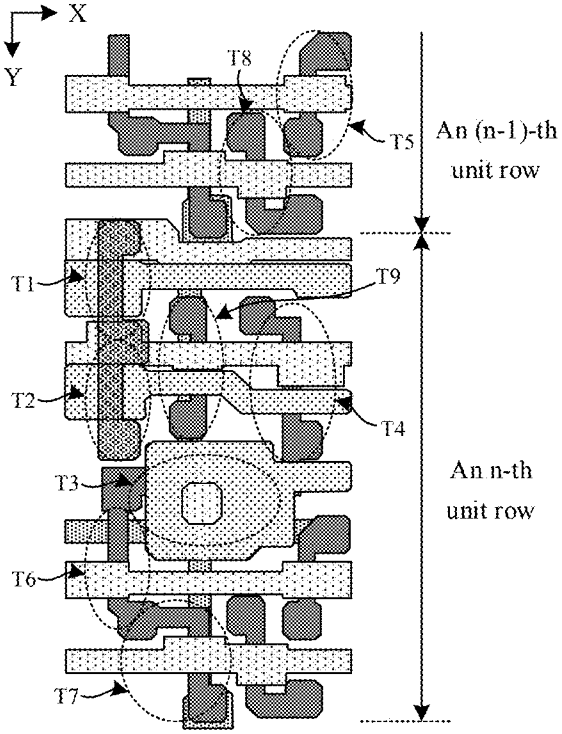
FIG. 11A and FIG. 11B are schematic diagrams of a display substrate after a pattern of a second semiconductor layer is formed according to the present disclosure.
Figure 11B:
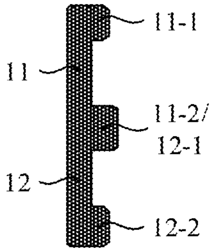

(5) A pattern of a second semiconductor layer is formed. In an exemplary implementation, forming the pattern of the second semiconductor layer may include: depositing a fourth insulation thin film and a second semiconductor thin film sequentially on the base substrate on which the above-mentioned patterns are formed, patterning the second semiconductor thin film through a patterning process to form a fourth insulation layer that covers the base substrate and the pattern of the second semiconductor layer disposed on the fourth insulation layer, as shown in FIG. 11A and FIG. 11B, and FIG. 11B is a schematic plan view of the second conductive layer in FIG. 11A.

In an exemplary implementation, a pattern of a second semiconductor layer of each circuit unit at least includes a first active layer 11 of the first transistor T1 and a second active layer 12 of the second transistor T2.

In an exemplary implementation, the first active layer 11 and the second active layer 12 may be in a shape of a strip in which a body portion extends along the second direction Y, an orthographic projection of the first active layer 11 on the base substrate is at least partially overlapped with an orthographic projection of the second shield line 34 on the base substrate, and an orthographic projection of the second active layer 12 on the base substrate is at least partially overlapped with an orthographic projection of the first shield line 33 on the base substrate.

In an exemplary implementation, a first region 11-1 of the first active layer may be located at a side of the second shield line 34 away from the second plate 32, a second region 12-2 of the second active layer may be located at a side of the first shield line 33 close to the second plate 32, a second region 11-2 of the first active layer is connected to a first region 12-1 of the second active layer, and the second region 11-2 of the first active layer may serve as the first region 12-1 of the second active layer.

In an exemplary implementation, the first active layer 11 and the second active layer 12 may be of an interconnected integral structure.

In an exemplary implementation, the second active layer 12 may be located on a side of the ninth active layer 19 in the opposite direction of the first direction X. Since the fourth active layer 14 is located on a side of the ninth active layer 19 in the first direction X, the ninth active layer 19 may be located between the second active layer 12 and the fourth active layer 14 in the first direction X, that is, a channel region of the ninth transistor T9 is located between the channel region of the second transistor T2 and a channel region of the fourth transistor T4.

In an exemplary implementation, the second semiconductor layer may be made of an oxide, i.e., the eighth transistor T8 is an oxide transistor. In an exemplary implementation, the second semiconductor thin film may be made of Indium Gallium Zinc Oxide (IGZO), wherein electron mobility of the Indium Gallium Zinc Oxide (IGZO) is higher than that of amorphous silicon.

Figure 12A:
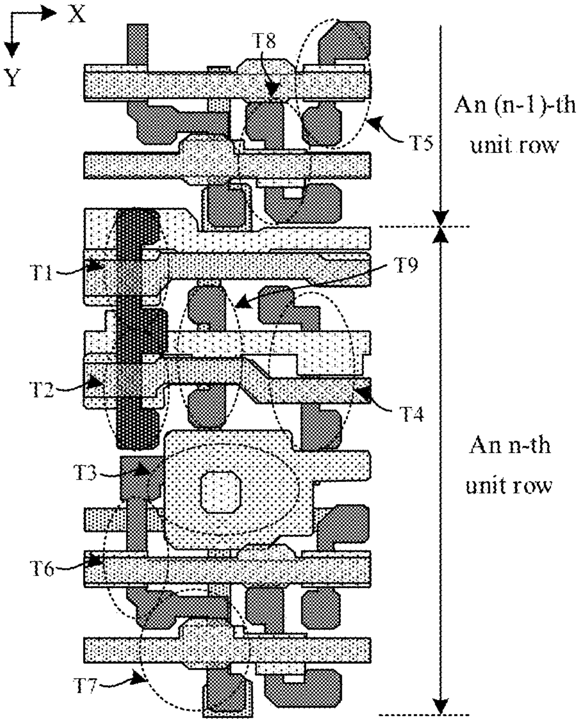
FIG. 12A and FIG. 12B are schematic diagrams of a display substrate after a pattern of a third conductive layer is formed according to the present disclosure.
Figure 12B:
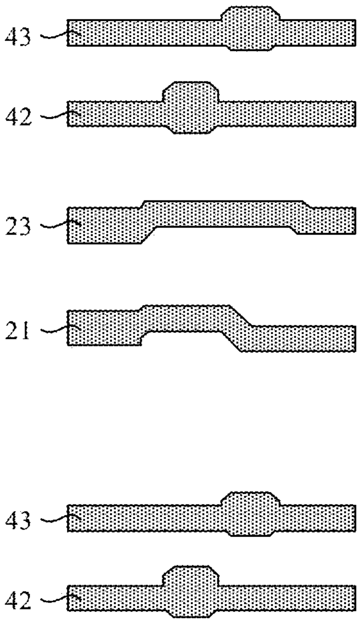

(6) A pattern of a third conductive layer is formed. In an exemplary implementation, forming the pattern of the third conductive layer may include: depositing a fifth insulation thin film and a third conductive thin film sequentially on the base substrate on which the aforementioned patterns are formed, and patterning the third conductive thin film through a patterning process to form a fifth insulation layer covering the second semiconductor layer and the pattern of the third conductive layer disposed on the fifth insulation layer, as shown in FIGS. 12A and 12B, FIG. 12B is a schematic plan view of the third conductive layer in FIG. 12A. In an exemplary implementation, the second conductive layer may be referred to as a third gate metal (GATE3) layer.

In an exemplary implementation, the pattern of the third conductive layer of each circuit unit at least includes the first scan signal line 21, the third scan signal line 23, the second initial signal line 42, and the third initial signal line 43.

In an exemplary implementation, the first scan signal line 21 may be in a shape of a straight line or a bending line in which a main body portion extends along the first direction X, the first scan signal line 21 may be located between the first plate 31 and the second scan signal line 22, and a region where the first scan signal line 21 overlaps with the second active layer may serve as a gate electrode of the second transistor T2.

In an exemplary implementation, an orthographic projection of the first scan signal line 21 on the base substrate is at least partially overlapped with an orthographic projection of the first shield line 33 on the base substrate, and the first scan signal line 21 and the first shield line 33 may be connected to a same signal source, so that the first shield line 33 may serve as a bottom gate electrode of the second transistor T2, and the first scan signal line 21 may serve as a top gate electrode of the second transistor T2, to form the second transistor T2 with a top gate and bottom gate structure.

In an exemplary implementation, the third scan signal line 23 may be in a shape of a straight line or a bending line in which a main body portion extends along the first direction X, the third scan signal line 23 may be located between the second scan signal line 22 and the first initial signal line 41, and a region where the third scan signal line 23 overlaps with the first active layer may serve as a gate electrode of the first transistor T1.

In an exemplary implementation, an orthographic projection of the third scan signal line 23 on the base substrate is at least partially overlapped with an orthographic projection of the second shield line 34 on the base substrate, and the third scan signal line 23 and the second shield line 34 may be connected to a same signal source, so that the second shield line 34 may serve as a bottom gate electrode of the first transistor T1, and the third scan signal line 23 may serve as a top gate electrode of the first transistor T1, to form the first transistor T1 with a top gate and bottom gate structure.

In an exemplary implementation, the second initial signal line 42 may be in a shape of a straight line or a bending line in which a main body portion extends along the first direction X, the second initial signal line 42 may be located at a side of the second light emitting signal line 32 away from the second plate 32, and the second initial signal line 42 of the present unit row is configured to be connected to a first region of the seventh active layer of the pixel drive circuit in the circuit unit of the present unit row through an eighth connection electrode to be formed subsequently.

In an exemplary implementation, an orthographic projection of the second initial signal line 42 on the base substrate is at least partially overlapped with an orthographic projection of the fourth scan signal line 24 on the base substrate, so that the second initial signal line 42 with a constant potential can effectively shield influence of a voltage jump of the fourth scan signal line 24 on the pixel drive circuit.

In an exemplary implementation, the third initial signal line 43 may be in a shape of a straight line or a bending line in which a main body portion extends along the first direction X, the third initial signal line 43 may be located between the second plate 32 and the second initial signal line 42, and the third initial signal line 43 of the present unit row is configured to be connected to a first region of the eighth active layer of the pixel drive circuit in the circuit unit of the next unit row through a ninth connection electrode to be formed subsequently. For example, the third initial signal line 43 of the (n−1)-th unit row is configured to be connected to a first region of the eighth active layer of the pixel drive circuit in the circuit unit of the n-th unit row through a ninth connection electrode to be formed subsequently. As another example, the third initial signal line 43 of the n-th unit row is configured to be connected to a first region of the eighth active layer of the pixel drive circuit in the circuit unit of the (n+1)-th unit row through a ninth connection electrode to be formed subsequently.

In an exemplary implementation, an orthographic projection of the third initial signal line 43 on the base substrate is at least partially overlapped with an orthographic projection of the light emitting signal line 25 on the base substrate, so that the third initial signal line 43 with a constant potential can effectively shield influence of a voltage jump of the light emitting signal line 25 on the pixel drive circuit.

Figure 13:
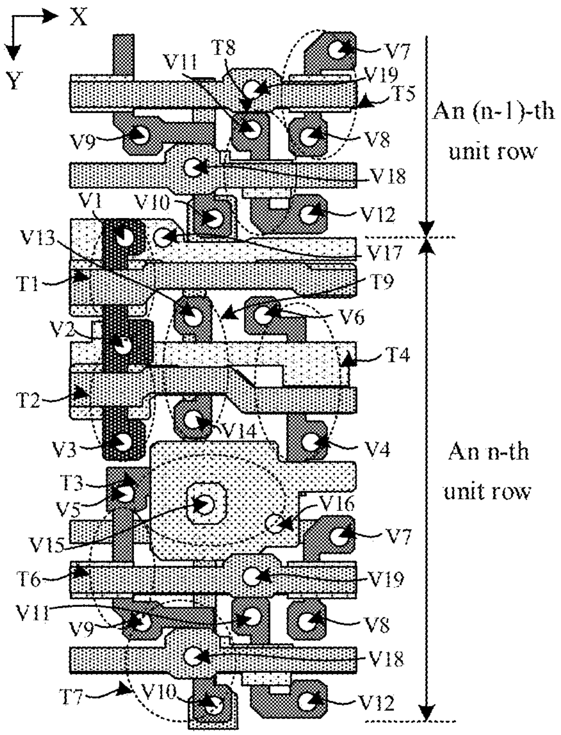
FIG. 13 is a schematic diagram of a display substrate after a pattern of a sixth insulation layer is formed according to the present disclosure.

(7) A pattern of a sixth insulation layer is formed. In an exemplary implementation, forming the pattern of the sixth insulation layer may include: depositing a sixth insulation thin film on the base substrate on which the aforementioned patterns are formed, patterning the fifth insulation thin film using a patterning process to form a sixth insulation layer covering the third conductive layer, wherein a plurality of vias are provided on the sixth insulation layer, as shown in FIG. 13.

In an exemplary implementation, the plurality of vias of each circuit unit at least include a first via V1, a second via V2, a third via V3, a fourth via V4, a fifth via V5, a sixth via V6, a seventh via V7, an eighth via V8, a ninth via V9, a tenth via V10, an eleventh via V11, a twelfth via V12, a thirteenth via V13, a fourteenth via V14, a fifteenth via V15, a sixteenth via V16, a seventeenth via V17, an eighteenth via V18, and a nineteenth via V19.

In an exemplary implementation, an orthographic projection of the first via V1 on the base substrate is within a range of an orthographic projection of a first region of the first active layer on the base substrate, the sixth insulation layer and the fifth insulation layer in the first via V1 are etched away to expose a surface of the first region of the first active layer, and the first via V1 is configured such that a seventh connection electrode to be formed subsequently is connected with the first region of the first active layer through the first via V1.

In an exemplary implementation, an orthographic projection of the second via V2 on the base substrate is within a range of an orthographic projection of a second region of the first active layer (also a first region of the second active layer) on the base substrate, the sixth insulation layer and the fifth insulation layer within the second via V2 are etched away to expose a surface of the second region of the first active layer (also the first region of the second active layer), and the second via V2 is configured such that a tenth connection electrode to be formed subsequently is connected with the second region of the first active layer (also the first region of the second active layer) through the second via V2.

In an exemplary implementation, an orthographic projection of the third via V3 on the base substrate is within a range of an orthographic projection of the second region of the second active layer on the base substrate, the sixth insulation layer and the fifth insulation layer within the third via V3 are etched away to expose a surface of the second region of the second active layer, and the third via V3 is configured such that a second connection electrode to be formed subsequently is connected to the second region of the second active layer through the third via V3.

In an exemplary implementation, an orthographic projection of the fourth via V4 on the base substrate is within a range of an orthographic projection of a first region of the third active layer (also a second region of the fourth active layer) on the base substrate, the sixth insulation layer, the fifth insulation layer, the fourth insulation layer, the third insulation layer and the second insulation layer within the fourth via V4 are etched away to expose a surface of the first region of the third active layer (also the second region of the fourth active layer), and the fourth via V4 is configured such that a fifth connection electrode to be formed subsequently is connected with the first region of the third active layer (also the second region of the fourth active layer) through the fourth via V4.

In an exemplary embodiment, an orthographic projection of the fifth via V5 on the base substrate is within an orthographic projection of the second region of the third active layer (also a first region of the sixth active layer) on the base substrate, the sixth insulation layer, the fifth insulation layer, the fourth insulation layer, the third insulation layer and the second insulation layer within the fifth via V5 are etched away to expose a surface of the second region of the third active layer (also the first region of the sixth active layer), and the fifth via V5 is configured such that a second connection electrode to be formed subsequently is connected to the second region of the third active layer (also the first region of the sixth active layer) through the fifth via V5.

In an exemplary implementation, an orthographic projection of the sixth via V6 on the base substrate is within a range of an orthographic projection of a first region of the fourth active layer on the base substrate, the sixth insulation layer, the fifth insulation layer, the fourth insulation layer, the third insulation layer and the second insulation layer within the sixth via V6 are etched away to expose a surface of the first region of the fourth active layer, and the sixth via V6 is configured such that a third connection electrode to be formed subsequently is connected to the first region of the fourth active layer through the sixth via V6.

In an exemplary implementation, an orthographic projection of the seventh via V7 on the base substrate is within a range of an orthographic projection of a first region of the fifth active layer on the base substrate, the sixth insulation layer, the fifth insulation layer, the fourth insulation layer, the third insulation layer and the second insulation layer within the seventh via V7 are etched away to expose a surface of the first region of the fifth active layer, and the seventh via V7 is configured such that a fourth connection electrode to be formed subsequently is connected to the first region of the fifth active layer through the seventh via V7.

In an exemplary implementation, pixel drive circuits of two circuit units adjacent in the first direction X may be substantially mirror-symmetrical with respect to a column reference line, the two adjacent circuit units may share one seventh via V7, and the column reference line may be a straight line located between the two adjacent circuit units and extending along the second direction Y.

In an exemplary implementation, an orthographic projection of the eighth via V8 on the base substrate is within a range of an orthographic projection of a second region of the fifth active layer on the base substrate, the sixth insulation layer, the fifth insulation layer, the fourth insulation layer, the third insulation layer, and the second insulation layer within the eighth via V8 are etched away to expose a surface of the second region of the fifth active layer, and the eighth via V8 is configured such that the fifth connection electrode to be formed subsequently is connected with the second region of the fifth active layer through the eighth via V8.

In an exemplary embodiment, an orthographic projection of the ninth via V9 on the base substrate is within an orthographic projection of a second region of the sixth active layer (also the second region of the seventh active layer) on the base substrate, the sixth insulation layer, the fifth insulation layer, the fourth insulation layer, the third insulation layer and the second insulation layer within the ninth via V9 are etched away to expose a surface of the second region of the sixth active layer (also the second region of the seventh active layer), and the ninth via V9 is configured such that a sixth connection electrode to be formed subsequently is connected to the second region of the sixth active layer (also the second region of the seventh active layer) through the ninth via V9.

In an exemplary implementation, an orthographic projection of the tenth via V10 on the base substrate is within a range of an orthographic projection of a first region of the seventh active layer on the base substrate, the sixth insulation layer, the fifth insulation layer, the fourth insulation layer, the third insulation layer and the second insulation layer within the tenth via V10 are etched away to expose a surface of the first region of the seventh active layer, and the tenth via V10 is configured such that an eighth connection electrode to be formed subsequently is connected to the first region of the seventh active layer through the tenth via V10.

In an exemplary embodiment, an orthographic projection of an eleventh via V11 on the base substrate is within an orthographic projection of a first region of the eighth active layer on the base substrate, the sixth insulation layer, the fifth insulation layer, the fourth insulation layer, the third insulation layer and the second insulation layer within the eleventh via V11 are etched away to expose a surface of the first region of the eighth active layer, and the eleventh via V11 is configured such that a ninth connection electrode to be formed subsequently is connected to the first region of the eighth active layer through the eleventh via V11.

In an exemplary implementation, an orthographic projection of the twelfth via V12 on the base substrate is within a range of an orthographic projection of a second region of the eighth active layer on the base substrate, the sixth insulation layer, the fifth insulation layer, the fourth insulation layer, the third insulation layer and the second insulation layer within the twelfth via V12 are etched away to expose a surface of the second region of the eighth active layer, and the twelfth via V12 is configured such that a fifth connection electrode to be formed subsequently is connected to the second region of the eighth active layer through the twelfth via V12.

In an exemplary implementation, an orthographic projection of the thirteenth via V13 on the base substrate is within a range of an orthographic projection of a first region of the ninth active layer on the base substrate, the sixth insulation layer, the fifth insulation layer, the fourth insulation layer, the third insulation layer, and the second insulation layer in the thirteenth via V13 are etched away to expose a surface of the first region of the ninth active layer, and the thirteenth via V13 is configured such that a tenth connection electrode to be formed subsequently is connected with the first region of the ninth active layer through the thirteenth via V13.

In an exemplary implementation, an orthographic projection of the fourteenth via V14 on the base substrate is within a range of an orthographic projection of a second region of the ninth active layer on the base substrate, the sixth insulation layer, the fifth insulation layer, the fourth insulation layer, the third insulation layer, and the second insulation layer within the fourteenth via V14 are etched away to expose a surface of the second region of the ninth active layer, and the fourteenth via V14 is configured such that the first connection electrode to be formed subsequently is connected with the second region of the ninth active layer through the fourteenth via V14.

In an exemplary implementation, an orthographic projection of the fifteenth via V15 on the base substrate is located within a range of an orthographic projection of the opening 32-1 on the base substrate, the sixth insulation layer, the fifth insulation layer, the fourth insulation layer, and the third insulation layer in the fifteenth via V15 are etched away to expose a surface of the first plate 31, and the fifteenth via V15 is configured such that the first connection electrode to be formed subsequently is connected with the first plate 31 through the fifteenth via V15.

In an exemplary implementation, an orthographic projection of the sixteenth via V16 on the base substrate is within a range of an orthographic projection of the second plate 32 on the base substrate, the sixth insulation layer, the fifth insulation layer, and the fourth insulation layer within the sixteenth via V16 are etched away to expose a surface of the second plate 32, and the sixteenth via V16 is configured such that a fourth connection electrode to be formed subsequently is connected with the second plate 32 through the sixteenth via V16.

In an exemplary implementation, an orthographic projection of the seventeenth via V17 on the base substrate is within a range of an orthographic projection of the first initial signal line 41 on the base substrate, the sixth insulation layer, the fifth insulation layer, the fourth insulation layer, and the third insulation layer in the seventeenth via V17 are etched away to expose a surface of the first initial signal line 41, and the seventeenth via V17 is configured such that a seventh connection electrode to be formed subsequently is connected with the first initial signal line 41 through the seventeenth via V17.

In an exemplary implementation, an orthographic projection of the eighteenth via V18 on the base substrate is within a range of an orthographic projection of the second initial signal line 42 on the base substrate, the sixth insulation layer within the eighteenth via V18 is etched away to expose a surface of the second initial signal line 42, and the eighteenth via V18 is configured such that an eighth connection electrode to be formed subsequently is connected with the second initial signal line 42 through the eighteenth via V18.

In an exemplary implementation, an orthographic projection of the nineteenth via V19 on the base substrate is within a range of an orthographic projection of the third initial signal line 43 on the base substrate, the sixth insulation layer in the nineteenth via V19 is etched away to expose a surface of the third initial signal line 43, and the nineteenth via V19 is configured such that a ninth connection electrode to be formed subsequently is connected with the third initial signal line 43 through the nineteenth via V19.

Figure 14A:
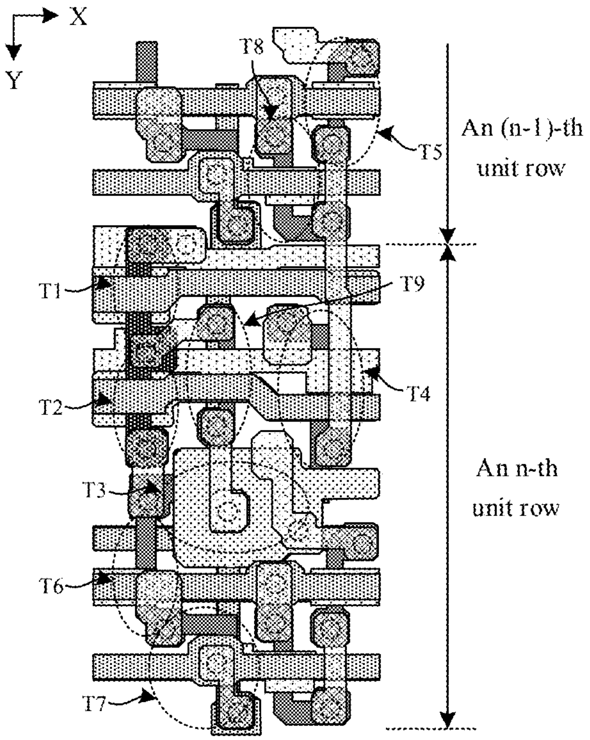
FIG. 14A and FIG. 14B are schematic diagrams of a display substrate after a pattern of a fourth conductive layer is formed according to the present disclosure.
Figure 14B:
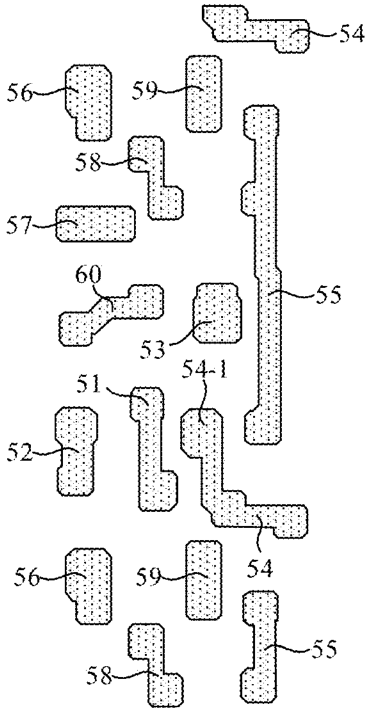

(8) A pattern of a fourth conductive layer is formed. In an exemplary implementation, forming the pattern of the fourth conductive layer may include: depositing a fourth conductive thin film on the base substrate on which the aforementioned patterns are formed, and patterning the fourth conductive thin film through a patterning process to form the fourth conductive layer disposed on the sixth insulation layer, as shown in FIG. 14A and FIG. 14B, and FIG. 14B is a schematic plan view of the fourth conductive layer in FIG. 14A. In an exemplary implementation, the fourth conductive layer may be referred to as a first source-drain metal (SD1) layer.

In an exemplary implementation, the fourth conductive layer of each circuit unit at least includes a first connection electrode 51, a second connection electrode 52, a third connection electrode 53, a fourth connection electrode 54, a fifth connection electrode 55, a sixth connection electrode 56, a seventh connection electrode 57, an eighth connection electrode 58, a ninth connection electrode 59, and a tenth connection electrode 60.

In an exemplary implementation, the first connection electrode 51 may be in a shape of a strip in which a main body portion extends along the second direction Y, a first end of the first connection electrode 51 is connected to the second region of the ninth active layer through the fourteenth via V14, and a second end of the first connection electrode 51, after extending along the second direction Y, is connected to the first plate 31 through the fifteenth via V15. In an exemplary implementation, since the first plate 31 simultaneously serves as the gate electrode of the third transistor T3, the first connection electrode 51 enables a gate electrode of the third transistor T3, a second electrode of the ninth transistor T9, and the first plate 31 to have a same potential and form a first node N1 of the pixel drive circuit.

In an exemplary implementation, the second connection electrode 52 may be in a shape of a strip in which a main body portion extends along the second direction Y, a first end of the second connection electrode 52 is connected to the second region of the second active layer through the third via V3, and a second end of the second connection electrode 52, after extending along the second direction Y, is connected to the second region of the third active layer (also the first region of the sixth active layer) through the fifth via V5. In an exemplary implementation, the second connection electrode 52 enables the second electrode of the second transistor T2, the second electrode of the third transistor T3, and the first electrode of the sixth transistor T6 to have a same potential and form a third node N3 of the pixel drive circuit.

In an exemplary implementation, the third connection electrode 53 may be in a shape of a block (such as a rectangle), the third connection electrode 53 is connected to the first region of the fourth active layer through the sixth via V6, and the third connection electrode 53 is configured to be connected to the data signal line to be formed subsequently.

In an exemplary implementation, the fourth connection electrode 54 may have a shape of a "L", a first end of the fourth connection electrode 54 is connected to the first region of the fifth active layer through the seventh via V7, and a second end of the fourth connection electrode 54 is connected to the second plate 32 through the sixteenth via V16, thus it is achieved that a first electrode of the fifth transistor T5 and the second plate 32 of the storage capacitor in the circuit unit have a same potential.

In an exemplary implementation, pixel drive circuits of two adjacent circuit units in the first direction X may be substantially mirror-symmetrical with respect to the column reference line, and the fourth connection electrodes 54 of the two adjacent circuit units may be of an interconnected integral structure, and are connected to the first regions of the fifth active layers of the two circuit units through a shared seventh via V7.

In an exemplary implementation, a power supply connection block 54-1 is provided on the fourth connection electrode 54, the power supply connection block 54-1 is dispose on a side of the second end of the fourth connection electrode 54 away from the first end, and the power supply connection block 54-1 is configured to be connected to a first power supply line to be formed subsequently.

In an exemplary implementation, since the fifth active layer of the pixel drive circuit in the present unit row is disposed in the circuit unit of the previous unit row, a first end of the fourth connection electrode 54 in the present unit row is connected to the first region of the fifth active layer of the pixel drive circuit in the next unit row, and a second end of the fourth connection electrode 54 is connected to the second plate 32 of the pixel drive circuit in the present unit row. For example, the fourth connection electrode 54 of the pixel drive circuit in the n-th unit row has a first end connected to the first region of the fifth active layer of the pixel drive circuit in the (n+1)-th unit row, and a second end connected to the second plate 32 of the pixel drive circuit in the n-th unit row. As another example, the fourth connection electrode 54 in the (n−1)-th unit row has a first end connected to the first region of the fifth active layer of the pixel drive circuit in the n-th unit row, and a second end connected to the second plate 32 of the pixel drive circuit in the (n−1)-th unit row.

In an exemplary implementation, the fifth connection electrode 55 may be in a shape of a strip in which a main body portion extends along the second direction Y, a first end of the fifth connection electrode 55 is connected to the second region of the fifth active layer through the eighth via V8, a second end of the fifth connection electrode 55, after extending along the second direction Y, is connected to the first region of the third active layer (also the second region of the fourth active layer) through the fourth via V4, and a region between the first end and the second end of the fifth connection electrode 55 is connected to the second region of the eighth active layer through the twelfth via V12. In an exemplary implementation, the fifth connection electrode 55 enables a first electrode of the third transistor T3, a second electrode of the fourth transistor T4, a second electrode of the fifth transistor T5, and a second electrode of the eighth transistor T8 to have a same potential and form a second node N2 of the pixel drive circuit. In an exemplary implementation, the fifth connection electrode 55 may serve as a second node electrode of the present disclosure.

In an exemplary implementation, since the fifth active layer of the pixel drive circuit in the present unit row is disposed in the circuit unit of the previous unit row, the fifth connection electrode 55 in the present unit row is disposed across the two circuit units. A position of a via where the fifth connection electrode 55 is connected to the second region of the fifth active layer and the second region of the eighth active layer is located in the circuit unit of the previous unit row, and a position of a via where the fifth connection electrode 55 is connected to the first region of the third active layer (also the second region of the fourth active layer) is located in the circuit unit of the present unit row. For example, a position of a via where the fifth connection electrode 55 of the pixel drive circuit in the n-th unit row is connected to the second region of the fifth active layer and the second region of the eighth active layer of the pixel drive circuit in the n-th unit row is located in the circuit unit in the (n−1)-th unit row, a position of a via where the fifth connection electrode 55 of the pixel drive circuit in the n-th unit row is connected to the first region of the third active layer (also the second region of the fourth active layer) of the pixel drive circuit in the n-th unit row is located in the circuit unit in the n-th unit row. As another example, a position of a via where the fifth connection electrode 55 in the (n+1)-th unit row is connected to the second region of the fifth active layer and the second region of the eighth active layer of the pixel drive circuit in the (n+1)-th unit row is located in the circuit unit in the n-th unit row, and a position of a via where the fifth connection electrode 55 in the (n+1)-th unit row is connected to the first region of the third active layer of the pixel drive circuit in the (n+1)-th unit row (also the second region of the fourth active layer) is located in the circuit unit in the (n+1)-th unit row.

In an exemplary implementation, an orthographic projection of the fifth connection electrode 55 (the second node N2 of the pixel drive circuit) on the base substrate is at least partially overlapped with orthographic projections of the first initial signal line 41 and the second initial signal line 42 on the base substrate, so that the first initial signal line 41 and the second initial signal line 42 with a constant potential can effectively stabilize the potential of the second node N2.

In an exemplary implementation, an orthographic projection of the fifth connection electrode 55 on the base substrate is at least partially overlapped with orthographic projections of the first scan signal line 21, the second scan signal line 22, the third scan signal line 23, and the fourth scan signal line 24 on the base substrate. Since the sixth stage in the driving timing of the pixel drive circuit allows a power supply voltage output by the first power supply line to be provided to the second node N2, an influence of each scan line on the second node N2 can be reset, and the light emitting stability in the light emitting stage is improved.

In an exemplary implementation, the sixth connection electrode 56 may be in a shape of a block (such as a rectangle), and the sixth connection electrode 56 is connected to the second region of the sixth active layer (also the second region of the seventh active layer) through the ninth via V9. In an exemplary implementation, the sixth connection electrode 56 is configured to be connected with an anode connection electrode to be formed subsequently to form a fourth node N4 of the pixel drive circuit.

In an exemplary implementation, the seventh connection electrode 57 may be in a shape of a strip in which a main body portion extends along the first direction X, a first end of the seventh connection electrode 57 is connected to the first region of the first active layer through the first via V1, and a second end of the seventh connection electrode 57 is connected to the first initial signal line 41 through the seventeenth via V17. In an exemplary implementation, the seventh connection electrode 57 realizes a connection between the first initial signal line 41 and the first electrode of the first transistor T1, and the first initial signal line 41 can write the transmitted first initial signal to the first electrode of the first transistor T1.

In an exemplary embodiment, the eighth connection electrode 58 may be in a shape of a strip in which a main body portion extends along the second direction Y, a first end of the eighth connection electrode 58 is connected to the first region of the seventh active layer through the tenth via V10, and a second end of the eighth connection electrode 58 is connected to the second initial signal line 42 through the eighteenth via V18. In an exemplary implementation, the eighth connection electrode 58 realizes a connection between the second initial signal line 42 and the first electrode of the seventh transistor T7, and the second initial signal line 42 may write the transmitted second initial signal to the first electrode of the seventh transistor T7.

In an exemplary implementation, the ninth connection electrode 59 may be in a shape of a strip in which a main body portion extends along the second direction Y, a first end of the ninth connection electrode 59 is connected to the first region of the eighth active layer through the eleventh via V11, and a second end of the ninth connection electrode 59 is connected to the third initial signal line 43 through the nineteenth via V19. In an exemplary implementation, the ninth connection electrode 59 realizes a connection between the third initial signal line 43 and the first electrode of the eighth transistor T8, and the third initial signal line 43 may write the transmitted third initial signal to the first electrode of the eighth transistor T8.

In an exemplary implementation, since the eighth active layer of the pixel drive circuit in the present unit row is disposed in the circuit unit of the previous unit row, a first end of the ninth connection electrode 59 in the present unit row is connected to the first region of the eighth active layer of the pixel drive circuit in the next unit row, and a second end of the ninth connection electrode 59 is connected to the third initial signal line 43 in the present unit row. For example, the ninth connection electrode 59 in the (n−1)-th unit row has a first end which is connected to the first region of the eighth active layer of the pixel drive circuit in the n-th unit row, and a second end which is connected to the third initial signal line 43 in the (n−1)-th unit row. As another example, the ninth connection electrode 59 of the pixel drive circuit in the n-th unit row has a first end which is connected to the first region of the eighth active layer of the pixel drive circuit in the (n+1)-th unit row, and a second end which is connected to the third initial signal line 43 in the n-th unit row.

In an exemplary implementation, the tenth connection electrode 60 may be in a shape of a strip in which a main body portion extends along the first direction X, a first end of the tenth connection electrode 60 is connected to the second region of the first active layer (also the first region of the second active layer) through the second via V2, and a second end of the tenth connection electrode 60 is connected to the first region of the ninth active layer through the thirteenth via V13. In an exemplary implementation, the tenth connection electrode 60 realizes the connection of the second electrode of the first transistor T1, the first electrode of the second transistor T2, and the first electrode of the ninth transistor T9 to form a fifth node N5 of the pixel drive circuit.

Figure 15:
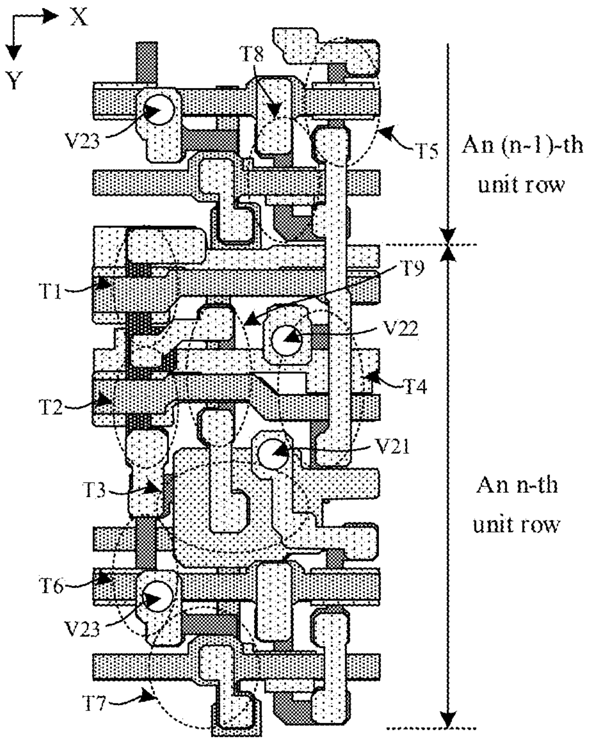
FIG. 15 is a schematic diagram of a display substrate after a pattern of a first planarization layer is formed according to the present disclosure.

(9) A pattern of a first planarization layer is formed. In an exemplary implementation, forming the pattern of the first planarization layer may include: coating a first planarization thin film on the base substrate on which the aforementioned patterns are formed, patterning the first planarization thin film using a patterning process to form a first planarization layer covering the pattern of the fourth conductive layer, wherein the first planarization layer is provided with a plurality of vias, as shown in FIG. 15.

In an exemplary embodiment, the plurality of vias in each circuit unit at least includes a twenty-first via V21, a twenty-second via V22, and a twenty-third via V23.

In an exemplary implementation, an orthographic projection of the twenty-first via V21 on the base substrate is within a range of an orthographic projection of the power supply connection block 54-1 of the fourth connection electrode 54 on the base substrate, the first planarization layer in the twenty-first via V21 is etched away to expose a surface of the power supply connection block 54-1, and the twenty-first via V21 is configured such that a first power supply line to be formed subsequently is connected with the power supply connection block 54-1 through the twenty-first via V21.

In an exemplary implementation, an orthographic projection of the twenty-second via V22 on the base substrate is within a range of an orthographic projection of the third connection electrode 53 on the base substrate, the first planarization layer in the twenty-second via V22 is etched away to expose a surface of the third connection electrode 53, and the twenty-second via V22 is configured such that the data signal line to be formed subsequently is connected with the third connection electrode 53 through the twenty-second via V22.

In an exemplary implementation, an orthographic projection of the twenty-third via V23 on the base substrate is within a range of an orthographic projection of the sixth connection electrode 56 on the base substrate, the first planarization layer in the twenty-third via V23 is etched away to expose a surface of the sixth connection electrode 56, and the twenty-third via V23 is configured such that an anode connection electrode to be formed subsequently is connected to the sixth connection electrode 56 through the twenty-third via V23.

Figure 16A:
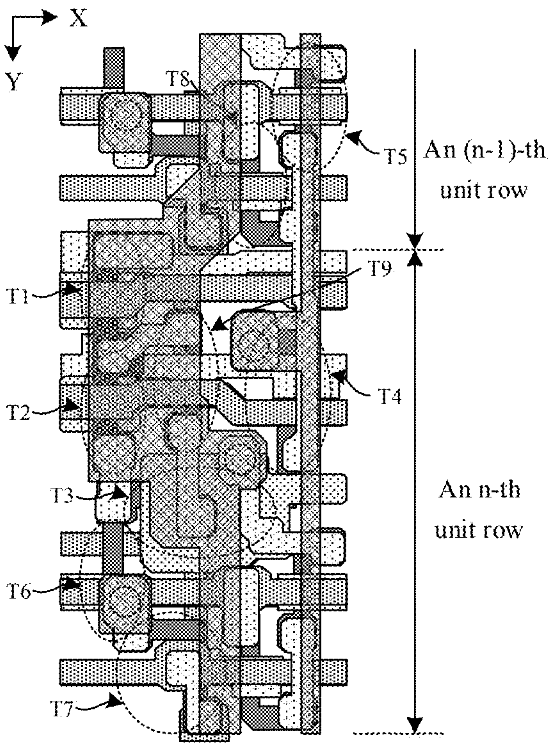
FIG. 16A and FIG. 16B are schematic diagrams of a display substrate after a pattern of a fifth conductive layer is formed according to the present disclosure.
Figure 16B:
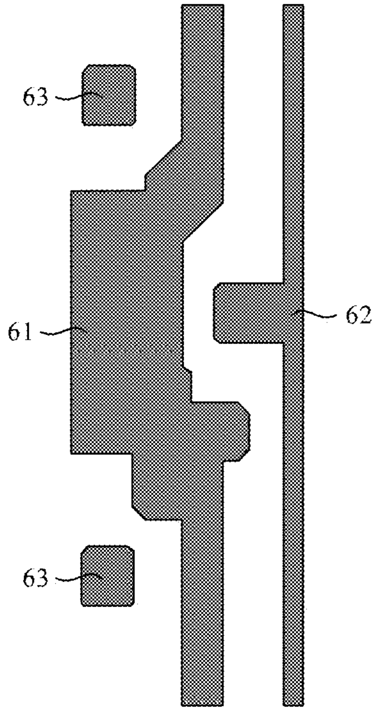

(10) A pattern of a fifth conductive layer is formed. In an exemplary implementation, forming the pattern of the fifth conductive layer may include: depositing a fifth conductive thin film on the base substrate on which the above-mentioned patterns are formed, and patterning the fifth conductive thin film using a patterning process to form the fifth conductive layer disposed on the first planarization layer, as shown in FIG. 16A and FIG. 16B, and FIG. 16B is a schematic plan view of the fifth conductive layer in FIG. 16A. In an exemplary implementation, the fifth conductive layer may be referred to as a second source-drain metal (SD2) layer.

In an exemplary embodiment, the fifth conductive layer of each circuit unit includes at least a first power supply line 61, a data signal line 62 and an anode connection electrode 63.

In an exemplary implementation, the first power supply line 61 may be in a shape of a straight line or a bending line in which a main body portion extends along the second direction Y, and the first power supply line 61 is connected to the power supply connection block 54-1 through the twenty-first via V21. Since the power supply connection block 54-1 is connected to the fourth connection electrode 54, the fourth connection electrode 54 is connected to the first electrode of the fifth transistor T5 and the second plate 32 of the storage capacitor respectively, it is realized that the first power supply line 61 writes a first power supply signal to the fifth transistor T5 and the second plate 32 of the storage capacitor.

In an exemplary implementation, the first power supply line 61 may be a bending line with unequal widths, which may not only facilitate a layout of a pixel structure, but also reduce a parasitic capacitance between the first power supply line and the data signal line.

In an exemplary embodiment, an orthographic projection of the first power supply line 61 on the base substrate at least partially overlaps with an orthographic projection of the first active layer on the base substrate, the orthographic projection of the first power supply line 61 on the base substrate at least partially overlaps with an orthographic projection of the second active layer on the base substrate, so that the first power supply line 61 may shield the first active layer and the second active layer, may block light emitted by a light emitting device and light reflected by a film layer from irradiating the first transistor T1 of oxide and the second transistor T2 of oxide, may prevent the oxide transistor from characteristic drift due to illumination, thus improving electrical characteristics of the oxide transistor.

In an exemplary embodiment, an orthographic projection of the first power supply line 61 on the base substrate at least partially overlaps with an orthographic projection of the first connection electrode 51 on the base substrate, and the first power supply line 61 with a constant potential can effectively shield from an influence a the data voltage jump and other signals on the first node N1 in the pixel drive circuit, avoid the influence of the data voltage jump and other signals on the potential of the first node N1, and improve driving performance of the pixel drive circuit.

In an exemplary implementation, the orthographic projection of the first power supply line 61 on the base substrate is at least partially overlapped with orthographic projections of the second connection electrode 52 and the tenth connection electrode 60 on the base substrate, and the first power supply line 61 with a constant potential can effectively shield from the influence of the data voltage jump and other signals on each node in the pixel drive circuit, avoid the influence of the data voltage jump and other signals on the potential of the node, and improve the driving performance of the pixel drive circuit.

In the exemplary implementation, the data signal line 62 may be in a shape of a straight line or a bending line in which main body portion extends along the second direction Y, and the data signal line 62 is connected to the third connection electrode 53 through the twenty-second via V22. Since the third connection electrode 53 is connected to the first region of the fourth active layer through a via, connection between the data signal line 62 and the first electrode of the fourth transistor T4 is achieved, and the data signal line 62 can write a data signal to the first electrode of the fourth transistor T4.

In an exemplary implementation, the anode connection electrode 63 may be in a shape of a block (e.g., a rectangle), the anode connection electrode 63 is connected to the sixth connection electrode 56 through the twenty-third via V23, and the anode connection electrode 63 is configured to be connected to an anode to be formed subsequently. Since the sixth connection electrode 56 is connected to the second region of the sixth active layer and a second region of the seventh active layer through a via, connection between the anode to be formed subsequently and the second electrode of the sixth transistor T6 as well as the second electrode of the seventh transistor T7 can be achieved, and the pixel drive circuit can drive the light emitting device to emit light.

A subsequent process may include forming a second planarization layer covering the pattern of the fifth conductive layer, an anode via is provided on the second planarization layer, the anode via exposes an anode connection electrode, and the anode via is configured such that the anode to be formed subsequently is connected to the anode connection electrode through the via.

So far, a drive circuit layer has been prepared on the base substrate. In a plane parallel to the display substrate, the drive circuit layer may include a plurality of circuit units, each circuit unit may include a pixel drive circuit, and a first scan signal line, a second scan signal line, a third scan signal line, a fourth scan signal line, a light emitting signal line, a first initial signal line, a second initial signal line, a third initial signal line, a first power supply line, and a data signal line connected to the pixel drive circuit. In a plane perpendicular to the display substrate, the drive circuit layer may include a shield layer, a first insulation layer, a first semiconductor layer, a second insulation layer, a first conductive layer, a third insulation layer, a second conductive layer, a fourth insulation layer, a second semiconductor layer, a fifth insulation layer, a third conductive layer, a sixth insulation layer, a fourth conductive layer, a first planarization layer, a fifth conductive layer and a second planarization layer arranged sequentially on the base substrate. The shield layer may at least include a shield electrode. The first semiconductor layer may at least include active layers of the third transistor to the ninth transistor. The first conductive layer may at least include the second scan signal line, the fourth scan signal line, the light emitting signal line, the first initial signal line, and a first plate of the storage capacitor. The second conductive layer at least may include a first shield line, a second shield line, and a second plate of the storing storage capacitor. The second semiconductor layer at least may include active layers of the first transistor and the second transistor. The third conductive layer may at least include the first scan signal line, the third scan signal line, the second initial signal line, and the third initial signal line. The fourth conductive layer may at least include a plurality of connection electrodes, and the fifth conductive layer may at least include the first power supply line, the data signal line, and the anode connection electrode.

In an exemplary implementation, the base substrate may be a flexible substrate, or a rigid substrate. The rigid substrate may include, but is not limited to, one or more of glass and quartz. The flexible substrate may be made of, but is not limited to, one or more of polyethylene terephthalate, ethylene terephthalate, polyether ether ketone, polystyrene, polycarbonate, polyarylate, polyarylester, polyimide, polyvinyl chloride, polyethylene, and textile fibers. In an exemplary implementation, the flexible base substrate may include a first flexible material layer, a first inorganic material layer, a semiconductor layer, a second flexible material layer, and a second inorganic material layer which are stacked. Materials of the first flexible material layer and the second flexible material layer may be Polyimide (PI), Polyethylene Terephthalate (PET), or a surface-treated polymer soft film, etc., and materials of the first inorganic material layer and the second inorganic material layer may be Silicon Nitride (SiNx), Silicon Oxide (SiOx), or the like, for improving water and oxygen resistance of the base substrate. The first inorganic material layer and the second inorganic material layer may also be referred to as barrier layers, and a material of the semiconductor layer may be amorphous silicon (a-si).

In an exemplary implementation, the first conductive layer, the second conductive layer, the third conductive layer, the fourth conductive layer, and the fifth conductive layer may be made of a metal material, such as any one or more of Argentum (Ag), Copper (Cu), Aluminum (Al), and Molybdenum (Mo), or an alloy material of the aforementioned metals, such as an Aluminum Neodymium alloy (AlNd) or a Molybdenum Niobium alloy (MoNb), and may be of a single-layer structure or a multi-layer composite structure, such as Mo/Cu/Mo. The first insulation layer, the second insulation layer, the third insulation layer, the fourth insulation layer, the fifth insulation layer, and the sixth insulation layer may be made of any one or more of Silicon Oxide (SiOx), Silicon Nitride (SiNx), and Silicon OxyNitride (SiON), and may be a single layer, multiple layers, or a composite layer. The first planarization layer and the second planarization layer may be made of an organic material, such as resin.

In an exemplary implementation, after the drive circuit layer has been prepared, a light emitting structure layer may be prepared on the drive circuit layer at first, and an encapsulation structure layer may then be prepared on the light emitting structure layer, which will not be described further here.

A pixel drive circuit of a display substrate adopts a structure of 8T1C, the first transistor T1 and the second transistor T2 are oxide transistors, the third transistor T3 to the eighth transistor T8 are low temperature poly silicon transistors, and the first node N1 of the pixel drive circuit is respectively connected to a second electrode of the first transistor T1, a first electrode of the second transistor T2, a gate electrode of the third transistor T3 and a first end of the storage capacitor C. During a product reliability test, the display substrate has a lateral stripe defect. Through research, it is found that occurrence of the lateral stripe defect is due to a characteristic shift of the oxide second transistor T2. In a product reliability test, long-term circuit bias voltage and high temperature will cause the characteristic shift of the oxide second transistor T2, especially a shift of the threshold voltage Vth, while the pixel drive circuit is very sensitive to changes in the characteristics of the second transistor T2, especially a change in the threshold voltage Vth, and the shift of the threshold voltage Vth of the second transistor T2 will cause fluctuations in a potential of the gate electrode (the first node N1) of the drive transistor. Smaller fluctuations can cause larger changes in the light emitting current, which in turn leads to the lateral stripe defect. The phenomenon of the lateral stripe defect is more severe at low brightness and low gray scales.

In the display substrate according to an embodiment of the present disclosure, by providing the low temperature poly silicon ninth transistor T9 between gate electrodes of the oxide transistor and the drive transistor, the fluctuation in the potential of the gate electrode of the drive transistor due to changes in the characteristics of the second transistor T2 can be effectively avoided, and the lateral stripe defect can be improved or eliminated. The pixel drive circuit of the display substrate according to the present disclosure adopts a structure of 9T1C, which adds a poly silicon ninth transistor T9 on the basis of the structure of 8T1C, and the ninth transistor T9 is disposed between the gate electrode of the drive transistor and the second electrode of the first transistor T1 and the first electrode of the second transistor T2, isolating the gate electrode of the drive transistor from the oxide first transistor T1 and the oxide second transistor T2. Since the characteristic of the poly silicon ninth transistor T9 is relatively stable, and the ninth transistor T9 is turned off earlier than the second transistor T2 in the fourth stage, the influence of the changes in the characteristics of the second transistor T2 on the potential of the gate electrode of the drive transistor is effectively eliminated, and a change in the light emitting current is avoided, thus effectively improving or eliminating the lateral stripe defect.

Figure 17:
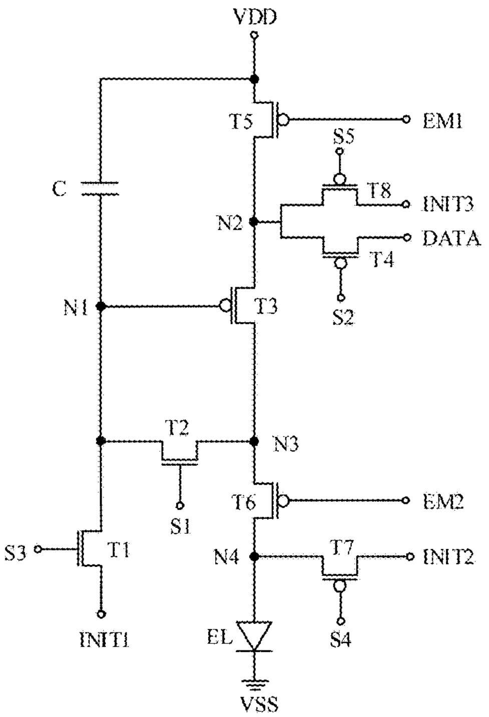
FIG. 17 is an equivalent circuit diagram of another pixel drive circuit according to an exemplary embodiment of the present disclosure.

FIG. 17 is an equivalent circuit diagram of another pixel drive circuit according to an exemplary embodiment of the present disclosure. As shown in FIG. 17, the pixel drive circuit has a structure of 8T1C and may include eight transistors (a first transistor T1 to an eighth transistor T8) and one storage capacitor, and each pixel drive circuit is connected to twelve signal lines (a first scan signal line S1, a second scan signal line S2, a third scan signal line S3, a fourth scan signal line S4, a fifth scan signal line S5, a first light emitting signal line EM1, a second light emitting signal line EM2, a first initial signal line INIT1, a second initial signal line INIT2, a third initial signal line INIT3, a data signal line DATA, and a first power supply line VDD), respectively.

In an exemplary implementation, a connection structure of the first transistor T1 to the eighth transistor T8 and the storage capacitor C in the pixel drive circuit of the present embodiment is substantially the same as that shown in FIG. 4, except that pixel drive circuit is not provided with a ninth transistor and thus the first node N1 is respectively connected to the second electrode of the first transistor T1, the first electrode of the second transistor T2, the gate electrode of the third transistor T3, and the first end of the storage capacitor C, that is, the second electrode of the first transistor T1 is connected to the first node N1, the first electrode of the second transistor T2 is connected to the first node N1.

As shown in FIG. 17, in this exemplary embodiment, oxide transistors (N-type transistors) may be adopted for the first transistor T1 and the second transistor T2 in the pixel drive circuit, and low temperature poly silicon transistors (P-type transistors) may be adopted for the third transistor T3 to the eighth transistor T8.

Figure 18:
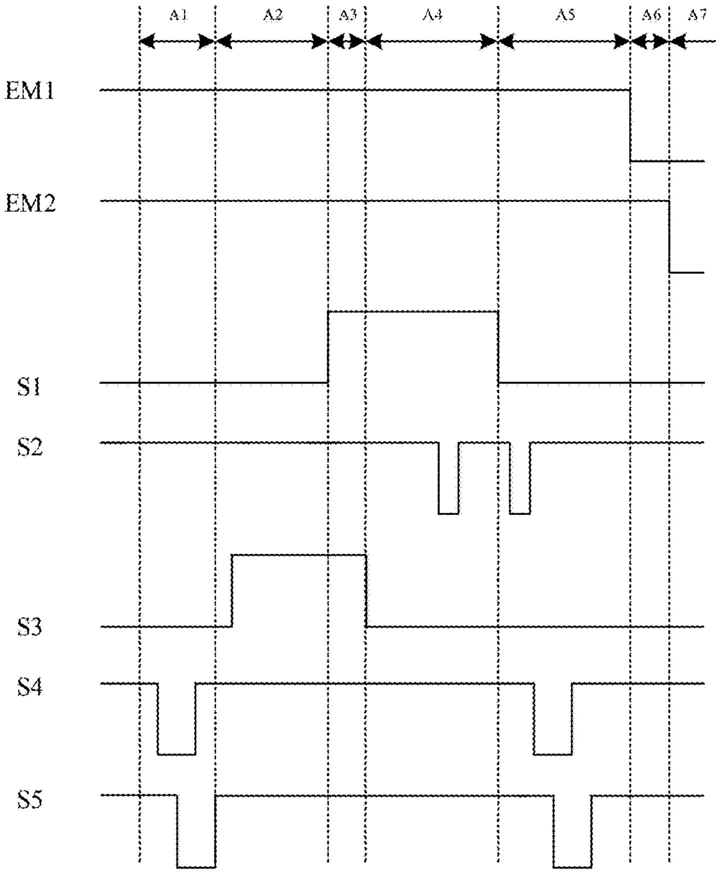
FIG. 18 is a driving timing diagram of the pixel drive circuit shown in FIG. 17.

FIG. 18 is a driving timing diagram of a pixel drive circuit shown in FIG. 17. As shown in FIG. 18, in an exemplary implementation, a working process of the pixel drive circuit is substantially the same as that of FIG. 5A, except that a signal of the second scan signal line S2 in the second stage A2 is a high-level signal, and the first transistor T1 is turned on so that a signal of the first initial signal line INIT1 is provided to the first node N1 to initialize (reset) the first node N1. In the fifth stage A5, before the seventh transistor T7 and the eighth transistor T8 are turned on, a signal of the second scan signal line S2 is a low-level signal for a short period of time, the fourth transistor T4 is turned on again, and the fourth transistor T4 is turned on so that a data voltage of the next unit row resets the second node N2 and the third node N3.

Figure 19:
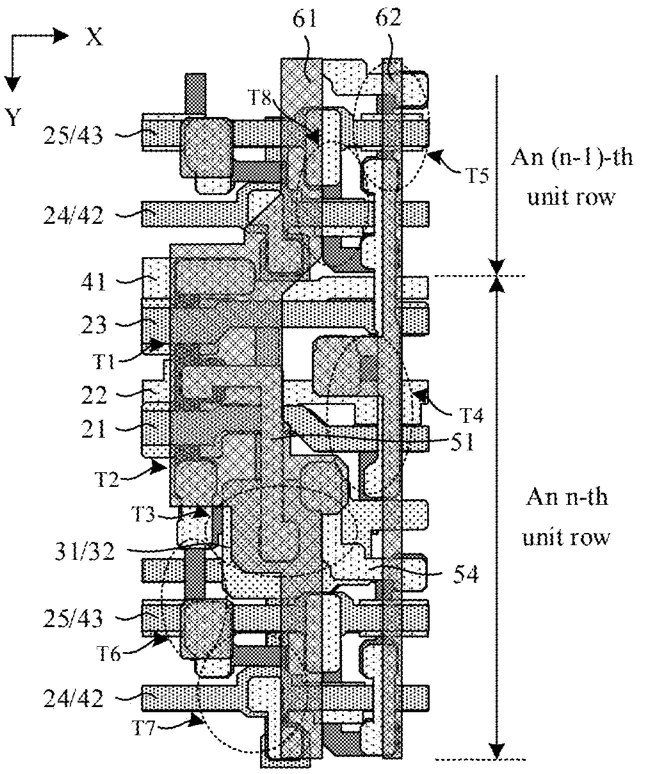
FIG. 19 is a schematic diagram of a planar structure of another display substrate according to an exemplary embodiment of the present disclosure.

FIG. 19 is a schematic diagram of a planar structure of another display substrate according to an exemplary embodiment of the present disclosure. In an exemplary implementation, the structure of the display substrate of the present embodiment is substantially the same as that shown in FIG. 6, except that the pixel drive circuit has a structure of 8T1C.

In an exemplary implementation, the pixel drive circuit includes a storage capacitor and a plurality of transistors, and the storage capacitor may include a first plate and a second plate which stacked, the plurality of transistors may include a first transistor T1 as a first initialization transistor, a second transistor T2 as a compensation transistor, a third transistor T3 as a drive transistor, a fourth transistor T4 as a data writing transistor, a fifth transistor T5 as a first light emitting control transistor, a sixth transistor T6 as a second light emitting control transistor, a seventh transistor T7 as a second initialization transistor, and an eighth transistor T8 as a third initialization transistor. The first transistor T1 and the second transistor T2 are oxide transistors, and the third transistor T3 to the ninth transistor T9 are low temperature poly silicon transistors.

In an exemplary implementation, a connection structure of the first transistor T1 to the eighth transistor T8 is substantially the same as that of the foregoing embodiment, except that the second electrode of the first transistor T1 and the first electrode of the second transistor T2 are connected to the first plate 31 of the storage capacitor through the first connection electrode 51.

In an exemplary embodiment, taking one pixel unit as an example, a manufacturing process of the display substrate according to the present embodiment may include the following operations.

(11) A pattern of a shield layer is formed. In an exemplary implementation, the process of forming the shield layer and the structure of the shield layer are substantially the same as those of the foregoing embodiment.

Figure 20:
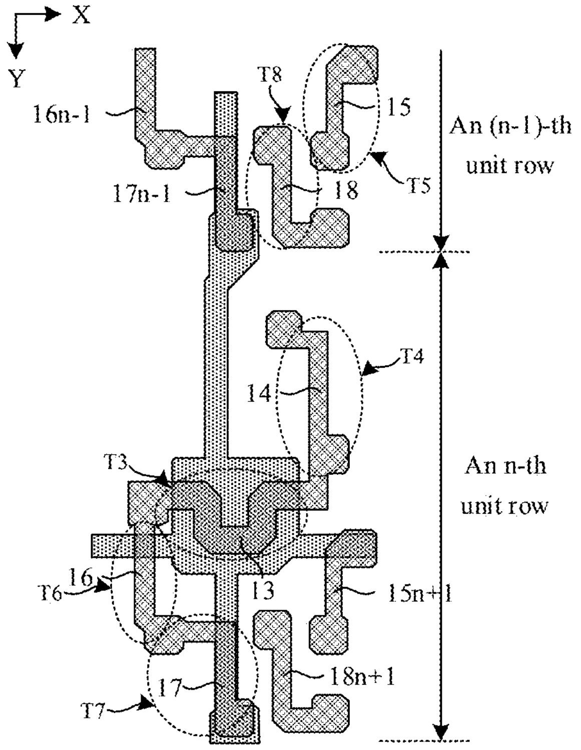
FIG. 20 is a schematic diagram of another display substrate after a pattern of a first semiconductor layer is formed according to the present disclosure.

(12) A pattern of a first semiconductor layer is formed. In an exemplary implementation, the process of forming the first semiconductor layer and the structure of the first semiconductor layer are substantially the same as those of the foregoing embodiment, except that the first semiconductor layer may at least include the third active layer 13 of the third transistor T3 to the eighth active layer 18 of the eighth transistor T8, and the first semiconductor layer does not have a ninth active layer, as shown in FIG. 20.

Figure 21:
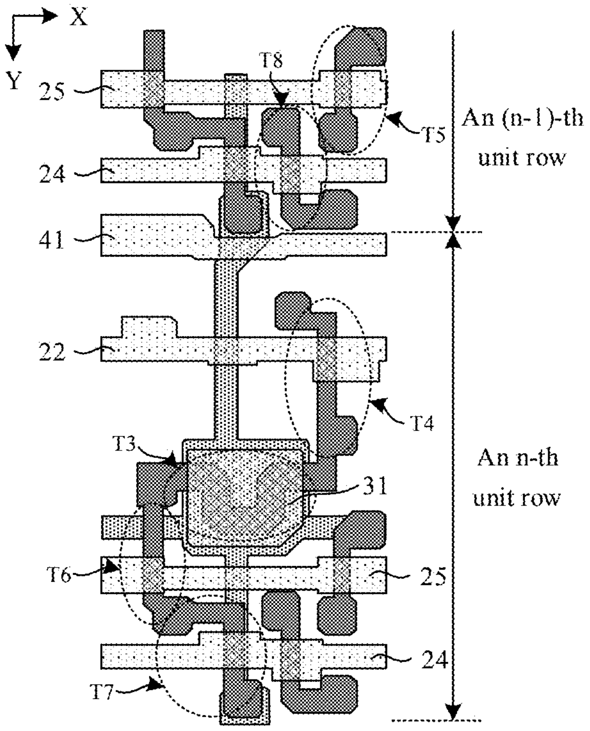
FIG. 21 is a schematic diagram of another display substrate after a pattern of a first conductive layer is formed according to the present disclosure.

(13) A pattern of a first conductive layer is formed. In an exemplary implementation, the process of forming the first conductive layer and the structure of the first conductive layer are substantially the same as those of the foregoing embodiment, as shown in FIG. 21.

Figure 22:
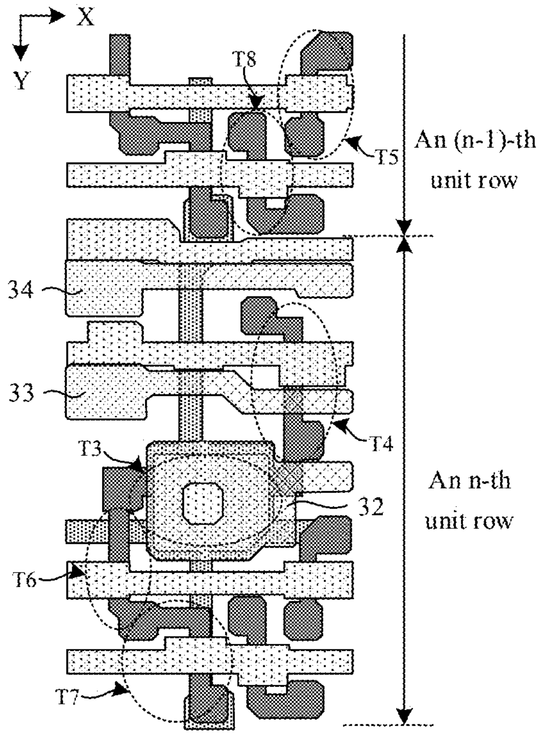
FIG. 22 is a schematic diagram of another display substrate after a pattern of a second conductive layer is formed according to the present disclosure.

(14) A pattern of a second conductive layer is formed. In an exemplary implementation, the process of forming the second conductive layer and the structure of the second conductive layer are substantially the same as those of the foregoing embodiment, as shown in FIG. 22.

Figure 23:
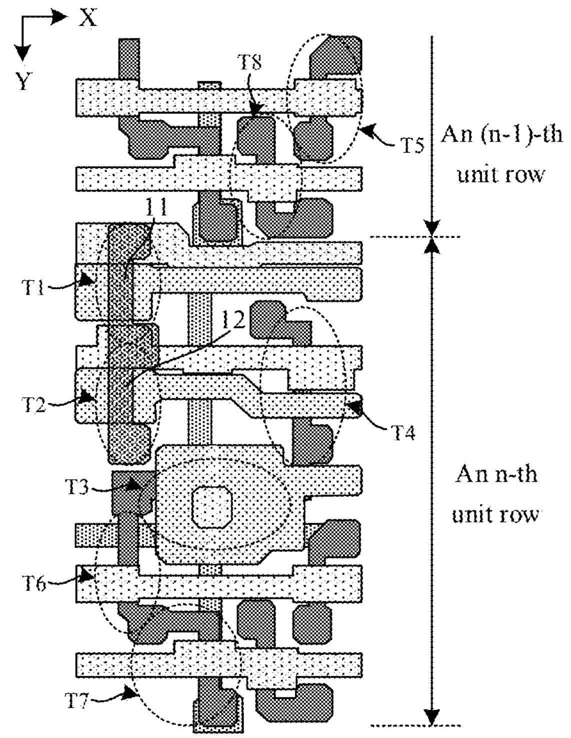
FIG. 23 is a schematic diagram of another display substrate after a pattern of a second semiconductor layer is formed according to the present disclosure.

(15) A pattern of a second semiconductor layer is formed. In an exemplary implementation, the process of forming the second semiconductor layer and the structure of the second semiconductor layer are substantially the same as those of the foregoing embodiment, as shown in FIG. 23.

Figure 24:
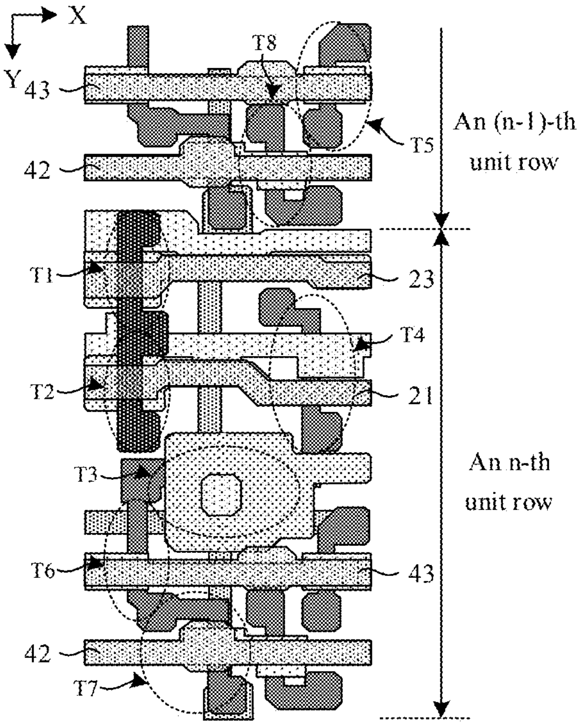
FIG. 24 is a schematic diagram of another display substrate after a pattern of a third conductive layer is formed according to the present disclosure.

(16) A pattern of a third conductive layer is formed. In an exemplary implementation, the process of forming the third conductive layer and the structure of the third conductive layer are substantially the same as those of the foregoing embodiment, as shown in FIG. 24.

Figure 25:
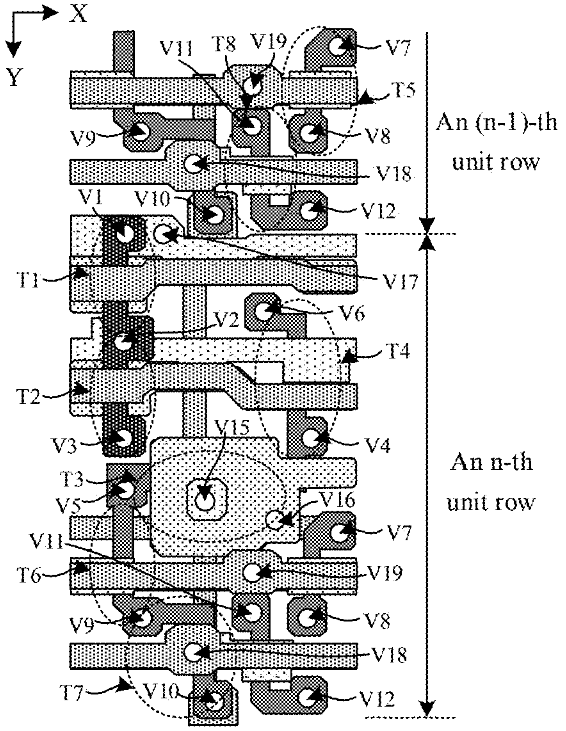
FIG. 25 is a schematic diagram of another display substrate after a pattern of a sixth insulation layer is formed according to the present disclosure.

(17) A pattern of a sixth insulation layer is formed. In an exemplary implementation, the process of forming the sixth insulation layer and the structure of the plurality of vias are substantially the same as those of the foregoing embodiment, except that the plurality of vias of each circuit unit are not provided with the thirteenth via V13 and the fourteenth via V14, and the second via V2 is configured such that the first connection electrode to be formed subsequently is connected with the second region of the first active layer (also the first region of the second active layer) through the second via V2, as shown in FIG. 25.

Figure 26:
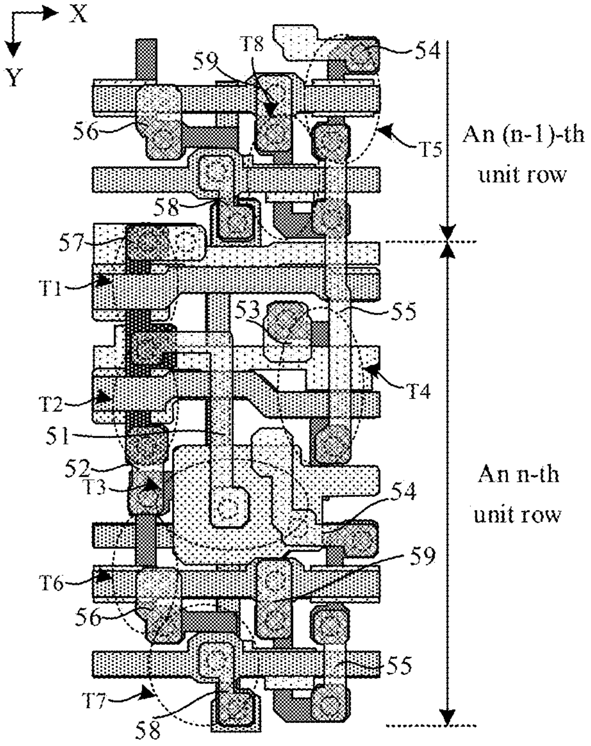
FIG. 26 is a schematic diagram of another display substrate after a pattern of a fourth conductive layer is formed according to the present disclosure.

(18) A pattern of a fourth conductive layer is formed. In an exemplary implementation, the process of forming the fourth conductive layer and the structure of the fourth conductive layer are substantially the same as those of the foregoing embodiment, except that the fourth conductive layer is not provided with the tenth connection electrode, the first connection electrode 51 is in a shape of "L", a first end of the first connection electrode 51 is connected to the second region of the first active layer (also the first region of the second active layer) through the second via V2, and a second end of the first connection electrode 51 is connected to the first plate 31 through the fifteenth via V15, as shown in FIG. 26.

In an exemplary implementation, the first connection electrode 51 enables a second electrode of the first transistor T1, a first electrode of the second transistor T2, a gate electrode of the third transistor T3, a second electrode of the ninth transistor T9, and the first plate 31 to have a same potential and form the first node N1 of the pixel drive circuit.

Figure 27:
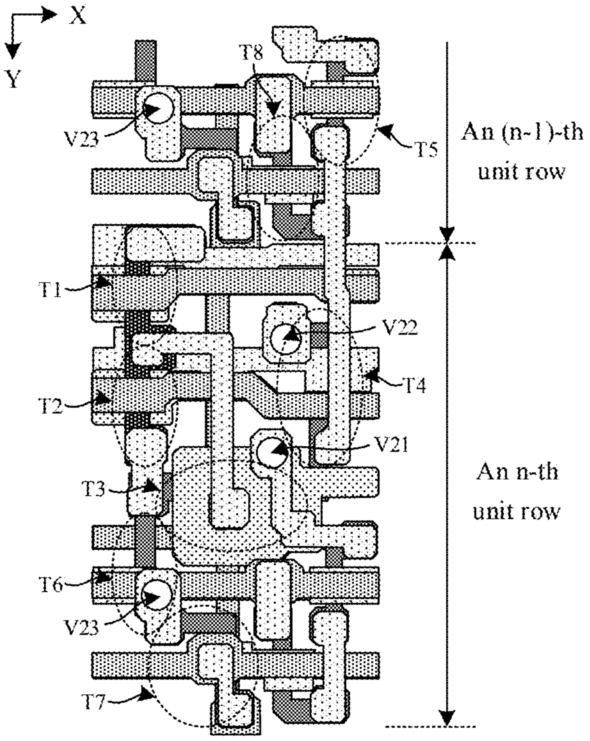
FIG. 27 is a schematic diagram of another display substrate after a pattern of a first planarization layer is formed according to the present disclosure.

(19) A pattern of a first planarization layer is formed. In an exemplary implementation, the process of forming the first planarization layer and the structure of the plurality of vias are substantially the same as those of the foregoing embodiment, as shown in FIG. 27.

Figure 28:
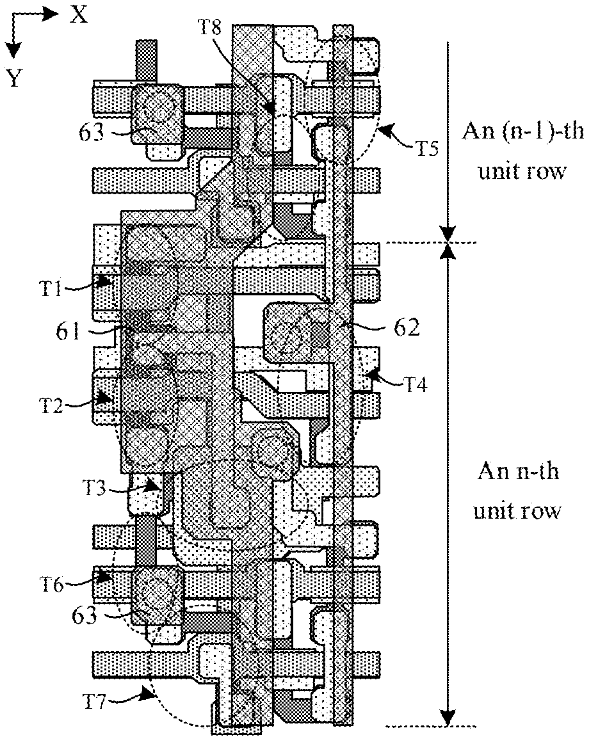
FIG. 28 is a schematic diagram of another display substrate after a pattern of a fifth conductive layer is formed according to the present disclosure.

(20) A pattern of a fifth conductive layer is formed. In an exemplary implementation, the process of forming the fifth conductive layer and the structure of the fifth conductive layer are substantially the same as those of the foregoing embodiment, as shown in FIG. 28.

A subsequent process may include forming a second planarization layer covering the pattern of the fifth conductive layer, an anode via is provided on the second planarization layer, the anode via exposes an anode connection electrode, and the anode via is configured such that the anode to be formed subsequently is connected to the anode connection electrode through the anode via.

So far, a drive circuit layer has been prepared on the base substrate. In a plane parallel to the display substrate, the drive circuit layer may include a plurality of circuit units, each circuit unit may include a pixel drive circuit, and a first scan signal line, a second scan signal line, a third scan signal line, a fourth scan signal line, a light emitting signal line, a first initial signal line, a second initial signal line, a third initial signal line, a first power supply line and a data signal line which are connected to the pixel drive circuit. In a plane perpendicular to the display substrate, the drive circuit layer may include a shield layer, a first insulation layer, a first semiconductor layer, a second insulation layer, a first conductive layer, a third insulation layer, a second conductive layer, a fourth insulation layer, a second semiconductor layer, a fifth insulation layer, a third conductive layer, a sixth insulation layer, a fourth conductive layer, a first planarization layer, a fifth conductive layer and a second planarization layer arranged sequentially on the base substrate. The shield layer may at least include a shield electrode. The first semiconductor layer may at least include active layers of the third transistor to the eighth transistor. The first conductive layer may at least include a second scan signal line, a fourth scan signal line, a light emitting signal line, a first initial signal line, and a first plate of the storage capacitor. The second conductive layer may at least include a first shield line, a second shield line, and a second plate of the storage capacitor. The second semiconductor layer may at least include active layers of the first transistor and the second transistor. The third conductive layer may at least include a first scan signal line, a third scan signal line, a second initial signal line, and a third initial signal line. The fourth conductive layer may at least include a plurality of connection electrodes. The fifth conductive layer may at least include a first power supply line, a data signal line, and an anode connection electrode.

In an exemplary implementation, after the drive circuit layer has been prepared, a light emitting structure layer may be prepared on the drive circuit layer at first, and then an encapsulation structure layer may be prepared on the light emitting structure layer, which will not be described further here.

In the display substrate, since the pixel drive circuit of each circuit unit is connected to five scan signal lines (the first scan signal line to the fifth scan signal line) and two light emitting signal lines (the first light emitting signal line and the second light emitting signal line), a large quantity of signal lines not only increases an occupied area, but also increases a complexity of the structure of the pixel drive circuit, and therefore it is difficult to reduce a size of the circuit unit and it is difficult to improve a resolution of the display apparatus (Pixels Per Inch, PPI for short). Furthermore, a large quantity of scan signal lines and light emitting signal lines increases a quantity of corresponding gate drive circuits in the bezel region, which increases the gate drive circuits and the occupied area, and is not conducive to realizing a narrow bezel.

In the display substrate according to an embodiment of the present disclosure, by providing signal sharing between two adjacent unit rows, the fifth transistor T5 of the present unit row is controlled by the light emitting signal line of the previous unit row, and the eighth transistor T8 of the present unit row is controlled by the fourth scan signal line of the previous unit row, which can effectively reduce the size of the circuit unit and effectively improve the resolution of the display apparatus.

The display substrate according to the present disclosure realizes that the fifth transistor T5 of the present unit row shares the control signal of the sixth transistor T6 of the previous unit row by providing the sixth transistor T6 of the present unit row in the circuit unit of the present unit row, and the sixth transistor T6 is connected to the light emitting signal line of the present unit row, and providing the fifth transistor T5 of the pixel drive circuit in the present unit row in the circuit unit of the previous unit row, and the fifth transistor T5 is connected to the light emitting signal line of the previous unit row. Compared with an existing structure in which a first light emitting signal line for controlling the fifth transistor T5 and a second light emitting signal line for controlling the sixth transistor T6 are provided in each unit row, the present disclosure enables only one light emitting signal line to be provided in the unit row by misaligned arrangement and signal sharing between transistors in adjacent unit rows, which not only reduces the quantity of signal lines, reduces the occupied area, but also reduce the complexity of the structure of the pixel drive circuit, can effectively reduce the size of the circuit unit and effectively improve the resolution of the display apparatus.

In the present disclosure, the fifth transistor and the sixth transistor are controlled separately, the fifth transistor T5 of present unit row is connected to the light emitting signal line of the previous unit row, the sixth transistor T6 is connected to the light emitting signal line of present unit row, and the light emitting signal lines of the two unit rows jointly adjust a duty of the pulse width modulation (PWM), more accurate pulse width modulation at ultra-high frequencies, compensation for the light emitting signal duty cycle, the compensation for low gray scales, and improvement of the afterimage can be achieved.

In the display substrate according to the present disclosure, by providing the seventh transistor T7 of the pixel drive circuit in the present unit row in the circuit unit of the present unit row, the seventh transistor T7 is connected to the fourth scan signal line of the present unit row, and providing the eighth transistor T8 of the pixel drive circuit in the present unit row in the circuit unit of the previous unit row, the eighth transistor T8 is connected to the fourth scan signal line of the previous unit row, it is achieved the eighth transistor T8 of the present unit row shares the control signal of the seventh transistor T7 of the previous unit row. Compared with an existing structure in which the fourth scan signal line for controlling the seventh transistor T7 and the fifth scan signal line for controlling the eighth transistor T8 are provided in each unit row, the present disclosure enables only one fourth scan signal line to be provided in the unit row by misaligned arrangement and signal sharing between transistors in adjacent unit rows, which not only reduces the quantity of signal lines, reduces the occupied area, but also reduce the complexity of the structure of the pixel drive circuit, can effectively reduce the size of the circuit unit and effectively improve the resolution of the display apparatus.

By reducing the quantity of light emitting signal lines and scan signal lines in a unit row, in the present disclosure, space utilization is optimized, the layout is more reasonable, distances between nodes inside the pixel drive circuit and distances between nodes and signal lines can be guaranteed, crosstalk badness can be effectively avoided, the display quality of the display apparatus can be effectively improved, a product yield can be effectively improved, and production costs can be reduced.

In the present disclosure, by reducing the quantity of light emitting signal lines and scan signal lines in a unit row, the quantity of corresponding gate drive circuits in the bezel region can be reduced significantly, effectively reducing an area occupied by the gate drive circuits, which is conducive to realization of a narrow bezel and enhancement of the product advantages.

In the present disclosure, an orthographic projection of the second initial signal line on the base substrate is at least partially overlapped with an orthographic projection of the fourth scan signal line on the base substrate, and an orthographic projection of the third initial signal line on the base substrate is at least partially overlapped with an orthographic projection of the light emitting signal line on the base substrate, so that the initial signal line with a constant potential can effectively shield an influence of a voltage jump of the scan signal line or the light emitting signal line on the pixel drive circuit, and the driving performance of the pixel drive circuit is improved.

In the present disclosure, by providing the first power supply line to cover the first connection electrode, an influence of data voltage jump and other signals on the first node in the pixel drive circuit can be effectively shielded, thus avoiding the influence of data voltage jump and other signals on the potential of the first node, and effectively avoiding deterioration of crosstalk. In the present disclosure, by providing the first power supply line to cover the first active layer and the second active layer, light emitted by a light emitting device and light reflected by a film layer can be blocked from irradiating the oxide transistor, the oxide transistor can be prevented from characteristic drift due to illumination, thus improving electrical characteristics of the oxide transistor. The manufacturing process in the present disclosure may be compatible well with an existing manufacturing process, is simple in process implementation, is easy to implement, and has a high production efficiency, a low production cost, and a high yield.

Figure 29:
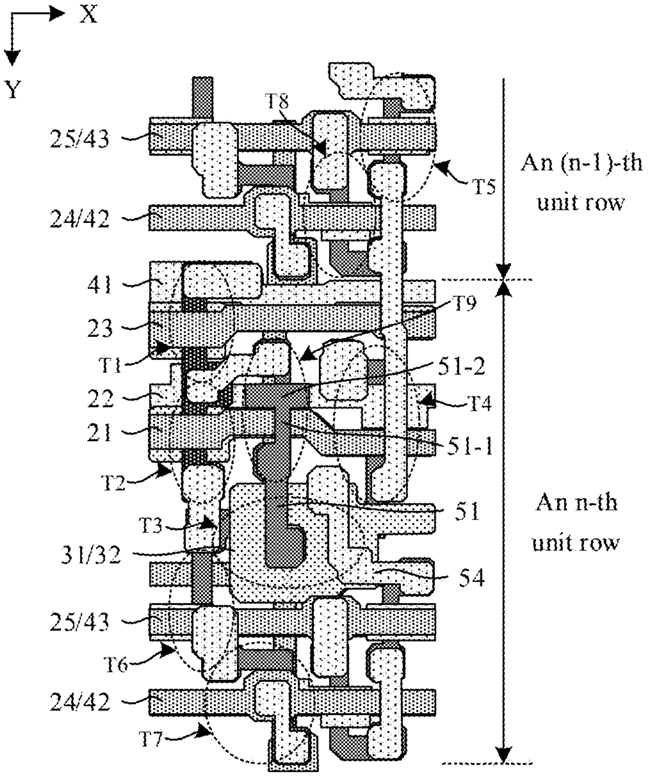
FIG. 29 is a schematic diagram of a planar structure of another display substrate according to an exemplary embodiment of the present disclosure.

FIG. 29 is a schematic diagram of a planar structure of another display substrate according to an exemplary embodiment of the present disclosure. In an exemplary implementation, the structure of the display substrate of the present embodiment is substantially the same as that shown in FIG. 6, except that the first connection electrode 51 is further provided with a first auxiliary electrode 51-1 and a second auxiliary electrode 51-2.

In an exemplary implementation, the first connection electrode 51 may be in a shape of a strip in which a main body portion extends along the second direction Y, a first end of the first connection electrode 51 is connected to the second region of the ninth active layer through the fourteenth via V14, and a second end of the first connection electrode 51, after extending along the second direction Y, is connected to the first plate 31 through the fifteenth via V15. In an exemplary implementation, since the first plate 31 serves as a gate electrode of the third transistor T3 at the same time, the first connection electrode 51 enables a gate electrode of the third transistor T3, a second electrode of the ninth transistor T9, and the first plate 31 to have a same potential and form the first node N1 of the pixel drive circuit.

In an exemplary implementation, the first auxiliary electrode 51-1 may be in a shape of a strip extending along the second direction Y, a first end of the first auxiliary electrode 51-1 is connected to the first end of the first connection electrode 51, a second end of the first auxiliary electrode 51-1, after extending in a direction away from the first connection electrode 51, is connected to the second auxiliary electrode 51-2, and an orthographic projection of the first auxiliary electrode 51-1 on the base substrate is at least partially overlapped with an orthographic projection of the first scan signal line 21 on the base substrate. The second auxiliary electrode 51-2 may be in a shape of a strip extending along the first direction X, and an orthographic projection of the second auxiliary electrode 51-2 on the base substrate is at least partially overlapped with an orthographic projection of the second scan signal line 22 on the base substrate.

In an exemplary implementation, the second scan signal line 22 controls the turn-on and turn-off of the fourth transistor T4, and the first connection electrode 51 serves as the first node N1 of the pixel drive circuit, and the present disclosure not only facilitates low gray scale picture display, but also can balance a parasitic capacitance between the first node N1 and the second scan signal line 22 by providing the first node N1 to be overlapped with the first scan signal line 21 and the second scan signal line 22. Since the second transistor T2 is an N-type transistor and the fourth transistor T4 is a P-type transistor, the turned-on signals for the first scan signal line 21 controlling the second transistor T2 and the second scan signal line 22 controlling the fourth transistor T4 are opposite, and thus a structure of the first auxiliary electrode 51-1 and the second auxiliary electrode 51-2 in the present embodiment can balance the parasitic capacitance between the first node N1 and the second scan signal line 22.

In an exemplary implementation, there is an overlapping region between the orthographic projection of the first scan signal line 21 on the base substrate and an orthographic projection of the ninth active layer on the base substrate, and a width of the overlapping region in the ninth active layer may be larger than a width of other positions to adjust a capacitance between the first semiconductor layer and the first scan signal line 21. Since the first semiconductor layer is widened in its lower portion, the lower first semiconductor layer is not affected by flatness of the first scan signal line 21 above it, and a risk of breakage is improved.

Figure 30:
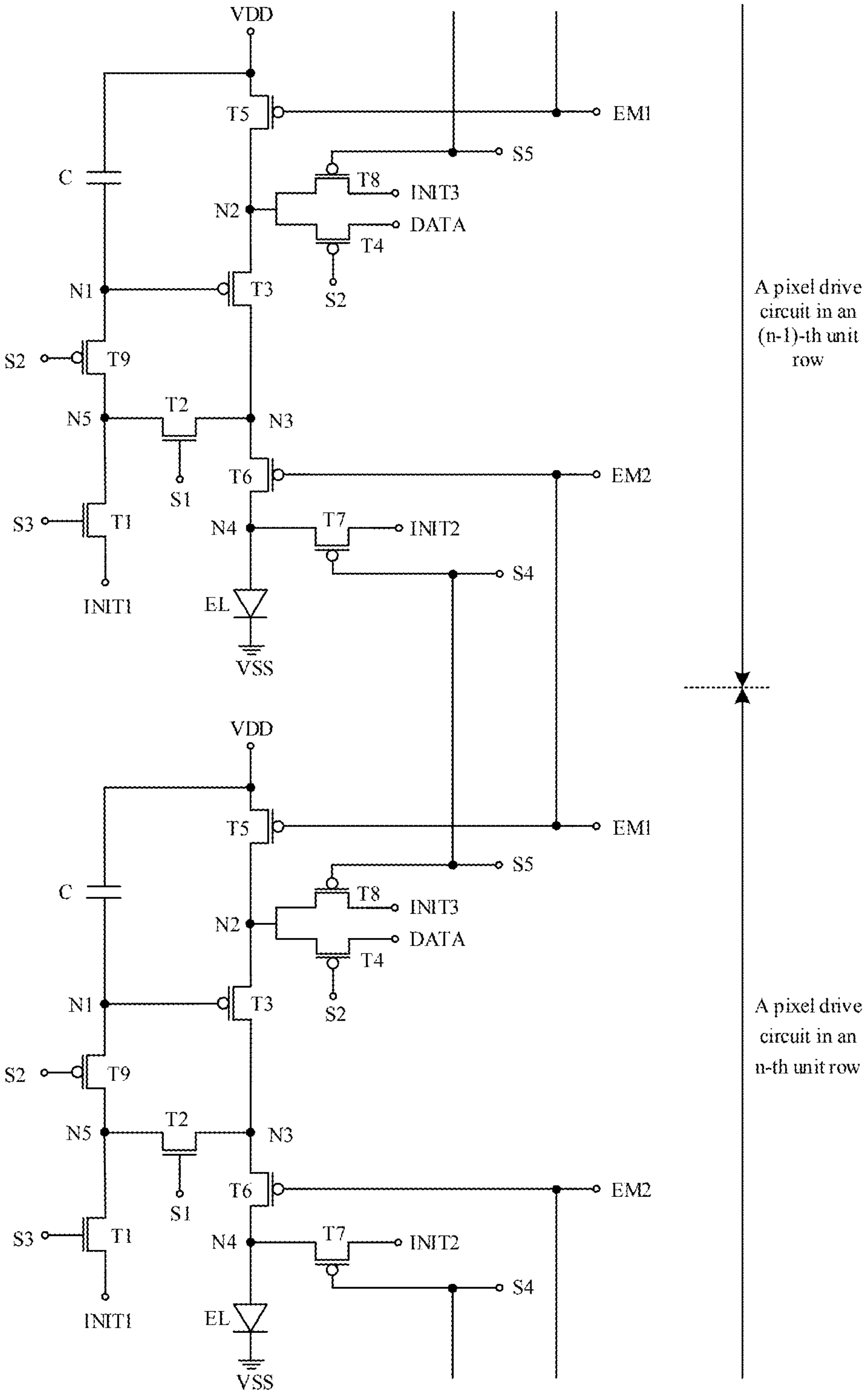
FIG. 30 is an equivalent circuit diagram of another pixel drive circuit according to an exemplary embodiment of the present disclosure.

FIG. 30 is an equivalent circuit diagram of another pixel drive circuit according to an exemplary embodiment of the present disclosure, and illustrates pixel drive circuits of an (n−1)-th unit row and an n-th unit row, and structures of the pixel drive circuits of the (n−1)-th unit row and the n-th unit row are substantially the same as those shown in FIG. 4.

As shown in FIG. 30, the second light emitting signal line EM2 of the (n−1)-th unit row and the first light emitting signal line EM1 of the n-th unit row are connected to each other, that is, the second light emitting signal line EM2 of the (n−1)-th unit row and the first light emitting signal line EM1 of the n-th unit row are the same light emitting signal line, and the sixth transistor T6 of the (n−1)-th unit row and the fifth transistor T5 of the n-th unit row share the same light emitting signal line. The fourth scan signal line S4 of the (n−1)-th unit row and the fifth scan signal line S5 of the n-th unit row are connected to each other, that is, the fourth scan signal line S4 of the (n−1)-th unit row and the fifth scan signal line S5 of the n-th unit row are the same scan signal line, and the seventh transistor T7 of the (n−1)-th unit row and the eighth transistor T8 of the n-th unit row share the same scan signal line.

In some possible implementations, the fourth scan signal line S4 and the fifth scan signal line S5 of each unit row may adopt a same control signal instead of cascaded signals, and signals of the fourth scan signal line S4 and the fifth scan signal line S5 of each unit row are the same control signal, which is not limited in the present disclosure.

In some possible implementations, the first scan signal line S1 and the third scan signal line S3 of each unit row may be provided by different gate drive circuits, or may adopt cascaded signals, which is not limited in the present disclosure.

In another exemplary implementation, the display substrate according to the present disclosure may include a plurality of circuit units constituting a plurality of unit rows and a plurality of unit columns, and at least one circuit unit includes a pixel drive circuit configured to output a drive current to a light emitting device connected to the pixel drive circuit. The pixel drive circuit at least includes a second transistor as a compensation transistor, a third transistor as a drive transistor, a fourth transistor as a data writing transistor, and a ninth transistor as an isolation transistor. The second transistor is an oxide transistor, and the third transistor, the fourth transistor, and the ninth transistor are poly silicon transistors. A first electrode of the second transistor is connected to a first electrode of the ninth transistor, a second electrode of the second transistor is connected to a second electrode of the third transistor, a first electrode of the fourth transistor is connected to the data signal line, a second electrode of the fourth transistor is connected to a first electrode of the third transistor, and a second electrode of the ninth transistor is connected to a gate electrode of the third transistor. In the unit row direction, the ninth transistor is disposed between the second transistor and the fourth transistor.

In an exemplary implementation, the second transistor at least includes a second active layer, the fourth transistor at least includes a fourth active layer, and the ninth transistor at least includes a ninth active layer. The ninth active layer is disposed between the second active layer and the fourth active layer in the unit row direction.

In an exemplary implementation, a channel region of the ninth active layer is disposed between a channel region of the second active layer and a channel region of the fourth active layer in the unit row direction.

A display substrate according to an exemplary embodiment of the present disclosure is illustrated below by some examples.

Figure 31:
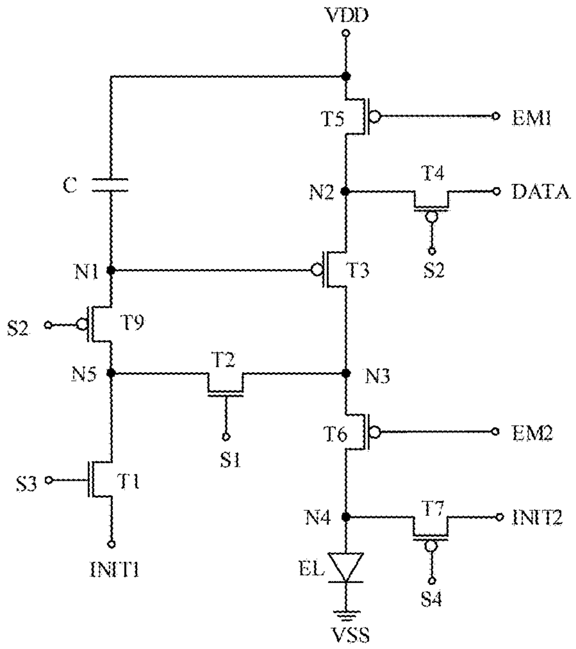
FIG. 31 is an equivalent circuit diagram of another pixel drive circuit according to an exemplary embodiment of the present disclosure.

FIG. 31 is an equivalent circuit diagram of another pixel drive circuit according to an exemplary embodiment of the present disclosure. As shown in FIG. 31, the pixel drive circuit has a structure of 8T1C and may include eight transistors (a first transistor T1 to a seventh transistor T7, a ninth transistor T9) and one storage capacitor C, and each pixel drive circuit is connected to ten signal lines (a first scan signal line S1, a second scan signal line S2, a third scan signal line S3, a fourth scan signal line S4, a first light emitting signal line EM1, a second light emitting signal line EM2, a first initial signal line INIT1, a second initial signal line INIT2, a data signal line DATA, and a first power supply line VDD) respectively.

In an exemplary implementation, each pixel drive circuit may include a first node N1, a second node N2, a third node N3, a fourth node N4, and a fifth node. The first node N1 is connected to a gate electrode of the third transistor T3, a second electrode of the ninth transistor T9, and a first end of the storage capacitor C respectively. The second node N2 is connected to a first electrode of the third transistor T3, a second electrode of the fourth transistor T4, and a second electrode of the fifth transistor T5 respectively. The third node N3 is connected to a second electrode of the second transistor T2, a second electrode of the third transistor T3, and a first electrode of the sixth transistor T6 respectively. The fourth node N4 is connected to a second electrode of the sixth transistor T6 and a second electrode of the seventh transistor T7 respectively. The fifth node N5 is connected to a second electrode of the first transistor T1, a first electrode of the second transistor T2, and a first electrode of the ninth transistor T9 respectively.

In an exemplary implementation, a first end of the storage capacitor C in the pixel drive circuit is connected to the first node N1, and a second end of the storage capacitor C is connected to the first power supply line VDD.

In an exemplary embodiment, the first transistor T1 may be referred to as a first initialization transistor. A gate electrode of the first transistor T1 is connected to the third scan signal line S3, a first electrode of the first transistor T1 is connected to the first initial signal line INIT1, and a second electrode of the first transistor T1 is connected to the fifth node N5.

In an exemplary implementation, the second transistor T2 may be referred to as a compensation transistor. A gate electrode of the second transistor T2 is connected to the first scan signal line S1, a first electrode of the second transistor T2 is connected to the fifth node N5, and a second electrode of the second transistor T2 is connected to the third node N3.

In an exemplary implementation, the third transistor T3 may be referred to as a drive transistor. A gate electrode of the third transistor T3 is connected to the first node N1, a first electrode of the third transistor T3 is connected to the second node N2, and a second electrode of the third transistor T3 is connected to the third node N3.

In an exemplary implementation, the fourth transistor T4 may be referred to as a data writing transistor. A gate electrode of the fourth transistor T4 is connected to the second scan signal line S2, a first electrode of the fourth transistor T4 is connected to the data signal line DATA, and a second electrode of the fourth transistor T4 is connected to the second node N2.

In an exemplary implementation, the fifth transistor T5 may be referred to as a first light emitting control transistor. A gate electrode of the fifth transistor T5 is connected to the first light emitting signal line EM1, a first electrode of the fifth transistor T5 is connected to the first power supply line VDD, and a second electrode of the fifth transistor T5 is connected to the second node N2.

In an exemplary implementation, the sixth transistor T6 may be referred to as a second light emitting control transistor. A gate electrode of the sixth transistor T6 is connected to the second light emitting signal line EM2, a first electrode of the sixth transistor T6 is connected to the third node N3, and a second electrode of the sixth transistor T6 is connected to the fourth node N4.

In an exemplary implementation, the seventh transistor T7 may be referred to as a second initialization transistor. A gate electrode of the seventh transistor T7 is connected to the fourth scan signal line S4, a first electrode of the seventh transistor T7 is connected to the second initial signal line INIT2, and a second electrode of the seventh transistor T7 is connected to the fourth node N4.

In an exemplary implementation, a gate electrode of the ninth transistor T9 is connected to the second scan signal line S2, a first electrode of the ninth transistor T9 is connected to the fifth node N5, and a second electrode of the ninth transistor T9 is connected to the first node N1.

In an exemplary embodiment, a first electrode of a light emitting device EL is connected to the fourth node N4, and a second electrode of the light emitting device EL is connected to the second power supply line VSS. The light emitting device EL may be an OLED including a first electrode (anode), an organic emitting layer, and a second electrode (cathode) which are stacked, or may be a QLED including a first electrode, a quantum dot emitting layer, and a second electrode which are stacked.

In an exemplary implementation, a signal of the first power supply line VDD is a high-level signal continuously provided, and a signal of the second power supply line VSS is a low-level signal continuously provided.

In an exemplary implementation, the first transistor T1 to the second transistor T2, the fourth transistor T4 to the seventh transistor T7, and the ninth transistor T9 are switch transistors, and the third transistor T3 is a drive transistor.

In an exemplary implementation, the first transistor T1 to the seventh transistor T7 and the ninth transistor T9 in the pixel drive circuit may be P-type transistors or may be N-type transistors. When a transistor is a P-type transistor, its turn-on voltage is a low-level voltage (e.g., 0 V, −5 V, −10 V, or another suitable voltage), and its turn-off voltage is a high-level voltage (e.g., 5 V, 10 V, or another suitable voltage). When a transistor is an N-type transistor, its turn-on voltage is a high-level voltage (e.g., 5 V, 10 V, or another suitable voltage), and its turn-off voltage is a low-level voltage (e.g., 0 V, −5 V, −10 V, or another suitable voltage). In some other possible exemplary implementations, the first transistor T1 to the seventh transistor T7 and the ninth transistor T9 in the pixel drive circuit may include P-type transistors and N-type transistors.

In an exemplary implementation, for the first transistor T1 to the seventh transistor T7 and the ninth transistor T9 in the pixel drive circuit, low temperature poly silicon transistors may be adopted, or oxide transistors may be adopted, or low temperature poly silicon transistors and oxide transistors may be adopted. An active layer of a low temperature poly silicon transistor is made of Low Temperature Poly silicon (LTPS for short), and an active layer of an oxide transistor is made of an oxide semiconductor (Oxide). A Low temperature poly silicon transistor has advantages such as a high migration rate and fast charging, and an oxide transistor has advantages such as a low leakage current. The low temperature poly silicon transistor and the oxide transistor are integrated on one display substrate to form a Low Temperature Polycrystalline Oxide (LTPO for short) display substrate, so that advantages of both the low temperature poly silicon thin film transistor and the oxide thin film transistor may be utilized, low-frequency drive may be achieved, power consumption may be decreased, and display quality may be improved.

In an embodiment of the present disclosure, oxide transistors (N-type transistors) may be adopted for the first transistor T1 and the second transistor T2 in the pixel drive circuit, and low temperature poly silicon transistors (P-type transistors) may be adopted for the third transistor T3 to the seventh transistor T7 and the ninth transistor T9, as shown in FIG. 31.

An exemplary embodiment of the present disclosure provides a driving method for a display substrate. In an exemplary implementation, the display substrate includes a plurality of circuit units constituting a plurality of unit rows and a plurality of unit columns, and at least one circuit unit includes a pixel drive circuit configured to output a drive current to a light emitting device connected to the pixel drive circuit. The pixel drive circuit at least includes a second transistor as a compensation transistor, a third transistor as a drive transistor, a fourth transistor as a data writing transistor, and a ninth transistor as an isolation transistor. The second transistor is an oxide transistor, and the third transistor, the fourth transistor, and the ninth transistor are poly silicon transistors. A gate electrode of the third transistor is connected to a second electrode of the ninth transistor, a first electrode of the third transistor is connected to a second electrode of the fourth transistor, a second electrode of the third transistor is connected to a second electrode of the second transistor, a first electrode of the second transistor is connected to a first electrode of the ninth transistor, and a first electrode of the fourth transistor is connected to a data signal line. Contents displayed by the display substrate includes a plurality of display frames, at least one display frame includes a refresh frame and at least one hold frame, and the refresh frame at least includes a data writing stage. The driving method includes following operations.

In a data writing stage, a moment at which the ninth transistor is turned off is earlier than a moment at which the second transistor is turned off.

In an exemplary implementation, the data writing stage at least includes a first writing sub-stage, in the first writing sub-stage, the second transistor, the fourth transistor, and the ninth transistor are turned on, and a data signal output by the data signal line is provided to the gate electrode of the third transistor.

In an exemplary implementation, the data writing stage further includes a second writing sub-stage after the first writing sub-stage. In the second writing sub-stage, the second transistor is turned on and the ninth transistor is turned off, isolating the second transistor from the gate electrode of the third transistor.

In an exemplary implementation, the pixel drive circuit further includes a first transistor as a first initialization transistor, a first electrode of the first transistor is connected to a first initial signal line, and a second electrode of the first transistor is connected to the first electrode of the second transistor. The refresh frame further includes a first reset stage before the data writing stage, in the first reset stage, the first transistor and the ninth transistor are turned on, and a first initial signal output by the first initial signal line is provided to the gate electrode of the third transistor to reset the gate electrode of the third transistor.

In an exemplary implementation, in the first reset stage, the fourth transistor is turned on, and data signals of other unit rows output by the data signal line are provided to the first electrode of the third transistor to reset characteristics of the third transistor.

In an exemplary implementation, the refresh frame further includes a second reset stage after the data writing stage, and in the second reset stage, a first electrode of the light emitting device and the first electrode of the third transistor are reset respectively.

In an exemplary implementation, the pixel drive circuit further includes a seventh transistor as a second initialization transistor, a first electrode of the seventh transistor is connected to a second initial signal line, and a second electrode of the seventh transistor is connected to the first electrode of the light emitting device. The second reset stage at least includes a first reset sub-stage, in the first reset sub-stage, the seventh transistor is turned on, a second initial signal output by the second initial signal line is provided to the first electrode of the light emitting device, to reset the first electrode of the light emitting device.

In an exemplary implementation, the pixel drive circuit further includes a fifth transistor as a first light emitting control transistor and a sixth transistor as a second light emitting control transistor. A first electrode of the fifth transistor is connected to a first power supply line, a second electrode of the fifth transistor is connected to the first electrode of the third transistor, a first electrode of the sixth transistor is connected to the second electrode of the third transistor, and a second electrode of the sixth transistor is connected to the first electrode of the light emitting device. The second reset stage further includes a second reset sub-stage after the first reset sub-stage, in the second reset sub-stage, the sixth transistor is turned on to reset the first electrode of the third transistor and the second electrode of the third transistor.

In an exemplary implementation, the refresh frame further includes a light emitting stage after the second reset stage, in the light emitting stage, the fifth transistor and the sixth transistor are turned on, and the first power supply line provides a drive current to the light emitting device to drive the light emitting device to emit light.

In an exemplary implementation, the pixel drive circuit further includes a seventh transistor as a second initialization transistor, a first electrode of the seventh transistor is connected to a second initial signal line, and a second electrode of the seventh transistor is connected to a first electrode of the light emitting device. A hold frame at least includes a holding stage, in the holding stage, the seventh transistor is turned on, and a second initial signal output by the second initial signal line is provided to the first electrode of the light emitting device, to reset the first electrode of the light emitting device.

In an exemplary implementation, the pixel drive circuit further includes a fifth transistor as a first light emitting control transistor. A first electrode of the fifth transistor is connected to a first power supply line, and a second electrode of the fifth transistor is connected to the first electrode of the third transistor. The hold frame further includes a next frame reset stage after the holding stage. In the next frame reset stage, the fifth transistor is turned on, and a power supply signal output by the first power supply line is provided to a first electrode of the third transistor, to reset the first electrode of the third transistor.

Figure 32:
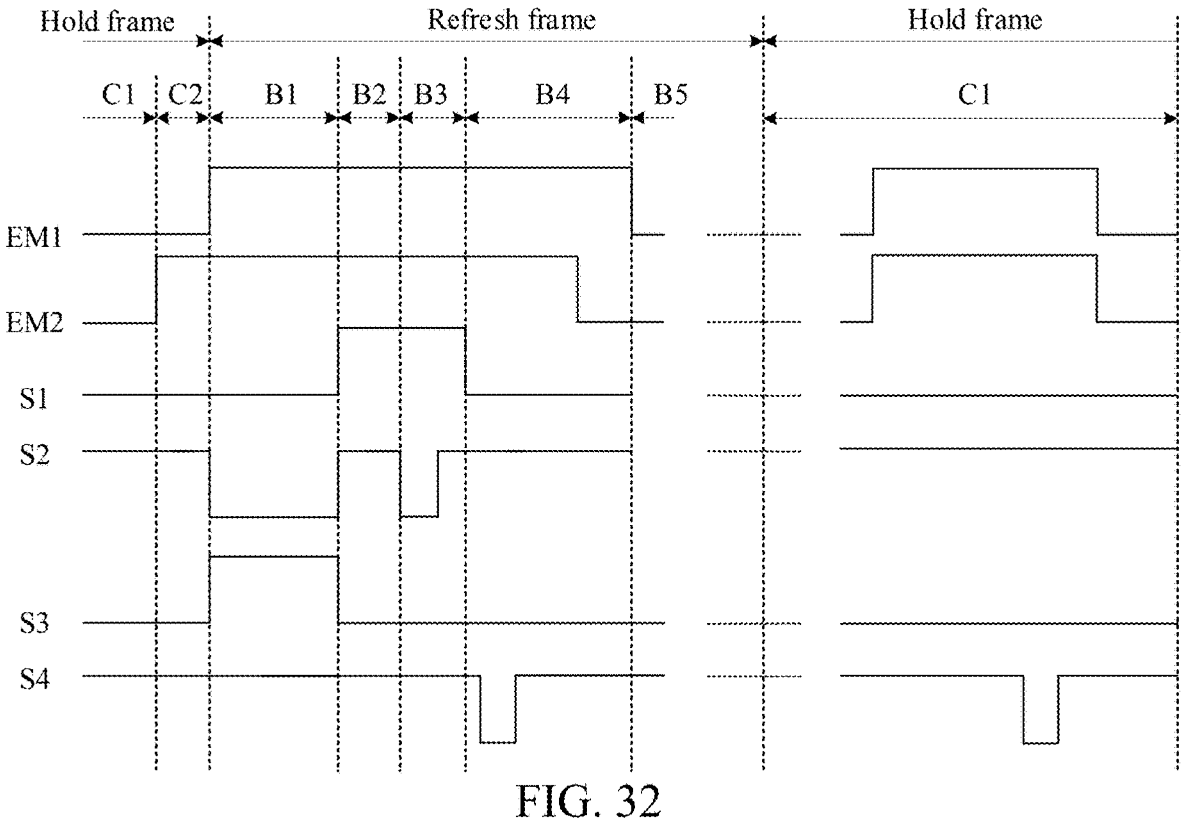
FIG. 32 is a driving timing diagram of a pixel drive circuit shown in FIG. 31.

FIG. 32 is a driving timing diagram of a pixel drive circuit shown in FIG. 31. As shown in FIG. 32, in an exemplary implementation, contents displayed by the display substrate may include a plurality of display frames, and a display frame may include a refresh frame and at least one hold frame.

In an exemplary implementation, a working process of the refresh frame may include a first stage B1 to a fifth stage B5.

The first stage B1 may be referred to as a first reset stage. Signals of the first scan signal line S1 and the second scan signal line S2 are low-level signals, and signals of the third scan signal line S3, the fourth scan signal line S4, the first light emitting signal line EM1, and the second light emitting signal line EM2 are high-level signals, so that the first transistor T1, the fourth transistor T4, and the ninth transistor T9 are turned on, and other switch transistors are turned off. The first transistor T1 and the ninth transistor T9 are turned on so that a signal of the first initial signal line INIT1 is provided to the first node N1 (the gate electrode of the third transistor T3) through the turned-on first transistor T1, the fifth node N5 and the turned-on ninth transistor T9 to reset (initialize) the first node N1, and the potentials of the first node N1 and the fifth node N5 are Vinit1. The fourth transistor T4 is turned on, so that the data signal line DATA writes voltages of data signals of previous several unit rows to the second node N2 (the first electrode of the third transistor T3), changing the potential of the second node N2, which in turn changes the gate-source voltage of the third transistor T3, and characteristics of the third transistor T3 are reset, thereby improving the afterimage.

The second stage B2 may be referred to as a preparation stage. A signal of the third scan signal line S3 is a low-level signal, and signals of the first scan signal line S1, the second scan signal line S2, the fourth scan signal line S4, the first light emitting signal line EM1, and the second light emitting signal line EM2 are high-level signals, so that the second transistor T2 is turned on and other switch transistors are turned off. The second transistor T2 is turned on, so that the third node N3 and the fifth node N5 are turned on, so that the potential of the third node N3 is Vinit1, in preparation for data writing.

The third stage B3 may be referred to as a data writing stage, and includes a first data writing sub-stage and a second data writing sub-stage.

In the first data writing sub-stage, signals of the second scan signal line S2 and the third scan signal line S3 are low-level signals, and signals of the first scan signal line S1, the fourth scan signal line S4, the first light emitting signal line EM1, and the second light emitting signal line EM2 are high-level signals, so that the second transistor T2, the fourth transistor T4, and the ninth transistor T9 are turned on, and other switch transistors are turned off. The second transistor T2 is turned on such that the third node N3 and the fifth node N5 are turned on, and the ninth transistor T9 is turned on such that the first node N1 and the fifth node N5 are turned on. Since the third transistor T3 is continuously turned on in this stage, the fourth transistor T4 is turned on so that the data signal output by the data signal line DATA is provided to the first node N1 via the second node N2, the turned-on third transistor T3, the third node N3, the turned-on second transistor T2, the fifth node N5, and the turned-on ninth transistor T9, and the gate electrode of the third transistor T3 (the first end of the storage capacitor C) is charged with a difference between the voltage of the data signal output by the data signal line DATA and a threshold voltage of the third transistor T3. The voltage of the first node N1 is Vd−|Vth|, where Vd is the voltage of the data signal output by the data signal line DATA, and Vth is the threshold voltage of the third transistor T3.

In the second data writing sub-stage, a signal of the third scan signal line S3 is a low-level signal, and signals of the first scan signal line S1, the second scan signal line S2, the fourth scan signal line S4, the first light emitting signal line EM1, and the second light emitting signal line EM2 are high-level signals, so that the second transistor T2 is turned on and other switch transistors are turned off. Since the ninth transistor T9 is turned off, the first node N1 and the fifth node N5 are isolated, that is, the gate electrodes of the second transistor T2 and the third transistor T3 are isolated, and an influence of the difference in the characteristics of the second transistor T2 on the first node N1 is excluded in the circuit, thus excluding the influence of the difference in the characteristics of the second transistor T2 on the light emitting current, and uniformity of the low gray scale display picture can be improved, so that a low gray scale image quality can be improved.

The fourth stage B4 may be referred to as a second reset stage, and may at least include a first reset sub-stage and a second reset sub-stage, in which a first electrode of the light emitting device and the first electrode of the third transistor T3 are reset respectively.

In the first reset sub-stage, signals of the first scan signal line S1, the third scan signal line S3, and the fourth scan signal line S4 are low-level signals, and signals of the second scan signal line S2, the first light emitting signal line EM1, and the second light emitting signal line EM2 are high-level signals, so that the seventh transistor T7 is turned on and other switch transistors are turned off. The seventh transistor T7 is turned on, so that a signal of the second initial signal line INIT2 is provided to the fourth node N4, to reset (initialize) the first electrode of the light emitting device EL, and clear original charge in the first electrode of the light emitting device EL, so that a potential of the fourth node N4 is Vinit2.

In the second reset sub-stage, signals of the first scan signal line S1, the third scan signal line S3, and the second light emitting signal line EM2 are low-level signals, and signals of the second scan signal line S2, the fourth scan signal line S4, and the first light emitting signal line EM1 are high-level signals, so that the sixth transistor T6 is turned on and other switch transistors are turned off. Since the third transistor T3 is continuously turned on in this stage, the sixth transistor T6 is turned on so that the potentials of the second node N2 (the first electrode of the third transistor T3), the third node N3 (the second electrode of the third transistor T3) and the fourth node N4 are all Vinit2, to reset (initialize) the first electrode of the third transistor T3 and the second electrode of the third transistor T3.

The fifth stage B5 may be referred to as a light emitting stage. Signals of the first scan signal line S1, the third scan signal line S3, the first light emitting signal line EM1, and the second light emitting signal line EM2 are low-level signals, and signals of the second scan signal line S2 and the fourth scan signal line S4 are high-level signals, so that the fifth transistor T5 and the sixth transistor T6 are turned on, and other switch transistors are turned off. The fifth transistor T5 and the sixth transistor T6 are turned on, so that the power supply signal output by the first power supply line VDD provides a drive current to the first electrode of the light emitting device EL through the turned-on fifth transistor T5, the second node N2, the turned-on third transistor T3, the third node N3, and the turned-on sixth transistor T6, to drive the light emitting device EL to emit light.

In a drive process of the pixel drive circuit, a drive current flowing through the third transistor T3 (a drive transistor) of each pixel drive circuit is determined by a voltage difference between a gate electrode and a first electrode of the third transistor T3. Since the voltage of the first node N1 is Vd−|Vth|, the drive current of the third transistor T3 is as follows:

$$I=K*(Vgs-Vth)^2=K*[(Vdd-Vd+|Vth|)-Vth]^2=K*[(Vdd-Vd]^2$$

Herein, I is the drive current flowing through the third transistor T3, that is, a drive current for driving the light emitting device EL, K is a constant related to process and design, and Vgs is the voltage difference between the gate electrode and the first electrode of the third transistor T3.

It can be seen from derivation results of the above current formula that in the light emitting stage, the drive current of the third transistor T3 of each pixel drive circuit is not affected by the threshold voltage of the third transistor T3. Therefore, an influence of the threshold voltage of the third transistor T3 on the drive current is eliminated, which can ensure uniformity of the display brightness of the display product, and improve an overall display effect of the display product.

In an exemplary implementation, the hold frame has no data written to it, and the at least one hold frame may at least include a hold period C1 and a next frame reset stage C2.

In an exemplary implementation, in the hold period C1, a signal of the fourth scan signal line S4 is a low-level signal, the seventh transistor T7 is turned on, to achieve resetting the first electrode of the light emitting device, and other switch transistors are kept in their original state.

In an exemplary implementation, in the next frame reset stage C2, a signal of the first light emitting signal line EM1 is a low-level signal, a signal of the second light emitting signal line EM2 is a high-level signal, the fifth transistor T5 is turned on, the sixth transistor T6 is turned off, the power supply signal output by the first power supply line VDD is provided to the second node N2 (the first electrode of the third transistor T3), to reset the second node N2. Subsequently, the first stage B1 of the refresh frame is performed, the first transistor T1 and the ninth transistor T9 are turned on, and the potential of the first node N1 and the fifth node N5 are Vinit1. At this time, the gate-source voltage Vgs of the third transistor T3 is Vinit1-Vdd, which is greater than the bias state (Vd+Vth−Vdd) to which the third transistor T3 was subjected in the previous frame, and the reset of each frame enables a degree of the characteristic shift of the third transistor T3 to be maintained consistently, so that the difference in the brightness of the switching of different pictures to gray scale pictures can be improved, and the afterimage can be improved.

In an exemplary implementation, in the present disclosure, the ninth transistor T9 is provided between the gate electrodes of the second transistor T2 and the third transistor T3, and the ninth transistor T9 is turned off before the second transistor T2 in the third stage B3 of the refresh frame, thus excluding the influence of the difference in the characteristics of the second transistor T2 on the light emitting current in the circuit, and the uniformity of the low gray scale display picture can be improved, so that the low gray scale image quality can be improved. In addition, the present disclosure utilizes the characteristic of small leakage current of the oxide second transistor T2, so that the voltage stored in the storage capacitor remains stable, and thus is not affected by the leakage current, and low-frequency display is realized.

An exemplary embodiment of the present disclosure provides a display substrate including a plurality of circuit units constituting a plurality of unit rows and a plurality of unit columns. At least one of the circuit units includes a pixel drive circuit configured to output a drive current to a light emitting device connected to the pixel drive circuit. The pixel drive circuit at least includes a second transistor as a compensation transistor, a third transistor as a drive transistor, a fourth transistor as a data writing transistor, and a ninth transistor as an isolation transistor. The second transistor is an oxide transistor, and the third transistor, the fourth transistor, and the ninth transistor are poly silicon transistors. A gate electrode of the third transistor is connected to a second electrode of the ninth transistor, a first electrode of the third transistor is connected to a second electrode of the fourth transistor, a second electrode of the third transistor is connected to a second electrode of the second transistor, a first electrode of the second transistor is connected to a first electrode of the ninth transistor, and a first electrode of the fourth transistor is connected to a data signal line. The display substrate is configured to display respective display contents, and the display contents include a plurality of display frames. At least one display frame includes a refresh frame and at least one hold frame. The refresh frame at least includes a data writing stage. The second transistor and the ninth transistor are configured such that, in the data writing stage, a moment at which the ninth transistor is turned off is earlier than a moment at which the second transistor is turned off.

In an exemplary implementation, the data writing stage at least includes a first writing sub-stage, in the first writing sub-stage, the second transistor, the fourth transistor, and the ninth transistor are turned on, and a data signal output by the data signal line is provided to the gate electrode of the third transistor.

In an exemplary implementation, the data writing stage further includes a second writing sub-stage after the first writing sub-stage. In the second writing sub-stage, the second transistor is turned on and the ninth transistor is turned off, isolating the second transistor from the gate electrode of the third transistor.

In an exemplary implementation, the pixel drive circuit further includes a first transistor as a first initialization transistor, a first electrode of the first transistor is connected to a first initial signal line, and a second electrode of the first transistor is connected to the first electrode of the second transistor. The refresh frame further includes a first reset stage before the data writing stage, in the first reset stage, the first transistor and the ninth transistor are turned on, and a first initial signal output by the first initial signal line is provided to the gate electrode of the third transistor to reset the gate electrode of the third transistor.

In an exemplary implementation, in the first reset stage, the fourth transistor is turned on, and data signals of other unit rows output by the data signal line are provided to the first electrode of the third transistor to reset characteristics of the third transistor.

In an exemplary implementation, the refresh frame further includes a second reset stage after the data writing stage, and in the second reset stage, a first electrode of the light emitting device and the first electrode of the third transistor are reset, respectively.

In an exemplary implementation, the pixel drive circuit further includes a seventh transistor as a second initialization transistor. A first electrode of the seventh transistor is connected to the second initial signal line, and a second electrode of the seventh transistor is connected to the first electrode of the light emitting device. The second reset stage at least includes a first reset sub-stage, in the first reset sub-stage, the seventh transistor is turned on, a second initial signal output by the second initial signal line is provided to the first electrode of the light emitting device, to reset the first electrode of the light emitting device.

In an exemplary implementation, the pixel drive circuit further includes a fifth transistor as a first light emitting control transistor and a sixth transistor as a second light emitting control transistor. A first electrode of the fifth transistor is connected to a first power supply line, a second electrode of the fifth transistor is connected to the first electrode of the third transistor, a first electrode of the sixth transistor is connected to the second electrode of the third transistor, and a second electrode of the sixth transistor is connected to the first electrode of the light emitting device. The second reset stage further includes a second reset sub-stage after the first reset sub-stage, in the second reset sub-stage, the sixth transistor is turned on to reset the first electrode of the third transistor and the second electrode of the third transistor.

In an exemplary implementation, the refresh frame further includes a light emitting stage after the second reset stage, in the light emitting stage, the fifth transistor and the sixth transistor are turned on, and the first power supply line provides a drive current to the light emitting device to drive the light emitting device to emit light.

In an exemplary implementation, the pixel drive circuit further includes a seventh transistor as a second initialization transistor. A first electrode of the seventh transistor is connected to the second initial signal line, and a second electrode of the seventh transistor is connected to the first electrode of the light emitting device. The hold frame at least includes a holding stage, in the holding stage, the seventh transistor is turned on, a second initial signal output by the second initial signal line is provided to the first electrode of the light emitting device, to reset the first electrode of the light emitting device.

In an exemplary implementation, the pixel drive circuit further includes a fifth transistor as a first light emitting control transistor. A first electrode of the fifth transistor is connected to the first power supply line, and a second electrode of the fifth transistor is connected to the first electrode of the third transistor. The hold frame further includes a next frame reset stage after the holding stage. In the next frame reset stage, the fifth transistor is turned on, a power supply signal output by the first power supply line is provided to the first electrode of the third transistor, to reset the first electrode of the third transistor.

In an exemplary implementation, the ninth transistor is disposed between the second transistor and the fourth transistor in a unit row direction.

In an exemplary implementation, the second transistor at least includes a second active layer, the fourth transistor at least includes a fourth active layer, and the ninth transistor at least includes a ninth active layer, the ninth active layer is disposed between the second active layer and the fourth active layer in the unit row direction.

In an exemplary implementation, a channel region of the ninth active layer is disposed between a channel region of the second active layer and a channel region of the fourth active layer in the unit row direction.

Figure 33:
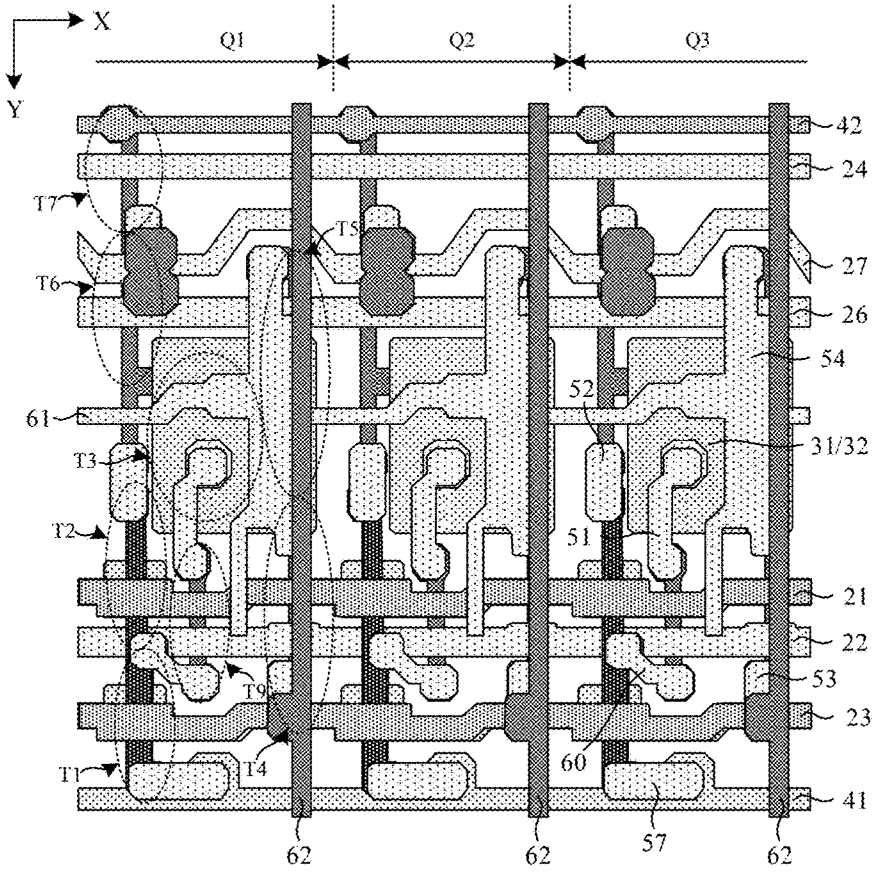
FIG. 33 is a schematic diagram of a planar structure of another display substrate according to an exemplary embodiment of the present disclosure.

FIG. 33 is a schematic diagram of a planar structure of another display substrate according to an exemplary embodiment of the present disclosure. In an exemplary implementation, the display substrate may include a plurality of circuit units. The plurality of circuit units may form a plurality of unit rows and a plurality of unit columns, the plurality of circuit units in each unit row are sequentially arranged along the first direction X, and the plurality of unit rows are sequentially arranged along a second direction Y, constituting a circuit unit array arranged in an array, and the first direction X and the second direction Y intersect.

As shown in FIG. 33, at least one circuit unit may include a pixel drive circuit, and a first scan signal line 21, a second scan signal line 22, a third scan signal line 23, a fourth scan signal line 24, a first light emitting signal line 26, a second light emitting signal line 27, a first initial signal line 41, a second initial signal line 42, a first power supply line 61, and a data signal line 62 connected to the pixel drive circuit. In an exemplary implementation, the first scan signal line 21, the second scan signal line 22, the third scan signal line 23, the fourth scan signal line 24, the first light emitting signal line 26, the second light emitting signal line 27, the first initial signal line 41, the second initial signal line 42, and the first power supply line 61 may be in a shape of a straight line or a bending line in which a main body portion extends along the first direction X, and the data signal line 62 may be in a shape of a straight line or a bending line in which a main body portion extends along the second direction Y.

In an exemplary implementation, at least one pixel drive circuit may at least include a storage capacitor and a plurality of transistors, the storage capacitor may include a first plate 31 and a second plate 32 which are stacked, and the plurality of transistors may include a first transistor T1 as a first initialization transistor, a second transistor T2 as a compensation transistor, a third transistor T3 as a drive transistor, a fourth transistor T4 as a data writing transistor, a fifth transistor T5 as a first light emitting control transistor, a sixth transistor T6 as a second light emitting control transistor, a seventh transistor T7 as a second initialization transistor, and a ninth transistor T9 as an isolation transistor. The first transistor T1 and the second transistor T2 are oxide transistors, and the third transistor T3 to the seventh transistor T7 and the ninth transistor T9 are low temperature poly silicon transistors.

In an exemplary implementation, a gate electrode of the first transistor T1 is connected to the third scan signal line 23, a first electrode of the first transistor T1 is connected to the first initial signal line 41 through the seventh connection electrode 57, and a second electrode of the first transistor T1 and a first electrode of the second transistor T2 are connected to a first electrode of the ninth transistor T9 through the tenth connection electrode 60. A gate electrode of the second transistor T2 is connected to the first scan signal line 21, and a second electrode of the second transistor T2 is connected to a second electrode of the third transistor T3 and a first electrode of the sixth transistor T6 through the second connection electrode 52. A gate electrode of the fourth transistor T4 is connected to the second scan signal line 22, a first electrode of the fourth transistor T4 is connected to the data signal line 62 through the third connection electrode 53, and a second electrode of the fourth transistor T4 is connected to a first electrode of the third transistor T3 and a second electrode of the fifth transistor T5. A gate electrode of the fifth transistor T5 is connected to the first light emitting signal line 26, and a first electrode of the fifth transistor T5 is connected to the first power supply line 61 through the fourth connection electrode 54. A gate electrode of the sixth transistor T6 is connected with a second light emitting signal line 27, and a second electrode of the sixth transistor T6 is connected with a second electrode of the seventh transistor T7. A gate electrode of the seventh transistor T7 is connected with a fourth scan signal line 24, and a first electrode of the seventh transistor T7 is connected with a second initial signal line 42. A gate electrode of the ninth transistor T 9 is connected to the second scan signal line 22, and a second electrode of the ninth transistor T 9 is connected to the gate electrode of the third transistor T3 (the first plate of the storage capacitor) through the first connection electrode 51.

In an exemplary implementation, the ninth transistor T9 may be disposed between the second transistor T2 and the fourth transistor T4 in the first direction X.

In an exemplary implementation, the second transistor T2 may at least include a second active layer, the fourth transistor T4 may at least include a fourth active layer, and the ninth transistor T9 may at least include a ninth active layer. In at least one circuit unit, the ninth active layer may be disposed between the second active layer and the fourth active layer in the first direction X.

In an exemplary implementation, in at least one circuit unit, the channel region of the ninth active layer is disposed between the channel region of the second active layer and the channel region of the fourth active layer in the first direction X.

In an exemplary implementation, in at least one circuit unit, the ninth active layer may be separately provided and located at a side of the third transistor T3 in the second direction Y, a first region of the ninth active layer may be connected to a second electrode of the first transistor T1 and a first electrode of the second transistor T2 through the tenth connection electrode 60, and a second region of the ninth active layer may be connected to the first plate 31 of the storage capacitor through the first connection electrode 51.

In an exemplary implementation, in at least one circuit unit, in the first direction X, the fifth transistor T5 and the sixth transistor T6 connected to a same third transistor T3 may be disposed at two sides of the third transistor T3 in the first direction X (the unit row direction), respectively, and in the second direction Y, the fifth transistor T5 and the sixth transistor T6 connected to a same third transistor T3 may be disposed at a same side of the third transistor T3 in the second direction Y (the unit column direction). For example, the fifth transistor T5 may be disposed at a side of the third transistor T3 in the first direction X, the sixth transistor T6 may be disposed at a side of the third transistor T3 in an opposite direction of the first direction X, and the fifth transistor T5 and the sixth transistor T6 may be disposed at a side of the third transistor T3 in an opposite direction of the second direction Y.

In an exemplary implementation, in a direction perpendicular to the display substrate, the display substrate may include a first semiconductor layer disposed on the base substrate, a first conductive layer disposed on a side of the first semiconductor layer away from the base substrate, a second conductive layer dispose on a side of the first conductive layer away from the base substrate, a second semiconductor layer dispose on a side of the second conductive layer away from the base substrate, a third conductive layer dispose on a side of the second conductive layer away from the base substrate, a fourth conductive layer dispose on a side of the third conductive layer away from the base substrate, and a fifth conductive layer dispose on a side of the fourth conductive layer away from the base substrate. The first semiconductor layer may at least include active layers of the third transistor T3 to the seventh transistor T7 and the ninth transistor T9, the first conductive layer may at least include a second scan signal line 22, a fourth scan signal line 24, a first light emitting signal line 26, a second light emitting signal line 27, and a first plate 31 of the storage capacitor, the second conductive layer may at least include a first initial signal line 41 and a second plate 32 of the storage capacitor, the second semiconductor layer may at least include active layers of the first transistor T1 and the second transistor T2, the third conductive layer may at least include a first scan signal line 21 and a third scan signal line 23, the fourth conductive layer may at least include a second initial signal line 42, a first power supply line 61 and a plurality of connection electrodes, and the fifth conductive layer may at least include a data signal line 62.

In an exemplary embodiment, taking three circuit units (the first circuit unit Q1, the second circuit unit Q2, and the third circuit unit Q3) as an example, the preparation process of the display substrate according to present embodiment may include the following operations.

Figure 34:
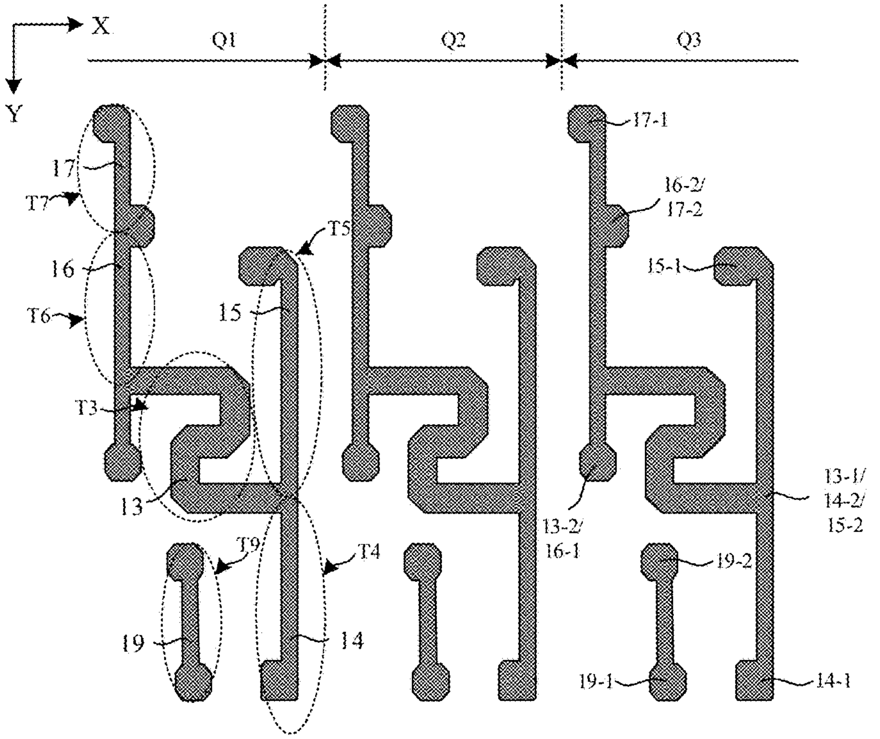
FIG. 34 is a schematic diagram of another display substrate after a pattern of a first semiconductor layer is formed according to the present disclosure.

(21) A pattern of a first semiconductor layer is formed. In an exemplary implementation, forming the pattern of the first semiconductor layer may include: sequentially depositing a first insulation thin film and a first semiconductor thin film on a base substrate, patterning the first semiconductor thin film by a patterning process to form a first insulation layer disposed on the base substrate, and the pattern of the first semiconductor layer disposed on the first insulation layer, as shown in FIG. 34.

In an exemplary implementation, the pattern of the first semiconductor layer in each circuit unit may at least include the third active layer 13 of the third transistor T3 to the seventh active layer 17 of the seventh transistor T7 and the ninth active layer 19 of the ninth transistor T9, and the third active layer 13 to the seventh active layer 17 are of an interconnected integral structure, and the ninth active layer 19 may be separately provided.

In an exemplary implementation, in the first direction X, the fourth active layer 14 and the fifth active layer 15 may be located on a side of the third active layer 13 in the present circuit unit in the first direction X, and the sixth active layer 16 and the seventh active layer 17 may be located on a side of the third active layer 13 in the present circuit unit in an opposite direction of the first direction X. In the second direction Y, the fourth active layer 14 and the ninth active layer 19 may be located on a side of the third active layer 13 in the present circuit unit in the second direction Y, and the fifth active layer 15, the sixth active layer 16, and the seventh active layer 17 may be located on a side of the third active layer 13 in the present circuit unit in an opposite direction of the second direction Y.

In an exemplary implementation, the third active layer 13 may be in a shape of an inverted "S", and the fourth active layer 14, the fifth active layer 15, the sixth active layer 16, the seventh active layer 17, and the ninth active layer 19 may be in a shape of a strip in which a main body portion extends along the second direction Y.

In an exemplary implementation, the third active layer 13 to the seventh active layer 17 and the ninth active layer 19 may each include a first region, a second region and a channel region located between the first region and the second region. In an exemplary implementation, the first region 13-1 of the third active layer, the second region 14-2 of the fourth active layer, and the second region 15-2 of the fifth active layer may be connected to each other, and the first region 13-1 of the third active layer may simultaneously serve as the second region 14-2 of the fourth active layer and the second region 15-2 of the fifth active layer. The second region 13-2 of the third active layer is connected to the first region 16-1 of the sixth active layer, and the second region 13-2 of the third active layer may serve as the first region 16-1 of the sixth active layer. The second region 16-2 of the sixth active layer is connected to the second region 17-2 of the seventh active layer, and the second region 16-2 of the sixth active layer may serve as the second region 17-2 of the seventh active layer. The first region 14-1 of the fourth active layer, the first region 15-1 of the fifth active layer, the first region 17-1 of the seventh active layer, the first region 18-1 of the ninth active layer, and the second region 18-2 of the ninth active layer may be separately provided.

In an exemplary implementation, the first semiconductor layer may be made of poly silicon (p-Si), i.e., the third transistor T3 to the seventh transistor T7 and the ninth transistor T9 are LTPS transistors. In an exemplary implementation, the patterning the first semiconductor thin film through the patterning process may include: forming an amorphous silicon (a-si) thin film on the first insulation thin film, dehydrogenating the amorphous silicon thin film, and crystallizing the dehydrogenated amorphous silicon thin film to form a poly silicon thin film. Subsequently, the poly silicon thin film is patterned to form the pattern of the first semiconductor layer.

Figure 35:
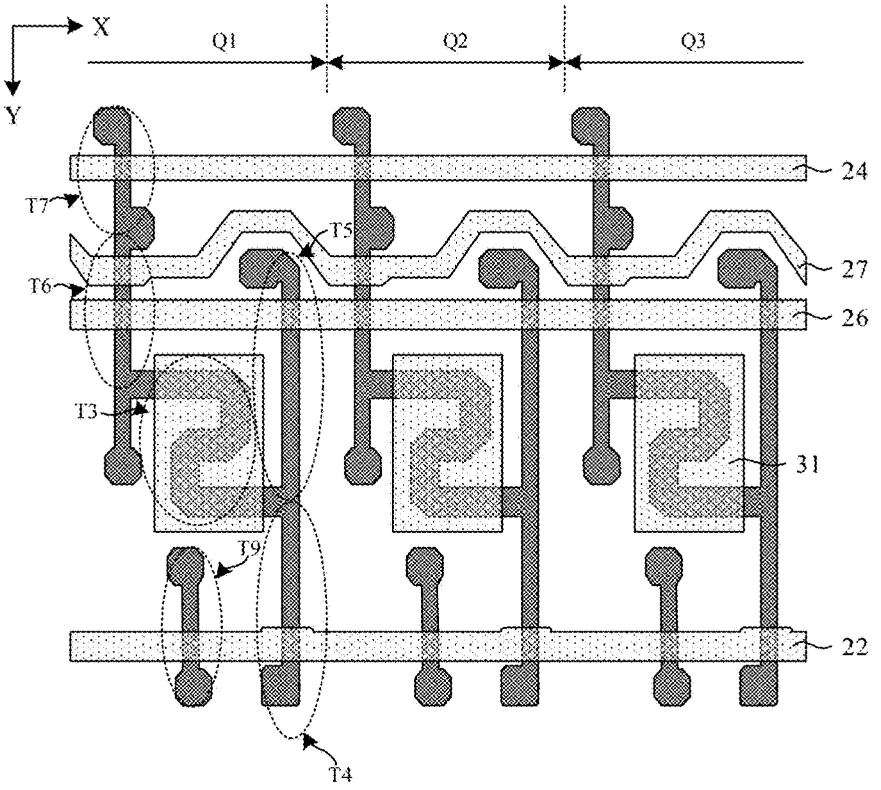
FIG. 35 is a schematic diagram of another display substrate after a pattern of a first conductive layer is formed according to the present disclosure.

(22) A pattern of a first conductive layer is formed. In an exemplary implementation, forming the pattern of the first conductive layer may include: sequentially depositing a second insulation thin film and a first conductive thin film on the base substrate on which the aforementioned pattern is formed, and patterning the first conductive thin film through a patterning process to form a second insulation layer that covers the pattern of the first semiconductor layer and a pattern of a first conductive layer disposed on the second insulation layer, as shown in FIG. 35. In an exemplary implementation, the first conductive layer may be referred to as a first gate metal (GATE1) layer.

In an exemplary implementation, the pattern of the first conductive layer of each circuit unit may at least include a second scan signal line 22, a fourth scan signal line 24, a first light emitting signal line 26, a second light emitting signal line 27, and a first plate 31 of the storage capacitor.

In an exemplary embodiment, the first plate 31 may be in a shape of a rectangle, and a chamfer may be provided at a corner of the rectangle. An orthographic projection of the first plate 31 on the base substrate is at least partially overlapped with an orthographic projection of the third active layer of the third transistor T3 on the base substrate. In an exemplary implementation, the first plate 31 may serve as one plate of the storage capacitor and a gate electrode of the third transistor T3 simultaneously.

In an exemplary embodiment, the second scan signal line 22 may be in a shape of a straight line or a bending line in which a main body portion extends along the first direction X, the second scan signal line 22 may be located on a side of the first plate 31 in the second direction Y, a region where the second scan signal line 22 overlaps with the fourth active layer may serve as the gate electrode of the fourth transistor T4, and a region where the second scan signal line 22 overlaps with the ninth active layer 19 may serve as the gate electrode of the ninth transistor T9.

In an exemplary implementation, the fourth scan signal line 24 may be in a shape of a straight line or a bending line in which a main body portion extends along the first direction X, the fourth scan signal line 24 may be located at a side of the first plate 31 in an opposite direction of the second direction Y, and a region where the fourth scan signal line 24 overlaps with the seventh active layer may serve as a gate electrode of the seventh transistor T7.

In an exemplary implementation, the first light emitting signal line 26 may be in a shape of a straight line or a bending line in which a main body portion extends along the first direction X, the first light emitting signal line 26 may be located between the first plate 31 and the fourth scan signal line 24, and a region where the first light emitting signal line 26 overlaps with the fifth active layer may serve as a gate electrode of the fifth transistor T5.

In an exemplary implementation, the second light emitting signal line 27 may be in a shape of a straight line or a bending line in which a main body portion extends along the first direction X, the second light emitting signal line 27 may be located between the first light emitting signal line 26 and the fourth scan signal line 24, and a region where the second light emitting signal line 27 overlaps with the sixth active layer may serve as a gate electrode of the sixth transistor T6.

In an exemplary implementation, after the pattern of the first conductive layer is formed, a conductive processing may be performed on the first semiconductor layer by using the first conductive layer as a shield, a first semiconductor layer in a region shielded by the first conductive layer forms channel regions of the third transistor T3 to the seventh transistor T7 and the ninth transistor T9, and a first semiconductor layer in a region not shielded by the first conductive layer is made to be conductive. That is, all of the first regions and the second regions of the third active layer 13 to the seventh transistor T7 and the ninth active layer 19 are made to be conductive.

Figure 36:
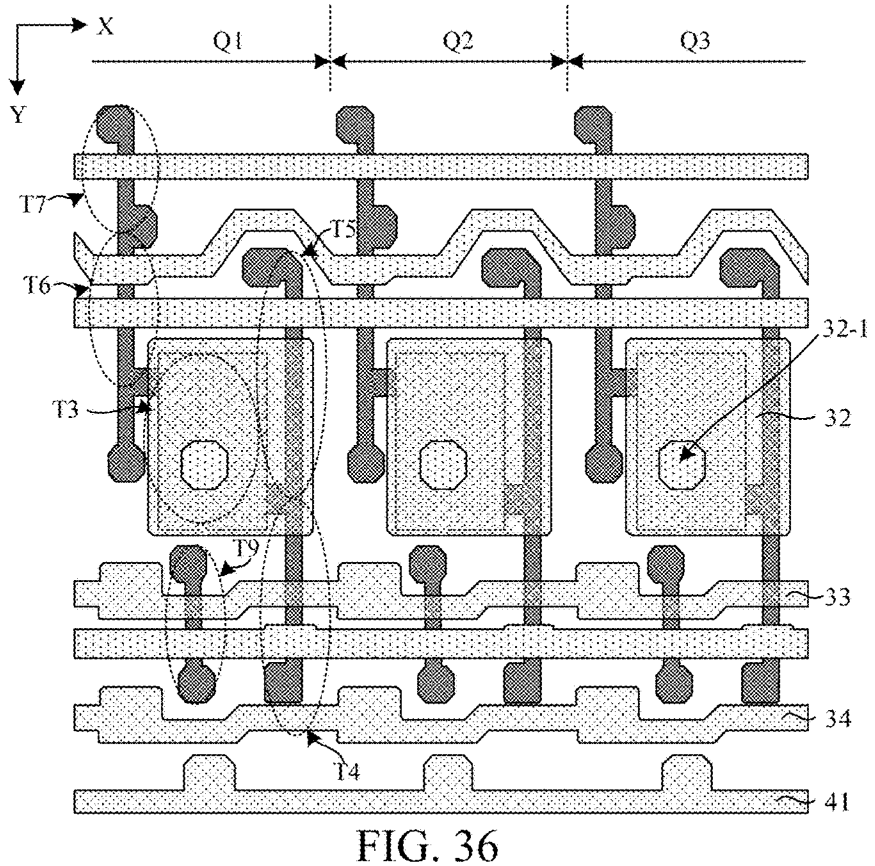
FIG. 36 is a schematic diagram of another display substrate after a pattern of a second conductive layer is formed according to the present disclosure.

(23) A pattern of a second conductive layer is formed. In an exemplary implementation, forming the pattern of the second conductive layer may include: a third insulation thin film and a second conductive thin film are sequentially deposited on the base substrate on which the aforementioned patterns are formed, and the second conductive thin film is patterned through a patterning process to form a third insulation layer that covers the first conductive layer, and the pattern of the second conductive layer disposed on the third insulation layer, as shown in FIG. 36. In an exemplary implementation, the second conductive layer may be referred to as a second gate metal (GATE2) layer.

In an exemplary implementation, the pattern of the second conductive layer of each circuit unit at least includes a second plate 32 of the storage capacitor, a first shield line 33, a second shield line 34, and a first initial signal line 41.

In an exemplary embodiment, a profile of second plate 32 may be in a shape of a rectangle, a chamfer may be provided at a corner of the rectangle, an orthographic projection of the second plate 32 on the base substrate is at least overlapped with an orthographic projection of the first plate 31 on the base substrate, the second plate 32 may serve as another plate of the storage capacitor, and the first plate 31 and the second plate 32 constitute the storage capacitor of the pixel drive circuit.

In an exemplary implementation, the second plate 32 is provided with an opening 32-1, the opening 32-1 may be in a shape of a rectangle, and the opening 32-1 may be located in a middle region of the second plate 32, so that the second plate 32 forms an annular structure. The opening 32-1 exposes the third insulation layer covering the first plate 31, and an orthographic projection of the first plate 31 on the base substrate contains an orthographic projection of the opening 32-1 on the base substrate. In an exemplary implementation, the opening 32-1 is configured to accommodate a fifteenth via to be formed subsequently located within the opening 32-1 and exposing the first plate 31, so that the first connection electrode to be formed subsequently is connected to the first plate 31 through the via.

In an exemplary implementation, the first shield line 33 may be in a shape of a straight line or a bending line in which a main body portion extends along the first direction X, the first shield line 33 may be located between the second plate 32 and the second scan signal line 22, the first shield line 33 is configured as a shield layer of the second transistor T2, shielding the channel region of the second transistor T2, ensuring the electrical performance of the oxide second transistor T2, and is also configured to serve as a bottom gate electrode of the second transistor T2.

In an exemplary implementation, the second shield line 34 may be in a shape of a straight line or a bending line in which a main body portion extends along the first direction X, the second shield line 34 may be located at a side of the second scan signal line 22 away from the second plate 32, the second shield line 34 is configured to serve as a shield layer of the first transistor T1, shielding the channel region of the first transistor T1, ensuring the electrical performance of the oxide first transistor T1, and is also configured to serve as a bottom gate electrode of the first transistor T1.

In an exemplary implementation, the first shield line 33 and the second shield line 34 may be of a non-equal width design, which may not only facilitate a layout of a pixel structure, but also reduce a parasitic capacitance between the signal lines.

In an exemplary implementation, the first initial signal line 41 may be in a shape of a straight line or a bending line in which a main body portion extends along the first direction X, the first initial signal line 41 may be located at a side of the second shield line 34 away from the second plate 32, and the first initial signal line 41 is configured to be connected to the first region of the first active layer through a seventh connection electrode to be formed subsequently.

Figure 37:
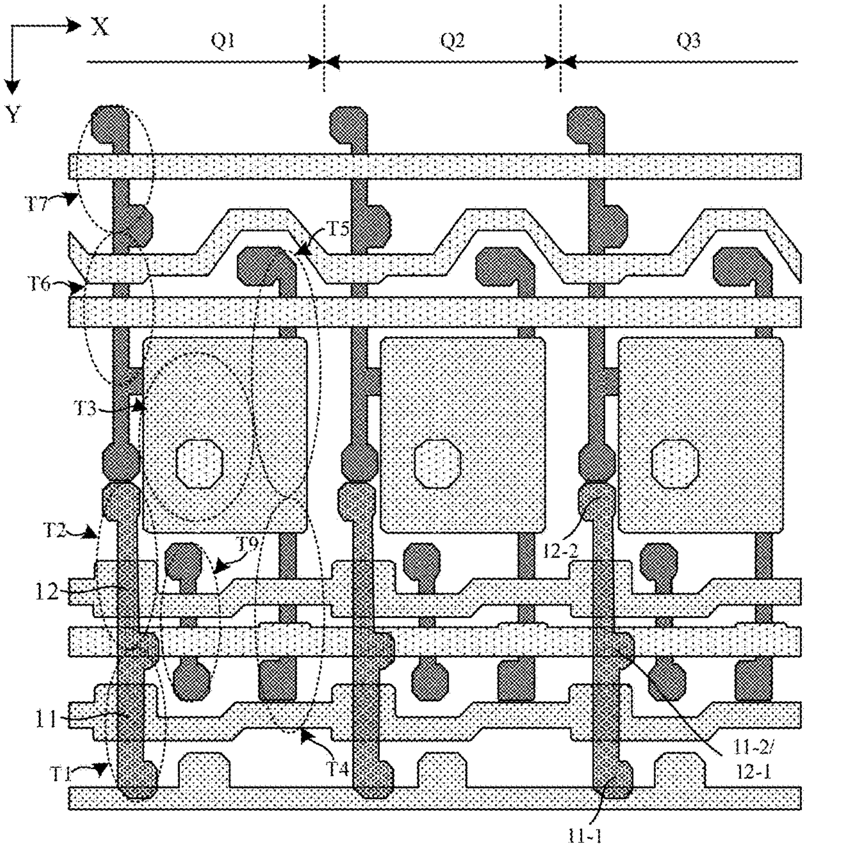
FIG. 37 is a schematic diagram of another display substrate after a pattern of a second semiconductor layer is formed according to the present disclosure.

(24) A pattern of a second semiconductor layer is formed. In an exemplary implementation, forming the pattern of the second semiconductor layer may include sequentially depositing a fourth insulation thin film and a second semiconductor thin film on the base substrate on which aforementioned patterns are formed, and patterning the second semiconductor thin film through a patterning process to form a fourth insulation layer covering the base substrate and the pattern of the second semiconductor layer disposed on the fourth insulation layer, as shown in FIG. 37.

In an exemplary implementation, a pattern of a second semiconductor layer of each circuit unit at least includes a first active layer 11 of the first transistor T1 and a second active layer 12 of the second transistor T2.

In an exemplary implementation, the first active layer 11 and the second active layer 12 may be in a shape of a strip in which a body portion extends along the second direction Y, an orthographic projection of the first active layer 11 on the base substrate is at least partially overlapped with an orthographic projection of the second shield line 34 on the base substrate, and an orthographic projection of the second active layer 12 on the base substrate is at least partially overlapped with an orthographic projection of the first shield line 33 on the base substrate.

In an exemplary implementation, a first region 11-1 of the first active layer may be located at a side of the second shield line 34 away from the second plate 32, a second region 12-2 of the second active layer may be located at a side of the first shield line 33 close to the second plate 32, a second region 11-2 of the first active layer is connected to a first region 12-1 of the second active layer, and the second region 11-2 of the first active layer may serve as the first region 12-1 of the second active layer.

In an exemplary implementation, the first active layer 11 and the second active layer 12 may be of an interconnected integral structure.

In an exemplary implementation, the second active layer 12 may be located on a side of the ninth active layer 19 in an opposite direction of the first direction X. Since the fourth active layer 14 is located on a side of the ninth active layer 19 in the first direction X, the ninth active layer 19 may be located between the second active layer 12 and the fourth active layer 14 in the first direction X.

In an exemplary implementation, the channel region of the ninth active layer 19 may be located between the channel region of the second active layer 12 and the channel region of the fourth active layer 14.

In an exemplary implementation, the second semiconductor layer may be made of an oxide, that is, the first transistor T1 and the second transistor T2 are oxide transistors. In an exemplary implementation, the second semiconductor thin film may be made of Indium Gallium Zinc Oxide (IGZO), wherein electron mobility of the Indium Gallium Zinc Oxide (IGZO) is higher than that of amorphous silicon.

Figure 38:
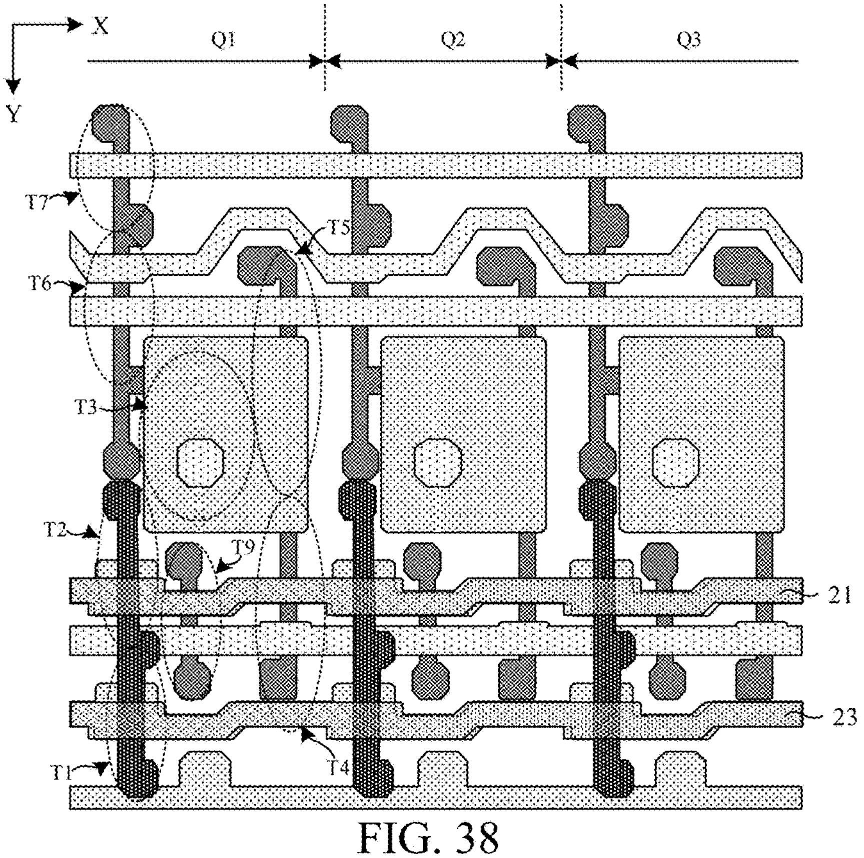
FIG. 38 is a schematic diagram of another display substrate after a pattern of a third conductive layer is formed according to the present disclosure.

(25) A pattern of a third conductive layer is formed. In an exemplary implementation, forming the pattern of the third conductive layer may include sequentially depositing a fifth insulation thin film and a third conductive thin film on the base substrate on which aforementioned patterns are formed, patterning the third conductive thin film using a patterning process to form a fifth insulation layer covering the second semiconductor layer, and the pattern of the third conductive layer disposed on the fifth insulation layer, as shown in FIG. 38. In an exemplary implementation, the third conductive layer may be referred to as a third gate metal (GATE3) layer.

In an exemplary implementation, a pattern of a third conductive layer of each circuit unit at least includes a first scan signal line 21 and a third scan signal line 23.

In an exemplary implementation, the first scan signal line 21 may be in a shape of a straight line or a bending line in which a main body portion extends along the first direction X, the first scan signal line 21 may be located between the second plate 32 and the second scan signal line 22, and a region where the first scan signal line 21 overlaps with the second active layer may serve as a gate electrode of the second transistor T2.

In an exemplary implementation, an orthographic projection of the first scan signal line 21 on the base substrate is at least partially overlapped with an orthographic projection of the first shield line 33 on the base substrate, and the first scan signal line 21 and the first shield line 33 may be connected to a same signal source, so that the first shield line 33 may serve as a bottom gate electrode of the second transistor T2, and the first scan signal line 21 may serve as a top gate electrode of the second transistor T2, to form the second transistor T2 with a top gate and bottom gate structure.

In an exemplary implementation, the third scan signal line 23 may be in a shape of a straight line or a bending line in which a main body portion extends along the first direction X, the third scan signal line 23 may be located between the second scan signal line 22 and the first initial signal line 41, and a region where the third scan signal line 23 overlaps with the first active layer may serve as a gate electrode of the first transistor T1.

In an exemplary implementation, an orthographic projection of the third scan signal line 23 on the base substrate is at least partially overlapped with an orthographic projection of the second shield line 34 on the base substrate, and the third scan signal line 23 and the second shield line 34 may be connected to a same signal source, so that the second shield line 34 may serve as a bottom gate electrode of the first transistor T1, and the third scan signal line 23 may serve as a top gate electrode of the first transistor T1, to form the first transistor T1 with a top gate and bottom gate structure.

Figure 39:
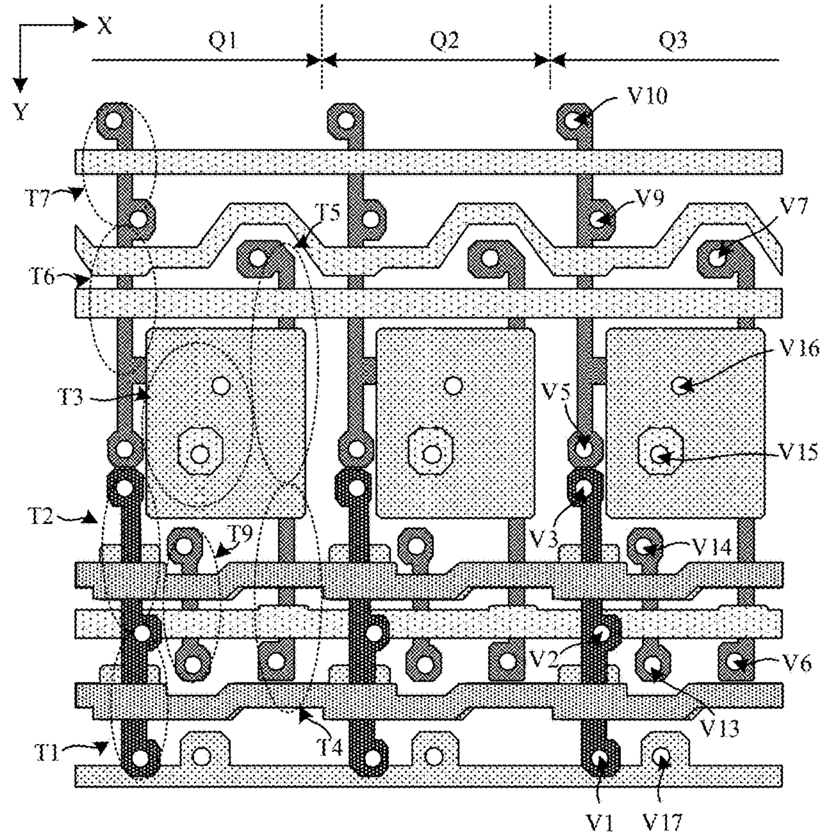
FIG. 39 is a schematic diagram of another display substrate after a pattern of a sixth insulation layer is formed according to the present disclosure.

(26) A pattern of a sixth insulation layer is formed. In an exemplary implementation, forming the pattern of the sixth insulation layer may include: depositing a sixth insulation thin film on the base substrate on which the aforementioned patterns are formed, patterning the fifth insulation thin film using a patterning process to form a sixth insulation layer covering the third conductive layer, wherein a plurality of vias are provided on the sixth insulation layer, as shown in FIG. 39.

In an exemplary implementation, the plurality of vias of each circuit unit at least include a first via V1, a second via V2, a third via V3, a fifth via V5, a sixth via V6, a seventh via V7, a ninth via V9, a tenth via V10, a thirteenth via V13, a fourteenth via V14, a fifteenth via V15, a sixteenth via V16, and a seventeenth via V17.

In an exemplary implementation, an orthographic projection of the first via V1 on the base substrate is within a range of an orthographic projection of the first region of the first active layer on the base substrate, the sixth insulation layer and the fifth insulation layer in the first via V1 are etched away to expose a surface of the first region of the first active layer, and the first via V1 is configured such that the seventh connection electrode to be formed subsequently is connected with the first region of the first active layer through the first via V1.

In an exemplary implementation, an orthographic projection of the second via V2 on the base substrate is within a range of an orthographic projection of the second region of the first active layer (also the first region of the second active layer) on the base substrate, the sixth insulation layer and the fifth insulation layer within the second via V2 are etched away to expose a surface of the second region of the first active layer (also the first region of the second active layer), and the second via V2 is configured such that the tenth connection electrode to be formed subsequently is connected with the second region of the first active layer (also the first region of the second active layer) through the second via V2.

In an exemplary implementation, an orthographic projection of the third via V3 on the base substrate is within a range of an orthographic projection of the second region of the second active layer on the base substrate, the sixth insulation layer and the fifth insulation layer within the third via V3 are etched away to expose a surface of the second region of the second active layer, and the third via V3 is configured such that a second connection electrode to be formed subsequently is connected to the second region of the second active layer through the third via V3.

In an exemplary embodiment, an orthographic projection of the fifth via V5 on the base substrate is within an orthographic projection of the second region of the third active layer (also the first region of the sixth active layer) on the base substrate, the sixth insulation layer, the fifth insulation layer, the fourth insulation layer, the third insulation layer and the second insulation layer within the fifth via V5 are etched away to expose a surface of the second region of the third active layer (also the first region of the sixth active layer), and the fifth via V5 is configured such that a second connection electrode to be formed subsequently is connected to the second region of the third active layer (also the first region of the sixth active layer) through the fifth via V5.

In an exemplary implementation, an orthographic projection of the sixth via V6 on the base substrate is within a range of an orthographic projection of a first region of the fourth active layer on the base substrate, the sixth insulation layer, the fifth insulation layer, the fourth insulation layer, the third insulation layer and the second insulation layer within the sixth via V6 are etched away to expose a surface of the first region of the fourth active layer, and the sixth via V6 is configured such that a third connection electrode to be formed subsequently is connected to the first region of the fourth active layer through the sixth via V6.

In an exemplary implementation, an orthographic projection of the seventh via V7 on the base substrate is within a range of an orthographic projection of a first region of the fifth active layer on the base substrate, the sixth insulation layer, the fifth insulation layer, the fourth insulation layer, the third insulation layer and the second insulation layer within the seventh via V7 are etched away to expose a surface of the first region of the fifth active layer, and the seventh via V7 is configured such that the fourth connection electrode to be formed subsequently is connected to the first region of the fifth active layer through the seventh via V7.

In an exemplary embodiment, an orthographic projection of the ninth via V9 on the base substrate is within an orthographic projection of the second region of the sixth active layer (also the second region of the seventh active layer) on the base substrate, the sixth insulation layer, the fifth insulation layer, the fourth insulation layer, the third insulation layer and the second insulation layer within the ninth via V9 are etched away to expose a surface of the second region of the sixth active layer (also the second region of the seventh active layer), and the ninth via V9 is configured such that a fifth connection electrode to be formed subsequently is connected to the second region of the sixth active layer (also the second region of the seventh active layer) through the ninth via V9.

In an exemplary implementation, an orthographic projection of the tenth via V10 on the base substrate is within a range of an orthographic projection of the first region of the seventh active layer on the base substrate, the sixth insulation layer, the fifth insulation layer, the fourth insulation layer, the third insulation layer, and the second insulation layer within the tenth via V10 are etched away to expose a surface of the first region of the seventh active layer, and the tenth via V10 is configured such that the second initial signal line to be formed subsequently is connected with the first region of the seventh active layer through the tenth via V10.

In an exemplary implementation, an orthographic projection of the thirteenth via V13 on the base substrate is within a range of an orthographic projection of the first region of the ninth active layer on the base substrate, the sixth insulation layer, the fifth insulation layer, the fourth insulation layer, the third insulation layer, and the second insulation layer in the thirteenth via V13 are etched away to expose a surface of the first region of the ninth active layer, and the thirteenth via V13 is configured such that the tenth connection electrode to be formed subsequently is connected with the first region of the ninth active layer through the thirteenth via V13.

In an exemplary implementation, an orthographic projection of the fourteenth via V14 on the base substrate is within a range of an orthographic projection of the second region of the ninth active layer on the base substrate, the sixth insulation layer, the fifth insulation layer, the fourth insulation layer, the third insulation layer, and the second insulation layer within the fourteenth via V14 are etched away to expose a surface of the second region of the ninth active layer, and the fourteenth via V14 is configured such that the first connection electrode to be formed subsequently is connected with the second region of the ninth active layer through the fourteenth via V14.

In an exemplary implementation, an orthographic projection of the fifteenth via V15 on the base substrate is located within a range of an orthographic projection of the opening 32-1 on the base substrate, the sixth insulation layer, the fifth insulation layer, the fourth insulation layer, and the third insulation layer in the fifteenth via V15 are etched away to expose a surface of the first plate 31, and the fifteenth via V15 is configured such that the first connection electrode to be formed subsequently is connected with the first plate 31 through the fifteenth via V15.

In an exemplary implementation, an orthographic projection of the sixteenth via V16 on the base substrate is within a range of an orthographic projection of the second plate 32 on the base substrate, the sixth insulation layer, the fifth insulation layer, and the fourth insulation layer within the sixteenth via V16 are etched away to expose a surface of the second plate 32, and the sixteenth via V16 is configured such that the first power supply line to be formed subsequently is connected with the second plate 32 through the sixteenth via V16.

In an exemplary implementation, an orthographic projection of the seventeenth via V17 on the base substrate is within a range of an orthographic projection of the first initial signal line 41 on the base substrate, the sixth insulation layer, the fifth insulation layer, and the fourth insulation layer in the seventeenth via V17 are etched away to expose a surface of the first initial signal line 41, and the seventeenth via V17 is configured such that the seventh connection electrode to be formed subsequently is connected with the first initial signal line 41 through the seventeenth via V17.

Figure 40:
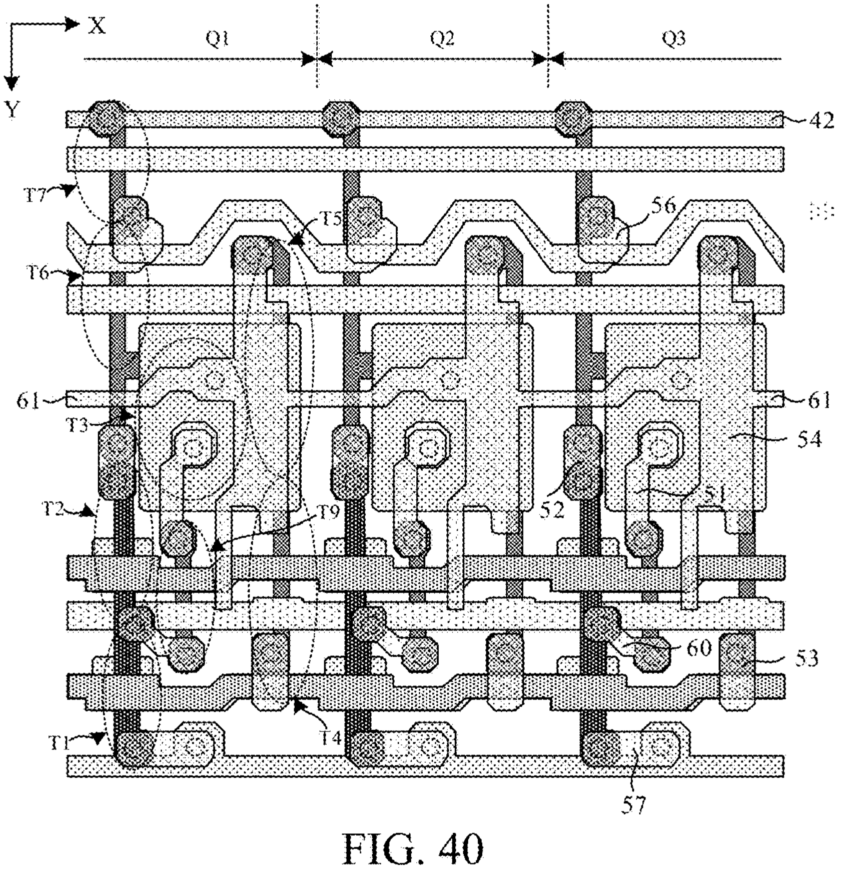
FIG. 40 is a schematic diagram of another display substrate after a pattern of a fourth conductive layer is formed according to the present disclosure.

(27) A pattern of a fourth conductive layer is formed. In an exemplary implementation, forming the fourth conductive layer may include: depositing a fourth conductive thin film on the base substrate on which the aforementioned patterns are formed, patterning the fourth conductive thin film using a patterning process to form the fourth conductive layer disposed on the sixth insulation layer, as shown in FIG. 40. In an exemplary implementation, the fourth conductive layer may be referred to as a first source-drain metal (SD1) layer.

In an exemplary implementation, the fourth conductive layer of each circuit unit at least includes a first connection electrode 51, a second connection electrode 52, a third connection electrode 53, a fourth connection electrode 54, a sixth connection electrode 56, a seventh connection electrode 57, a tenth connection electrode 60, and a first power supply line 61.

In an exemplary implementation, the first power supply line 61 may be in a shape of a straight line or a bending line in which a main body portion extends along the first direction X, and the first power supply line 61 is connected to the second plate 32 of each circuit unit through the sixteenth via V16.

In an exemplary implementation, the first connection electrode 51 may be in a shape of a strip in which a main body portion extends along the second direction Y, a first end of the first connection electrode 51 is connected to the second region of the ninth active layer through the fourteenth via V14, and a second end of the first connection electrode 51 is connected to the first plate 31 through the fifteenth via V15. In an exemplary implementation, since the first plate 31 also serves as the gate electrode of the third transistor T3, the first connection electrode 51 enables the gate electrode of the third transistor T3, the second electrode of the ninth transistor T9, and the first plate 31 to have a same potential and form the first node N1 of the pixel drive circuit.

In an exemplary implementation, the second connection electrode 52 may be in a shape of a strip in which a main body portion extends along the second direction Y, a first end of the second connection electrode 52 is connected to the second region of the second active layer through the third via V3, and a second end of the second connection electrode 52 is connected to the second region of the third active layer (also the first region of the sixth active layer) through the fifth via V5. In an exemplary implementation, the second connection electrode 52 enables the second electrode of the second transistor T2, the second electrode of the third transistor T3, and the first electrode of the sixth transistor T6 to have a same potential and form the third node N3 of the pixel drive circuit.

In an exemplary implementation, the third connection electrode 53 may be in a shape of a block (such as a rectangle), the third connection electrode 53 is connected to the first region of the fourth active layer through the sixth via V6, and the third connection electrode 53 is configured to be connected to the data signal line to be formed subsequently.

In an exemplary implementation, the fourth connection electrode 54 may be in a shape of a strip extending along the second direction Y, a first end of the fourth connection electrode 54 is connected to the first region of the fifth active layer through the seventh via V7, a second end of the fourth connection electrode 54 extends along the second direction Y to a side of the second plate 32 in the second direction Y, and the fourth connection electrode 54 is connected to the first power supply line 61 at a position between the first end and the second end of the fourth connection electrode 54. Since the first power supply line 61 is connected to the second plate 32 of each circuit unit, the fourth connection electrode 54 enables the first power supply line 61 to write a power supply signal to the first electrode of the fifth transistor T5 and the second plate 32 of the storage capacitor, the first electrodes of the fifth transistors T5 and the second plates 32 of the storage capacitors of a plurality of circuit units in one unit row have a same potential.

In an exemplary implementation, in one unit row, the first power supply line 61 and a plurality of fourth connection electrodes 54 may be of an interconnected integral structure, which may ensure that the first electrodes of the fifth transistors T5 and the second plates 32 of the storage capacitors of a plurality of circuit units in one unit row have a same potential, which is beneficial to improving uniformity of a panel, avoiding poor display of the display substrate, and ensuring a display effect of the display substrate.

In an exemplary implementation, the sixth connection electrode 56 may be in a shape of a block (such as a rectangle), and the sixth connection electrode 56 is connected to the second region of the sixth active layer (also the second region of the seventh active layer) through the ninth via V9. In an exemplary implementation, the sixth connection electrode 56 is configured to be connected to an anode connection electrode to be formed subsequently.

In an exemplary implementation, the seventh connection electrode 57 may be in a shape of a strip in which a main body portion extends along the first direction X, a first end of the seventh connection electrode 57 is connected to the first region of the first active layer through the first via V1, and a second end of the seventh connection electrode 57 is connected to the first initial signal line 41 through the seventeenth via V17. In an exemplary implementation, the seventh connection electrode 57 realizes a connection between the first initial signal line 41 and the first electrode of the first transistor T1, and the first initial signal line 41 can write a first initial signal to the first electrode of the first transistor T1.

In an exemplary implementation, the tenth connection electrode 60 may be in a shape of a strip in which a main body portion extends along the first direction X, a first end of the tenth connection electrode 60 is connected to the second region of the first active layer (also the first region of the second active layer) through the second via V2, and a second end of the tenth connection electrode 60 is connected to the first region of the ninth active layer through the thirteenth via V13. In an exemplary implementation, the tenth connection electrode 60 realizes a connection between the second electrode of the first transistor T1, the first electrode of the second transistor T2, and the first electrode of the ninth transistor T9, forming the fifth node N5 of the pixel drive circuit.

In an exemplary implementation, the second initial signal line 42 may be in a shape of a straight line or a bending line in which a main body portion extends along the first direction X, the second initial signal line 42 may be located at a side of the fourth scan signal line 24 away from the second plate 32, the second initial signal line 42 is connected to the first region of the seventh active layer through the tenth via V10, and the second initial signal line 42 may write a second initial signal to the first electrode of the seventh transistor T7.

Figure 41:
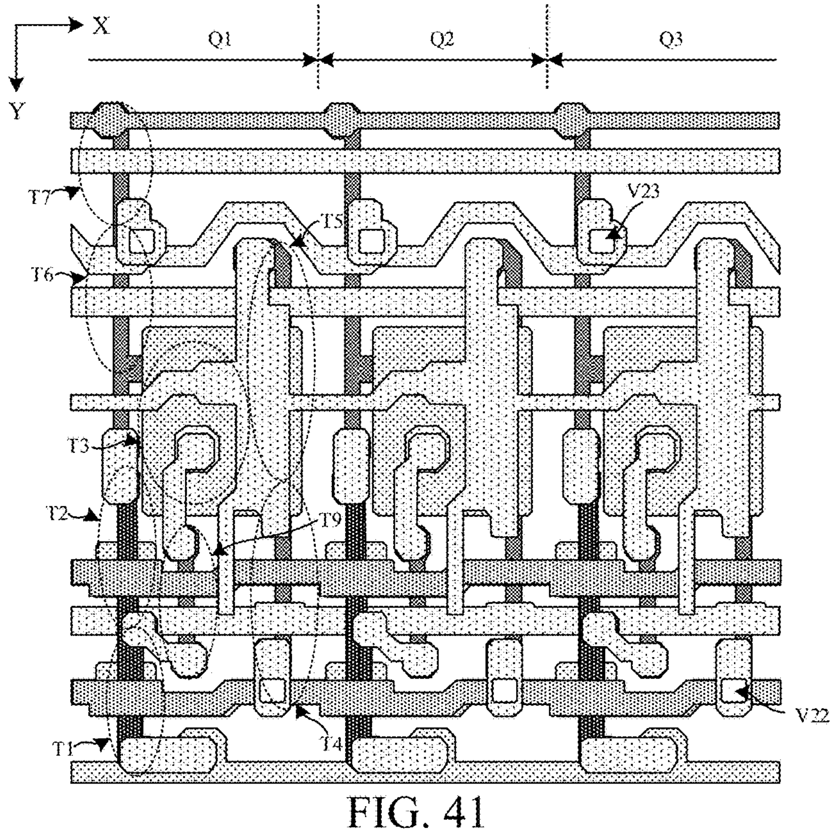
FIG. 41 is a schematic diagram of another display substrate after a pattern of a first planarization layer is formed according to the present disclosure.

(28) A pattern of a first planarization layer is formed. In an exemplary implementation, forming the pattern of the first planarization layer may include: coating a first planarization thin film on the base substrate on which the aforementioned patterns are formed, patterning the first planarization thin film using a patterning process to form a first planarization layer covering the pattern of the fourth conductive layer, wherein the first planarization layer is provided with a plurality of vias, as shown in FIG. 41.

In an exemplary implementation, the plurality of vias in each circuit unit at least includes a twenty-second via V22 and a twenty-third via V23.

In an exemplary implementation, an orthographic projection of the twenty-second via V22 on the base substrate is located within a range of an orthographic projection of the third connection electrode 53 on the base substrate, the first planarization layer of the twenty-second via V22 is etched away to expose a surface of the third connection electrode 53, and the twenty-second via V22 is configured such that the data signal line to be formed subsequently is connected with the third connection electrode 53 through the twenty-second via V22.

In an exemplary implementation, an orthographic projection of the twenty-third via V23 on the base substrate is within a range of an orthographic projection of the sixth connection electrode 56 on the base substrate, the first planarization layer in the twenty-third via V23 is etched away to expose a surface of the sixth connection electrode 56, and the twenty-third via V23 is configured such that the anode connection electrode to be formed subsequently is connected to the sixth connection electrode 56 through the twenty-third via V23.

Figure 42:
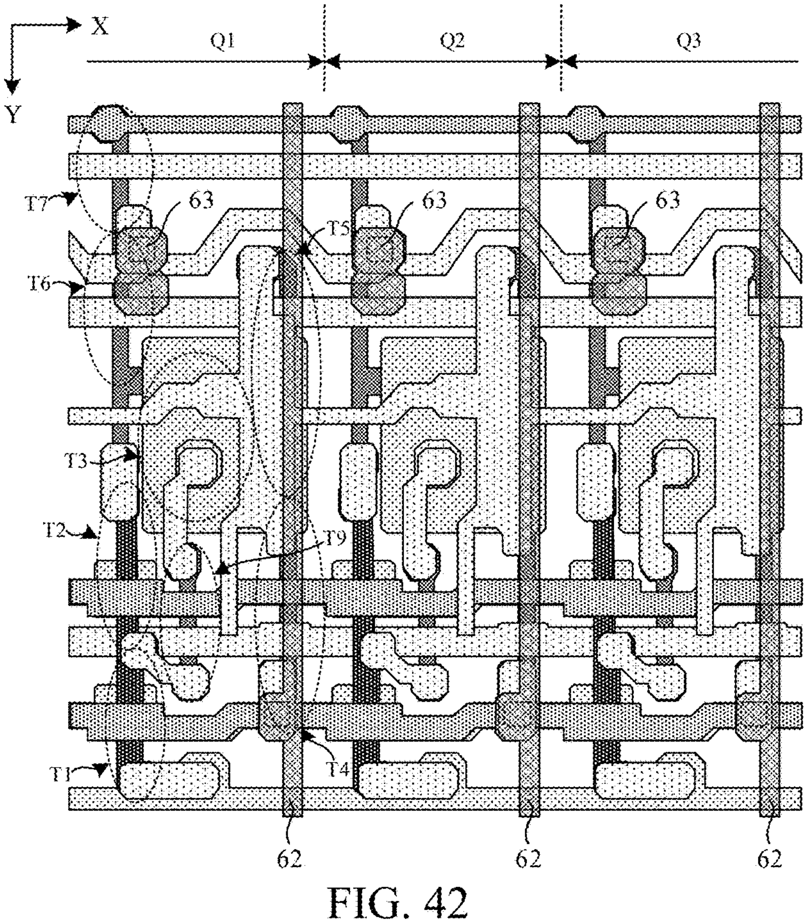
FIG. 42 is a schematic diagram of another display substrate after a pattern of a fifth conductive layer is formed according to the present disclosure.

(29) A pattern of a fifth conductive layer is formed. In an exemplary implementation, forming the fifth conductive layer may include: depositing a fifth conductive thin film on the base substrate on which the aforementioned patterns are formed, patterning the fifth conductive thin film by a patterning process to form a fifth conductive layer disposed on the first planarization layer, as shown in FIG. 42. In an exemplary implementation, the fifth conductive layer may be referred to as a second source-drain metal (SD2) layer.

In an exemplary implementation, the fifth conductive layer of each circuit unit at least includes a data signal line 62 and an anode connection electrode 63.

In an exemplary implementation, the data signal line 62 may be in a shape of a straight line or a bending line in which a main body portion extends along the second direction Y, and the data signal line 62 is connected to the third connection electrode 53 through the twenty-second via V22. Since the third connection electrode 53 is connected to the first region of the fourth active layer through a via, connection between the data signal line 62 and the first electrode of the fourth transistor T4 is achieved, and the data signal line 62 can write a data signal to the first electrode of the fourth transistor T4.

In an exemplary implementation, the anode connection electrode 63 may be in a shape of a block (e.g., a rectangle), the anode connection electrode 63 is connected to the sixth connection electrode 56 through the twenty-third via V23, and the anode connection electrode 63 is configured to be connected to an anode to be formed subsequently. Since the sixth connection electrode 56 is connected to the second region of the sixth active layer and a second region of the seventh active layer through a via, connection between the anode to be formed subsequently and the second electrode of the sixth transistor T6 as well as the second electrode of the seventh transistor T7 can be achieved, and the pixel drive circuit can drive the light emitting device to emit light.

A subsequent process may include forming a second planarization layer covering the pattern of the fifth conductive layer, an anode via is provided on the second planarization layer, the anode via exposes an anode connection electrode, and the anode via is configured such that the anode to be formed subsequently is connected to the anode connection electrode through the via.

So far, a drive circuit layer has been prepared on the base substrate. In a plane parallel to the display substrate, the drive circuit layer may include a plurality of circuit units, each circuit unit may include a pixel drive circuit, and a first scan signal line, a second scan signal line, a third scan signal line, a fourth scan signal line, a first light emitting signal line, a second light emitting signal line, a first initial signal line, a second initial signal line, a first power supply line, and a data signal line connected to the pixel drive circuit. In a plane perpendicular to the display substrate, the drive circuit layer may include a first insulation layer, a first semiconductor layer, a second insulation layer, a first conductive layer, a third insulation layer, a second conductive layer, a fourth insulation layer, a second semiconductor layer, a fifth insulation layer, a third conductive layer, a sixth insulation layer, a fourth conductive layer, a first planarization layer, a fifth conductive layer and a second planarization layer which are arranged sequentially on the base substrate. The first semiconductor layer may at least include active layers of the third transistor to the seventh transistor, the ninth transistor, the first conductive layer may at least include the second scan signal line, the fourth scan signal line, the first light emitting signal line, the second light emitting signal line, and a first plate of the storage capacitor, the second conductive layer may at least include a first initial signal line and a second plate of the storage capacitor, the second semiconductor layer may at least include active layers of the first transistor and the second transistor, the third conductive layer may at least include a first scan signal line and a third scan signal line, the fourth conductive layer may at least include a first power supply line, a second initial signal line, and a plurality of connection electrodes, and the fifth conductive layer may at least include a data signal line and an anode connection electrode.

In an exemplary implementation, after the drive circuit layer has been prepared, a light emitting structure layer may be prepared on the drive circuit layer first, and then an encapsulation structure layer may be prepared on the light emitting structure layer, which will not be described further here.

A pixel drive circuit of a display substrate adopts a structure of 7T1C, the first transistor T1 and the second transistor T2 are oxide transistors, the third transistor T3 to the seventh transistor T7 are low temperature poly silicon transistors, and the first node N1 of the pixel drive circuit is respectively connected to a second electrode of the first transistor T1, a first electrode of the second transistor T2, a gate electrode of the third transistor T3 and a first end of the storage capacitor C. During a product reliability test, the display substrate has a lateral stripe defect. Through research, it is found that occurrence of the lateral stripe defect is due to the characteristic shift of the oxide second transistor T2. In the product reliability test, long-term circuit bias voltage and high temperature will cause the characteristic shift of the oxide second transistor T2, especially the shift of the threshold voltage Vth of the second transistor T2, while the pixel drive circuit is very sensitive to the change in the threshold voltage Vth of the oxide second transistor T2, and the shift of the threshold voltage Vth of the second transistor T2 will cause fluctuations in the potential of the gate electrode (the first node N1) of the third transistor T3 (the drive transistor). Smaller fluctuations can cause larger changes in the light emitting current, which in turn leads to the lateral stripe defect. The phenomenon of the lateral stripe defect is more severe at low brightness and low gray scales.

In the display substrate according to an embodiment of the present disclosure, by providing the low temperature poly silicon ninth transistor T9 between the gate electrodes of the oxide transistor (the second transistor T2) and the drive transistor (the third transistor T3), the fluctuation in the potential of the gate electrode of the drive transistor due to changes in the characteristics of the second transistor T2 can be effectively avoided, and the lateral stripe defect can be improved or eliminated. The pixel drive circuit of the display substrate according to the present disclosure adopts a structure of 8T1C, which adds a poly silicon ninth transistor T9 on the basis of the structure of 7T1C, and the ninth transistor T9 is disposed between the gate electrode of the third transistor T3 and the first electrode of the second transistor T2 (also the second electrode of the first transistor T1), isolating the gate electrode of the drive transistor from the oxide second transistor T2. Since the characteristic of the poly silicon ninth transistor T9 is relatively stable, and the ninth transistor T9 is turned off earlier than the second transistor T2 in the third stage, the influence of the changes in the characteristics of the second transistor T2 on the potential of the gate electrode of the drive transistor is effectively eliminated, and a change in the light emitting current is avoided, thus effectively improving or eliminating the lateral stripe defect.

Oxide transistors are adopted for the first transistor T1 and the second transistor T2 of the display substrate according to an embodiment of the present disclosure, and the characteristic of low leakage current of the oxide transistors is utilized so that the voltage stored by the storage capacitor is kept stable, so as to be unaffected by the leakage current, and to realize a low-frequency display.

The embodiment of the present disclosure, by separately controlling the fifth transistor and the sixth transistor, with the gate electrode of the fifth transistor T5 connected to the first light emitting signal line, and the gate electrode of the sixth transistor T6 connected to the second light emitting signal line, not only realizes the resetting of the second node before each frame, so that the degree of shift of the characteristics of the third transistor T3 can be maintained consistently, the difference in the brightness of the switching of different pictures to gray scale pictures can be improved, and the afterimage can be improved, and the two light emitting signal lines jointly adjust the duty cycle of the pulse width modulation, which can realize more accurate pulse width modulation at ultra-high frequencies, compensation for the light emitting signal duty cycle, the compensation for low gray scales, and the improvement of the afterimage.

The manufacturing process in the present disclosure may be compatible well with an existing manufacturing process, is simple in process implementation, is easy to implement, and has a high production efficiency, a low production cost, and a high yield.

Figure 43:
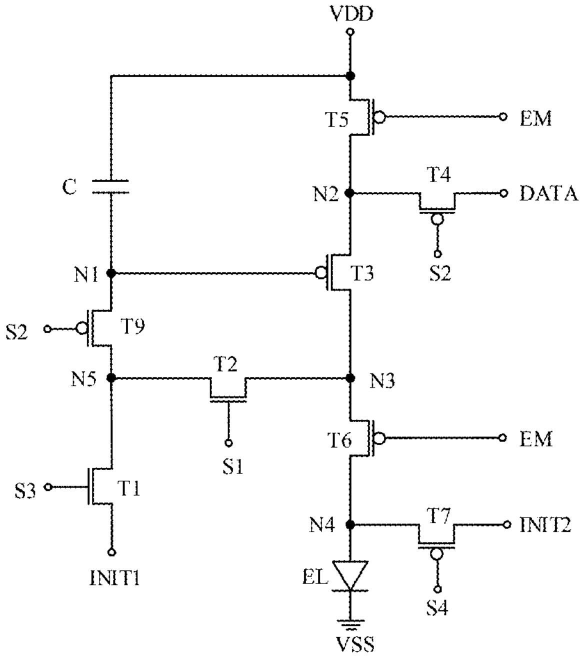
FIG. 43 is an equivalent circuit diagram of another pixel drive circuit according to an exemplary embodiment of the present disclosure.

FIG. 43 is an equivalent circuit diagram of another pixel drive circuit according to an exemplary embodiment of the present disclosure. As shown in FIG. 43, the pixel drive circuit has a structure of 8T1C and may include eight transistors (a first transistor T1 to n seventh transistor T7 and an eighth transistor T9) and one storage capacitor C, and each pixel drive circuit is connected to 9 signal lines (a first scan signal line S1, a second scan signal line S2, a third scan signal line S3, a fourth scan signal line S4, a light emitting signal line EM, a first initial signal line INIT1, a second initial signal line INIT2, a data signal line DATA and a first power supply line VDD), respectively.

In an exemplary implementation, the connection relationship of the present exemplary pixel drive circuit is substantially the same as that shown in FIG. 31, except that the fifth transistor T5 and the sixth transistor T6 are connected to a same light emitting signal line EM.

Figure 44:
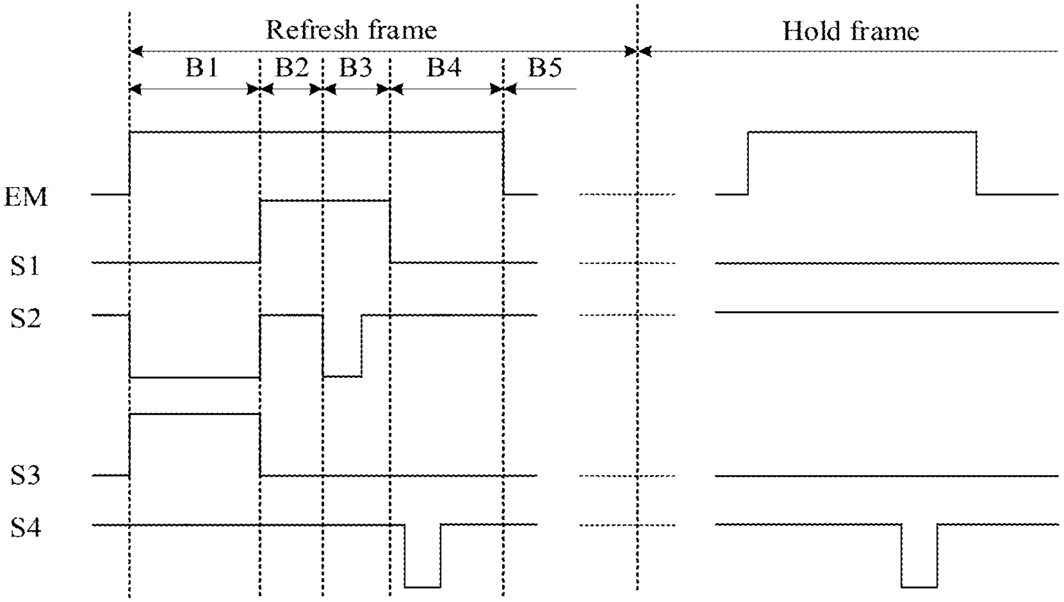
FIG. 44 is a driving timing diagram of a pixel drive circuit shown in FIG. 43.

FIG. 44 is a driving timing diagram of a pixel drive circuit shown in FIG. 43. As shown in FIG. 44, in an exemplary implementation, the driving timing of the pixel drive circuit of the present embodiment is substantially the same as that shown in FIG. 32, the content displayed by the display substrate may include a plurality of display frames, the display frame may include a refresh frame and at least one hold frame, and the working process of the refresh frame may include a first stage B1 to a fifth stage B5, except that the fourth stage B4 of the refresh frame is not provided with a second reset sub-stage, and the hold frame is not provided with a next frame reset stage.

In an exemplary implementation, the refresh frame of the present embodiment includes a second reset stage (B4) after the data writing stage (B3) and a light emitting stage (B5) after the second reset stage (B4). In the second reset stage (B4), the seventh transistor T7 is turned on, and a second initial signal output by the second initial signal line is provided to a first electrode of the light emitting device to reset the first electrode of the light emitting device. In the light emitting stage (B5), the fifth transistor T5 and the sixth transistor T6 are turned on, and a power supply signal output by the first power supply line VDD provides a drive current to the first electrode of the light emitting device EL through the turned-on fifth transistor T5, the second node N2, the turned-on third transistor T3, the third node N3, and the turned-on sixth transistor T6 to drive the light emitting device EL to emit light.

In an exemplary implementation, in the hold frame of the present embodiment, a signal of the fourth scan signal line S4 is a low-level signal, the seventh transistor T7 is turned on, a reset of the first electrode of the light emitting device EL is achieved, and other switch transistors remain in their original state.

Figure 45:
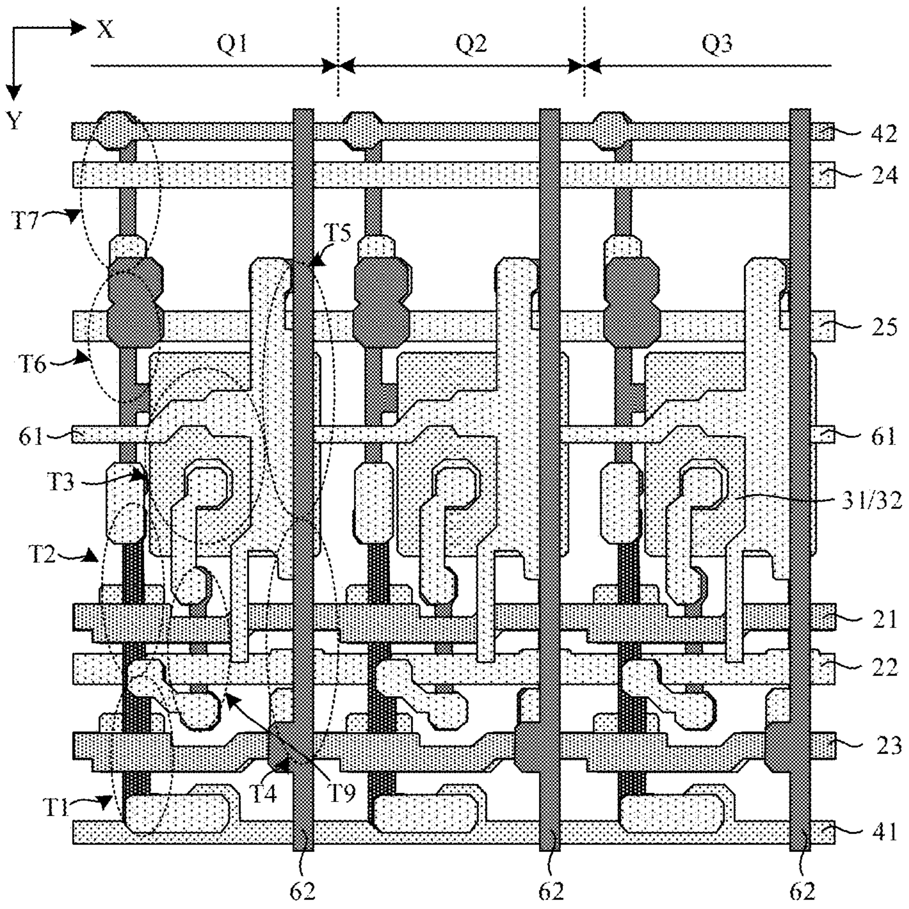
FIG. 45 is a schematic diagram of a planar structure of another display substrate according to an exemplary embodiment of the present disclosure.

FIG. 45 is a schematic diagram of a planar structure of another display substrate according to an exemplary embodiment of the present disclosure. In an exemplary implementation, the structure of the display substrate of the present embodiment is substantially the same as that shown in FIG. 33, except that in each circuit unit, the fifth transistor T5 and the sixth transistor T6 of the pixel drive circuit are connected to a same light emitting signal line 25.

In an exemplary implementation, the preparation process of the display substrate of the present embodiment is substantially the same as that of the foregoing embodiment, except that the pattern of the first conductive layer includes a second scan signal line 22, a fourth scan signal line 24, a light emitting signal line 25, and a first plate 31 of the storage capacitor, the light emitting signal line 25 may be located between the first plate 31 and the fourth scan signal line 24, a region where the light emitting signal line 25 overlaps with the fifth active layer may serve as a gate electrode of the fifth transistor T5, and a region where the light emitting signal line 25 overlaps with the sixth active layer may serve as a gate electrode of the sixth transistor T6.

The aforementioned structure shown in the present disclosure and the preparation process thereof are merely exemplary description. In an exemplary implementation, corresponding structures may be changed and patterning processes may be added or reduced according to actual needs, which is not limited here in the present disclosure.

In an exemplary implementation, the display substrate according to the present disclosure may be applied to a display apparatus with a pixel drive circuit, such as an OLED, a quantum dot display (QLED), a light emitting diode display (Micro LED or Mini LED), or a Quantum Dot Light Emitting Diode display (QDLED), which is not limited here in the present disclosure.

The present disclosure further provides a display apparatus which includes the aforementioned display substrate. The display apparatus may be any product or component with a display function, such as a mobile phone, a tablet computer, a television, a display, a laptop computer, a digital photo frame, or a navigator, which is not limited in the embodiments of the present disclosure.

Although implementations disclosed in the present disclosure are as above, it should be noted that the above implementations are exemplary only rather than restrictive. Therefore, the present disclosure is not limited to what is specifically shown and described herein. Various modifications, substitutions or omissions may be made in forms and details of implementations without departing from the scope of the present disclosure.

The invention claimed is:

1. A display substrate comprising a plurality of circuit units constituting a plurality of unit rows and a plurality of unit columns, wherein at least one of the circuit units comprises a pixel drive circuit configured to output a drive current to a light emitting device connected to the pixel drive circuit; the pixel drive circuit at least comprises a second transistor as a compensation transistor, a third transistor as a drive transistor, a fourth transistor as a data writing transistor, and a ninth transistor as an isolation transistor, wherein the second transistor is an oxide transistor, and the third transistor, the fourth transistor, and the ninth transistor are poly silicon transistors; a gate electrode of the third transistor is connected to a second electrode of the ninth transistor, a first electrode of the third transistor is connected to a second electrode of the fourth transistor, a second electrode of the third transistor is connected to a second electrode of the second transistor, a first electrode of the second transistor is connected to a first electrode of the ninth transistor, and a first electrode of the fourth transistor is connected to a data signal line; the display substrate is configured to display respective display content, the display content comprises a plurality of display frames, at least one display frame comprises a refresh frame and at least one hold frame, the refresh frame at least comprises a data writing stage; the second transistor and the ninth transistor are configured such that, in the data writing stage, a moment at which the ninth transistor is turned off is earlier than a moment at which the second transistor is turned off.

2. The display substrate according to claim 1, wherein the data writing stage at least comprises a first writing sub-stage, in the first writing sub-stage, the second transistor, the fourth transistor, and the ninth transistor are turned on, and a data signal output by the data signal line is provided to the gate electrode of the third transistor.

3. The display substrate according to claim 2, wherein the data writing stage further comprises a second writing sub-stage after the first writing sub-stage; in the second writing sub-stage, the second transistor is turned on and the ninth transistor is turned off, isolating the second transistor from the gate electrode of the third transistor.

4. The display substrate according to claim 3, wherein the pixel drive circuit further comprises a seventh transistor as a second initialization transistor, a first electrode of the seventh transistor is connected to a second initial signal line, and a second electrode of the seventh transistor is connected to a first electrode of the light emitting device; the at least one hold frame at least comprises a holding stage, in the holding stage, the seventh transistor is turned on, a second initial signal output by the second initial signal line is provided to the first electrode of the light emitting device, to reset the first electrode of the light emitting device.

5. The display substrate according to claim 2, wherein the pixel drive circuit further comprises a seventh transistor as a second initialization transistor, a first electrode of the seventh transistor is connected to a second initial signal line, and a second electrode of the seventh transistor is connected to a first electrode of the light emitting device; the at least one hold frame at least comprises a holding stage, in the holding stage, the seventh transistor is turned on, a second initial signal output by the second initial signal line is provided to the first electrode of the light emitting device, to reset the first electrode of the light emitting device.

6. The display substrate according to claim 1, wherein the pixel drive circuit further comprises a first transistor as a first initialization transistor, a first electrode of the first transistor is connected to a first initial signal line, and a second electrode of the first transistor is connected to the first electrode of the second transistor; the refresh frame further comprises a first reset stage before the data writing stage, in the first reset stage, the first transistor and the ninth transistor are turned on, and a first initial signal output by the first initial signal line is provided to the gate electrode of the third transistor to reset the gate electrode of the third transistor.

7. The display substrate according to claim 6, wherein the pixel drive circuit further comprises a seventh transistor as a second initialization transistor, a first electrode of the seventh transistor is connected to a second initial signal line, and a second electrode of the seventh transistor is connected to a first electrode of the light emitting device; the at least one hold frame at least comprises a holding stage, in the holding stage, the seventh transistor is turned on, a second initial signal output by the second initial signal line is provided to the first electrode of the light emitting device, to reset the first electrode of the light emitting device.

8. The display substrate according to claim 6, wherein in the first reset stage, the fourth transistor is turned on, and data signals of other unit rows output by the data signal line are provided to the first electrode of the third transistor to reset characteristics of the third transistor.

9. The display substrate according to claim 1, wherein the refresh frame further comprises a second reset stage after the data writing stage, and in the second reset stage, a first electrode of the light emitting device and the first electrode of the third transistor are reset, respectively.

10. The display substrate according to claim 9, wherein the pixel drive circuit further comprises a seventh transistor as a second initialization transistor, a first electrode of the seventh transistor is connected to a second initial signal line, and a second electrode of the seventh transistor is connected to the first electrode of the light emitting device; the second reset stage at least comprises a first reset sub-stage, in the first reset sub-stage, the seventh transistor is turned on, a second initial signal output by the second initial signal line is provided to the first electrode of the light emitting device, to reset the first electrode of the light emitting device.

11. The display substrate according to claim 10, wherein the pixel drive circuit further comprises a fifth transistor as a first light emitting control transistor and a sixth transistor as a second light emitting control transistor, a first electrode of the fifth transistor is connected to a first power supply line, a second electrode of the fifth transistor is connected to the first electrode of the third transistor, a first electrode of the sixth transistor is connected to the second electrode of the third transistor, and a second electrode of the sixth transistor is connected to the first electrode of the light emitting device; the second reset stage further comprises a second reset sub-stage after the first reset sub-stage, in the second reset sub-stage, the sixth transistor is turned on to reset the first electrode of the third transistor and the second electrode of the third transistor.

12. The display substrate according to claim 11, wherein the refresh frame further comprises a light emitting stage after the second reset stage, in the light emitting stage, the fifth transistor and the sixth transistor are turned on, and the first power supply line provides a drive current to the first electrode of the light emitting device to drive the light emitting device to emit light.

13. The display substrate according to claim 1, wherein the pixel drive circuit further comprises a seventh transistor as a second initialization transistor, a first electrode of the seventh transistor is connected to a second initial signal line, and a second electrode of the seventh transistor is connected to a first electrode of the light emitting device; the refresh frame further comprises a second reset stage after the data writing stage, in the second reset stage, the seventh transistor is turned on, and a second initial signal output by the second initial signal line is provided to a first electrode of the light emitting device to reset the first electrode of the light emitting device.

14. The display substrate according to claim 13, wherein the pixel drive circuit further comprises a fifth transistor as a first light emitting control transistor and a sixth transistor as a second light emitting control transistor, a first electrode of the fifth transistor is connected to a first power supply line, a second electrode of the fifth transistor is connected to the first electrode of the third transistor, a first electrode of the sixth transistor is connected to the second electrode of the third transistor, and a second electrode of the sixth transistor is connected to a first electrode of the light emitting device; the refresh frame further comprises a light emitting stage after the second reset stage, in the light emitting stage, the fifth transistor and the sixth transistor are turned on, and the first power supply line provides a drive current to the first electrode of the light emitting device to drive the light emitting device to emit light.

15. The display substrate according to claim 1, wherein the pixel drive circuit further comprises a seventh transistor as a second initialization transistor, a first electrode of the seventh transistor is connected to a second initial signal line, and a second electrode of the seventh transistor is connected to a first electrode of the light emitting device; the at least one hold frame at least comprises a holding stage, in the holding stage, the seventh transistor is turned on, a second initial signal output by the second initial signal line is provided to the first electrode of the light emitting device, to reset the first electrode of the light emitting device.

16. The display substrate according to claim 15, wherein the pixel drive circuit further comprises a fifth transistor as a first light emitting control transistor, a first electrode of the fifth transistor is connected to a first power supply line, and a second electrode of the fifth transistor is connected to the first electrode of the third transistor; the hold frame further comprises a next frame reset stage after the holding stage; in the next frame reset stage, the fifth transistor is turned on, a power supply signal output by the first power supply line is provided to the first electrode of the third transistor, to reset the first electrode of the third transistor.

17. The display substrate according to claim 1, wherein the ninth transistor is disposed between the second transistor and the fourth transistor in a unit row direction.

18. The display substrate according to claim 17, wherein the second transistor at least comprises a second active layer, the fourth transistor at least comprises a fourth active layer, and the ninth transistor at least comprises a ninth active layer, the ninth active layer is disposed between the second active layer and the fourth active layer in the unit row direction.

19. The display substrate according to claim 18, wherein a channel region of the ninth active layer is disposed between a channel region of the second active layer and a channel region of the fourth active layer in the unit row direction.

20. A display apparatus comprising the display substrate according to claim 1.

* * * * *